United States Patent
Goyal et al.

(10) Patent No.: US 11,934,964 B2
(45) Date of Patent: Mar. 19, 2024

(54) FINITE AUTOMATA GLOBAL COUNTER IN A DATA FLOW GRAPH-DRIVEN ANALYTICS PLATFORM HAVING ANALYTICS HARDWARE ACCELERATORS

(71) Applicant: Microsoft Technology Licensing, LLC, Redmond, WA (US)

(72) Inventors: Rajan Goyal, Saratoga, CA (US); Satyanarayana Lakshmipathi Billa, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 754 days.

(21) Appl. No.: 16/825,714

(22) Filed: Mar. 20, 2020

(65) Prior Publication Data

US 2021/0295181 A1    Sep. 23, 2021

(51) Int. Cl.
| | |
|---|---|
| G06F 17/00 | (2019.01) |
| G06F 7/00 | (2006.01) |
| G06F 16/2455 | (2019.01) |
| G06N 5/04 | (2023.01) |
| G06N 20/00 | (2019.01) |

(52) U.S. Cl.
CPC ......... *G06N 5/04* (2013.01); *G06F 16/24568* (2019.01); *G06N 20/00* (2019.01)

(58) Field of Classification Search
CPC ..... G06N 5/04; G06N 20/00; G06F 16/24568
USPC .......................................................... 706/12
See application file for complete search history.

(56) References Cited

U.S. PATENT DOCUMENTS

| | | | |
|---|---|---|---|
| 5,355,493 A | * | 10/1994 | Silberbauer ........... G06F 40/123 717/136 |
| 6,191,782 B1 | | 2/2001 | Mori et al. |
| 7,093,231 B2 | * | 8/2006 | Nuss ........................ G06F 8/31 717/114 |
| 7,308,446 B1 | | 12/2007 | Panigrahy et al. |
| 7,805,392 B1 | | 9/2010 | Steele et al. |

(Continued)

FOREIGN PATENT DOCUMENTS

| DE | 112012002624 T5 | 4/2014 |
|---|---|---|
| EP | 2215563 A1 | 8/2010 |

(Continued)

OTHER PUBLICATIONS

"Sort Benchmark Home Page," retrieved from http://sortbenchmark.org/ on Feb. 4, 2020, 13 pp.

(Continued)

*Primary Examiner* — Pavan Mamillapalli
(74) *Attorney, Agent, or Firm* — Alleman Hall & Tuttle LLP

(57) ABSTRACT

System and methods for performing analytical operations are described. A hardware-based regular expression (RegEx) engine performs a regular expression operation on a stream of data units based on a finite automata (FA) graph. Performing includes configuring a regular expression engine of a hardware-based regular expression accelerator to, beginning at a root node in the plurality of nodes of the FA graph, step the regular expression engine through one or more nodes of the FA graph until the regular expression engine arrives at a skip node and to consume, at the skip node, two or more data units from the stream of data units before traversing one of the directional arcs to another node.

25 Claims, 24 Drawing Sheets

FIRST LIKE "MARY" AND SECOND LIKE "SMITH" AND THIRD LIKE "66061"

(56) References Cited

U.S. PATENT DOCUMENTS

| | | |
|---|---|---|
| 7,949,683 B2 | 5/2011 | Goyal |
| 8,055,601 B2 | 11/2011 | Pandya |
| 8,086,609 B2 | 12/2011 | Goyal et al. |
| 8,176,300 B2 | 5/2012 | Goyal et al. |
| 8,180,803 B2 | 5/2012 | Goyal |
| 8,203,805 B2 | 6/2012 | Huang et al. |
| 8,329,590 B2 | 12/2012 | Condrashoff et al. |
| 8,473,523 B2 | 1/2013 | Goyal |
| 8,426,165 B2 | 4/2013 | Cho et al. |
| 8,516,456 B1 | 8/2013 | Starovoitov et al. |
| 8,726,253 B2 | 5/2014 | Glendenning et al. |
| 8,819,217 B2 | 8/2014 | Hussain et al. |
| 8,886,680 B2 | 11/2014 | Goyal |
| 8,990,259 B2 | 3/2015 | Billa et al. |
| 9,083,740 B1 | 7/2015 | Ma et al. |
| 9,203,805 B2 | 12/2015 | Goyal et al. |
| 9,304,768 B2 | 4/2016 | Ruehle |
| 9,419,943 B2 | 8/2016 | Goyal et al. |
| 9,426,165 B2 | 8/2016 | Billa et al. |
| 9,426,166 B2 | 8/2016 | Billa et al. |
| 9,438,561 B2 | 9/2016 | Goyal et al. |
| 9,495,479 B2 | 11/2016 | Goyal |
| 9,507,563 B2 | 11/2016 | Billa et al. |
| 9,514,246 B2 | 12/2016 | Billa et al. |
| 9,563,399 B2 | 2/2017 | Goyal et al. |
| 9,602,532 B2 | 3/2017 | Goyal et al. |
| 9,762,544 B2 | 9/2017 | Goyal et al. |
| 9,785,403 B2 | 10/2017 | Goyal et al. |
| 9,787,693 B2 | 10/2017 | Goyal et al. |
| 9,823,895 B2 | 11/2017 | Goyal et al. |
| 9,904,630 B2 | 2/2018 | Goyal et al. |
| 10,110,558 B2 | 10/2018 | Goyal et al. |
| 10,339,141 B2 | 7/2019 | Cafarella et al. |
| 10,511,324 B1 | 12/2019 | Goyal et al. |
| 10,540,288 B2 | 1/2020 | Noureddine et al. |
| 10,565,112 B2 | 2/2020 | Noureddine et al. |
| 10,635,419 B2 | 4/2020 | Yang et al. |
| 10,645,187 B2 | 5/2020 | Goyal et al. |
| 10,656,949 B2 | 5/2020 | Billa et al. |
| 10,659,254 B2 | 5/2020 | Sindhu et al. |
| 10,686,729 B2 | 6/2020 | Sindhu et al. |
| 10,725,825 B2 | 7/2020 | Sindhu et al. |
| 10,727,865 B2 | 7/2020 | Beckman et al. |
| 10,761,931 B2 | 9/2020 | Goyal et al. |
| 10,771,090 B2 | 9/2020 | Goyal et al. |
| 11,366,675 B2* | 6/2022 | Noyes .................. G06F 13/126 |
| 2004/0225999 A1* | 11/2004 | Nuss ....................... G06F 8/425 |
| | | 717/114 |
| 2005/0229251 A1 | 10/2005 | Chellapilla et al. |
| 2006/0064432 A1 | 3/2006 | Pettovello |
| 2006/0069872 A1 | 3/2006 | Bouchard et al. |
| 2006/0075206 A1 | 4/2006 | Bouchard et al. |
| 2006/0085389 A1* | 4/2006 | Flanagan .......... G06F 16/90344 |
| | | 707/999.005 |
| 2006/0085533 A1* | 4/2006 | Hussain ............ G06F 16/90344 |
| | | 707/E17.041 |
| 2007/0006293 A1* | 1/2007 | Balakrishnan ...... H04L 63/0254 |
| | | 726/13 |
| 2008/0101371 A1 | 5/2008 | Law et al. |
| 2009/0138440 A1 | 5/2009 | Goyal |
| 2010/0114973 A1 | 5/2010 | Goyal |
| 2011/0016154 A1 | 1/2011 | Goyal et al. |
| 2011/0093496 A1* | 4/2011 | Bando ............... G06F 16/90344 |
| | | 707/769 |
| 2011/0107379 A1 | 5/2011 | Lajoie et al. |
| 2012/0331554 A1 | 12/2012 | Goyal et al. |
| 2013/0046784 A1 | 2/2013 | Ruehle |
| 2013/0133064 A1 | 5/2013 | Goyal et al. |
| 2013/0324900 A1 | 12/2013 | Wariar et al. |
| 2014/0101187 A1 | 4/2014 | Chao et al. |
| 2014/0129775 A1 | 5/2014 | Ruehle |
| 2014/0344391 A1 | 11/2014 | Varney et al. |
| 2015/0067123 A1 | 3/2015 | Goyal et al. |
| 2015/0067776 A1 | 3/2015 | Billa et al. |
| 2015/0067863 A1 | 3/2015 | Billa et al. |
| 2015/0293846 A1 | 10/2015 | Goyal et al. |
| 2015/0295889 A1 | 10/2015 | Goyal et al. |
| 2015/0295891 A1 | 10/2015 | Goyal et al. |
| 2016/0275205 A1* | 9/2016 | Lehavi .................. G06F 40/289 |
| 2017/0098157 A1 | 4/2017 | Noyes et al. |
| 2017/0124166 A1 | 5/2017 | Thomas et al. |
| 2018/0278500 A1 | 9/2018 | Feamster et al. |
| 2018/0287965 A1 | 10/2018 | Sindhu et al. |
| 2018/0293168 A1 | 10/2018 | Noureddine et al. |
| 2018/0367557 A1 | 12/2018 | Brown et al. |
| 2019/0012278 A1 | 1/2019 | Sindhu et al. |
| 2019/0012350 A1 | 1/2019 | Sindhu et al. |
| 2019/0013965 A1 | 1/2019 | Sindhu et al. |
| 2019/0103973 A1 | 4/2019 | Chalkias et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0182114 A1 | 6/2019 | Tavridis et al. |
| 2019/0215256 A1 | 7/2019 | Dhanabalan et al. |
| 2019/0258401 A1 | 8/2019 | Li et al. |
| 2019/0279038 A1 | 9/2019 | Nicol |
| 2019/0312915 A1 | 10/2019 | LaJoie et al. |
| 2020/0004699 A1 | 1/2020 | Mishra et al. |
| 2020/0019339 A1 | 1/2020 | Yang et al. |
| 2020/0019391 A1 | 1/2020 | Yang et al. |
| 2020/0019404 A1 | 1/2020 | Billa et al. |
| 2020/0021664 A1 | 1/2020 | Goyal et al. |
| 2020/0097404 A1 | 3/2020 | Cason |
| 2020/0119903 A1 | 4/2020 | Thomas et al. |
| 2020/0133771 A1 | 4/2020 | Goyal et al. |
| 2020/0142642 A1 | 5/2020 | Billa et al. |
| 2020/0145020 A1 | 5/2020 | Goyal et al. |
| 2020/0145680 A1 | 5/2020 | Dikshit et al. |
| 2020/0145681 A1 | 5/2020 | Dikshit et al. |
| 2020/0145682 A1 | 5/2020 | Dikshit et al. |
| 2020/0145683 A1 | 5/2020 | Dikshit |
| 2020/0151101 A1 | 5/2020 | Noureddine et al. |
| 2020/0159568 A1 | 5/2020 | Goyal et al. |
| 2020/0159840 A1 | 5/2020 | Beckman et al. |
| 2020/0159859 A1 | 5/2020 | Beckman et al. |
| 2020/0162100 A1 | 5/2020 | Beckman et al. |
| 2020/0162101 A1 | 5/2020 | Beckman et al. |
| 2020/0162584 A1 | 5/2020 | Beckman et al. |
| 2020/0169268 A1 | 5/2020 | Billa et al. |
| 2020/0183841 A1 | 6/2020 | Noureddine et al. |
| 2020/0228148 A1 | 7/2020 | Thomas et al. |
| 2020/0250032 A1 | 8/2020 | Goyal et al. |

FOREIGN PATENT DOCUMENTS

| | | |
|---|---|---|
| EP | 2215565 A1 | 8/2010 |
| EP | 2276217 A2 | 1/2011 |
| WO | 2003023553 A2 | 3/2003 |
| WO | 2007079095 A2 | 7/2007 |
| WO | 2009070191 A1 | 6/2009 |
| WO | 2009070192 A1 | 6/2009 |
| WO | 2012177736 A1 | 12/2012 |
| WO | 2013078053 A1 | 5/2013 |

OTHER PUBLICATIONS

Becchi et al., "Efficient Regular Expression Evaluation: Theory to Practice," Proceedings of the 2008 ACM/IEEE Symposium on Architecture for Networking and Communications Systems, Nov. 6, 2008, pp. 50-59.

Becchi et al., "Evaluating Regular Expression Matching Engines on Network and General Purpose Processors," Proceedings of the 2009 ACM/IEEE Symposium on Architecture for Networking and Communications Systems, Oct. 19, 2009, pp. 30-39.

Bille et al., "Subsequence Automata with Default Transitions," Journal of Discrete Algorithms, vol. 44, Jun. 13, 2017, pp. 48-55.

Ficara et al., "An Improved DFA for Fast Regular Expression Matching," ACM SIGCOMM Computer Communication Review, vol. 38, No. 5, Oct. 2008, pp. 29-40.

(56) References Cited

OTHER PUBLICATIONS

Gogte et al., "HARE: Hardware Accelerator for Regular Expressions," 49th Annual IEEE/ACM International Symposium on Microarchitecture (MICRO), Oct. 2016, 12 pp.

Kumar et al., "Advanced Algorithms for Fast and Scalable Deep Packet Inspection," Proceedings of the 2006 ACM/IEEE Symposium, Dec. 3, 2006, pp. 81-92.

Qi et al., "FEACAN: Front-End Acceleration for Content-Aware Network Processing," 2011 Proceedings IEEE INFOCOM, Apr. 10-15, 2011, pp. 2114-2122.

Sidhu et al., "Fast Regular Expression Matching Using FPGAs," Proceedings of the 9th Annual IEEE Symposium on Field-Programmable Custom Computing Machines (FCCM'01), Apr. 29, 2001, pp. 227-238.

Zheng et al., "Algorithms to Speedup Pattern Matching for Network Intrusion Detection Systems," Computer Communications, vol. 62, Feb. 2015. pp. 47-58.

Van Lunteren et al., "Designing a Programmable Wire-Speed Regular-Expression Matching Accelerator," 2012 IEEE/ACM 45th Annual International Symposium on Microarchitecture, Dec. 1-5, 2012, pp. 461-472.

U.S. Appl. No. 16/144,689, filed Jun. 13, 2019, by Nayakam et al.
U.S. Appl. No. 16/584,293, filed Sep. 26, 2019, by Goyal et al.
U.S. Appl. No. 16/584,390, filed Sep. 26, 2019, by Billa et al.
U.S. Appl. No. 16/584,467, filed Sep. 26, 2019, by Billa et al.
U.S. Appl. No. 16/877,050, filed May 18, 2020, by Sindhu et al.
U.S. Appl. No. 16/877,102, filed May 18, 2020, by Billa et al.
U.S. Appl. No. 16/901,991, filed Jun. 15, 2020, by Sindhu et al.
U.S. Appl. No. 16/939,617, filed Jul. 27, 2020, by Sindhu et al.
U.S. Appl. No. 16/825,664, filed Mar. 20, 2020, by Goyal et al.
U.S. Appl. No. 17/007,687, filed Aug. 31, 2020, by Goyal et al.
Office Action from U.S. Appl. No. 16/825,664, dated May 19, 2022, 31 pp.

* cited by examiner

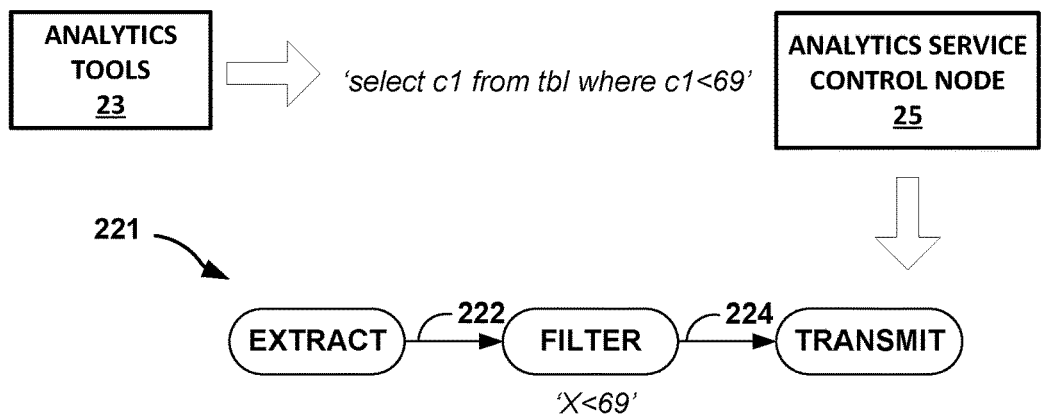
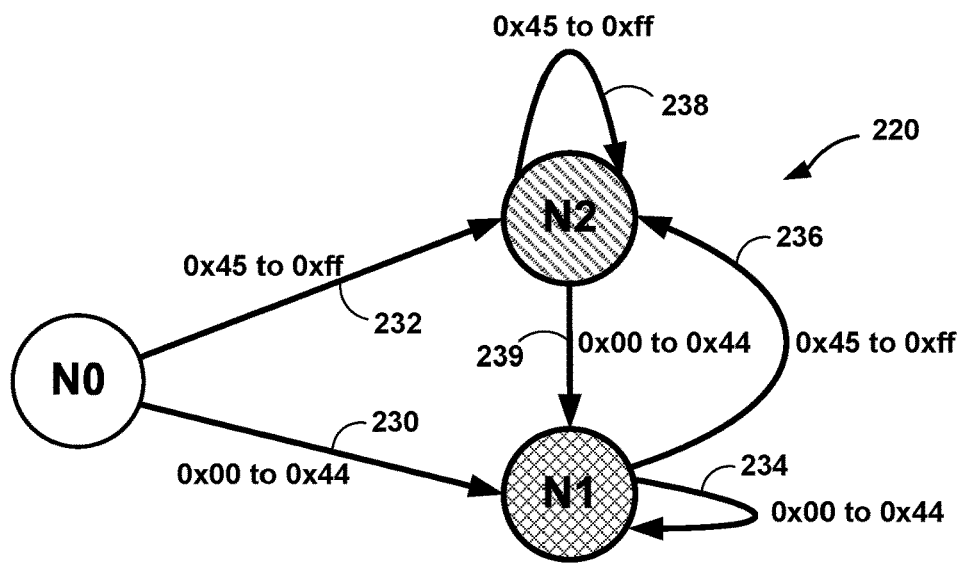
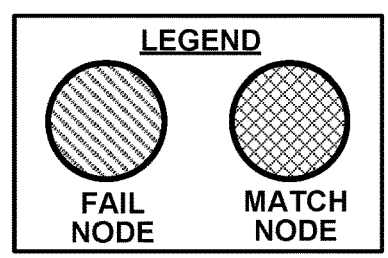
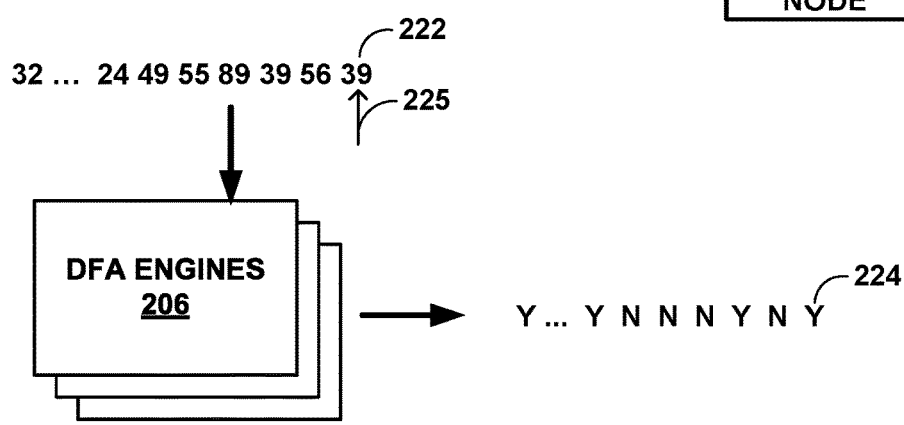
FIG. 15A

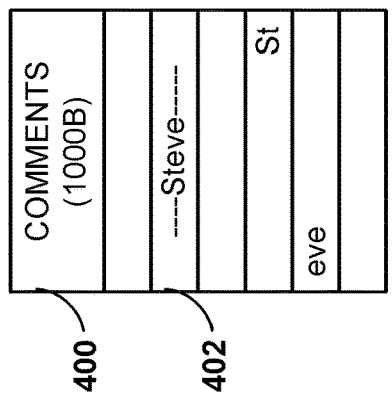
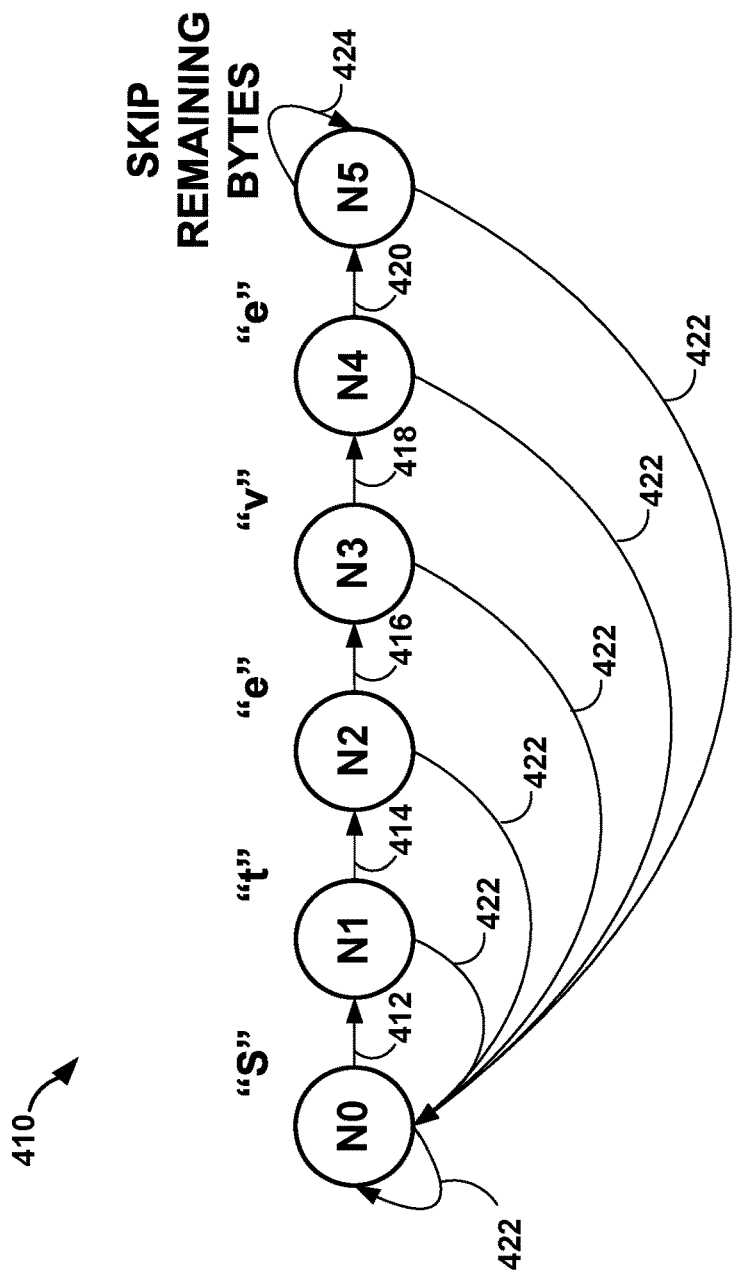
FIG. 16A

| | Byte0 | | | | Byte1 | | | | Byte2 | | | | Byte3 | | | | Byte4 | | | | Byte5 | | | | Byte6 | | | | Byte7 | | | |
|---|---|---|---|---|---|---|---|---|---|---|---|---|---|---|---|---|---|---|---|---|---|---|---|---|---|---|---|---|---|---|---|---|
| 7 6 | 5 4 | 3 2 | 1 0 | 7 6 | 5 4 | 3 2 | 1 0 | 7 6 | 5 4 | 3 2 | 1 0 | 7 6 | 5 4 | 3 2 | 1 0 | 7 6 | 5 4 | 3 2 | 1 0 | 7 6 | 5 4 | 3 2 | 1 0 | 7 6 | 5 4 | 3 2 | 1 0 | 7 6 | 5 4 | 3 2 | 1 0 |
| 10 | 10 | 10 | 00 | -- | -- | 01 | 11 | X | | | | 'A' | | | | 'B' | | | | 'C' | | | | 25 | | | | 'E' | | | |
| M0 | T0 | | MODE0 | | | | | NODE_ADDR_R0 | | | | | | | | MODE1 | | | | | | | | NODE_ADDR_R1 | | | | | | | |
| M2 | T2 | | MODE2 | | | | | NODE_ADDR_R2 | | | | | | | | MODE3 | | | | | | | | NODE_ADDR_R3 | | | | | | | |
| M4 | T4 | | MODE4 | | | | | NODE_ADDR_R4 | | | | | | | | MODE5 | | | | | | | | NODE_ADDR_R5 | | | | | | | |

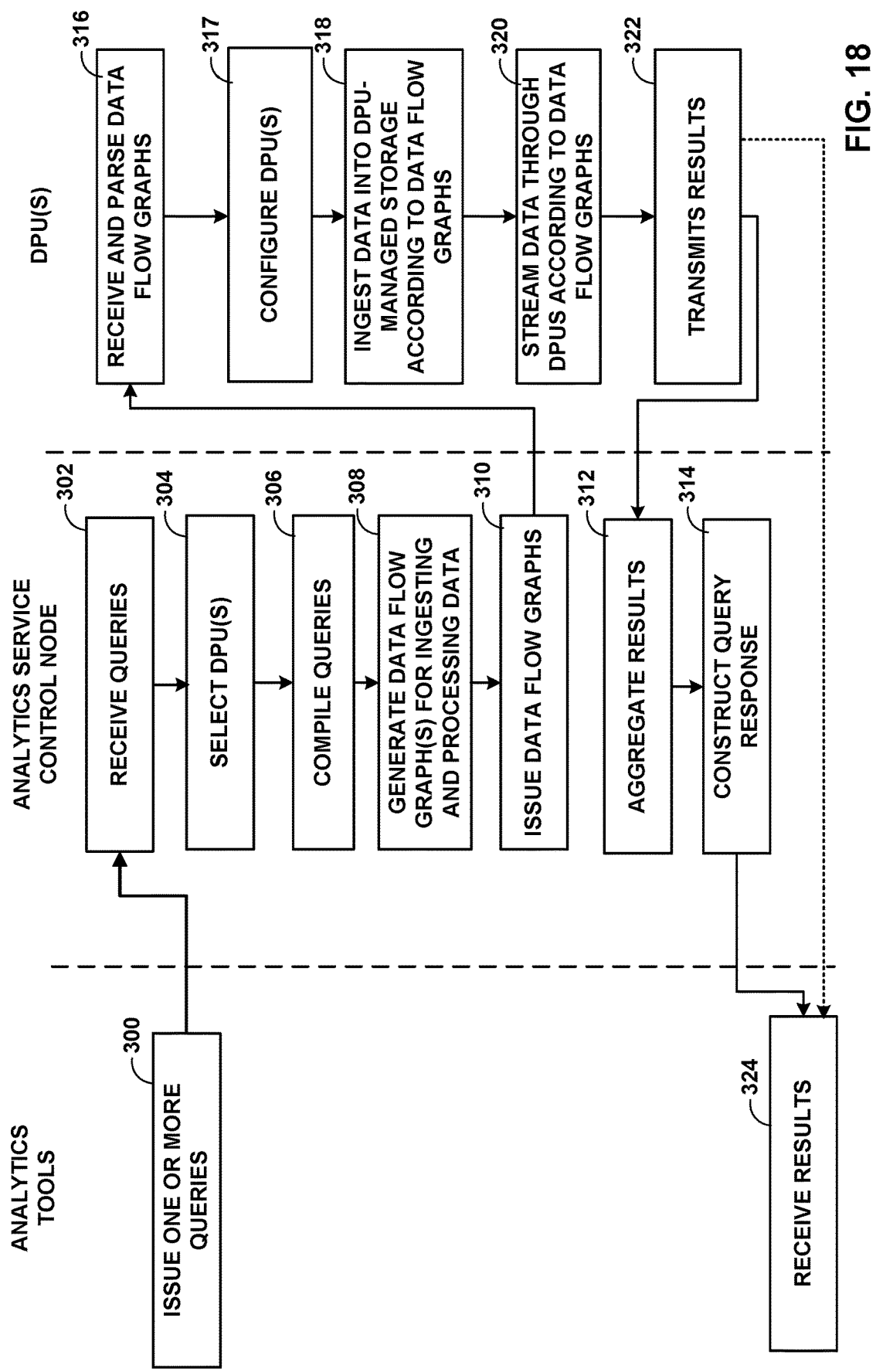

FINITE AUTOMATA GLOBAL COUNTER IN A DATA FLOW GRAPH-DRIVEN ANALYTICS PLATFORM HAVING ANALYTICS HARDWARE ACCELERATORS

TECHNICAL FIELD

The invention relates to systems and devices for performing data analytics.

BACKGROUND

Data analytics platforms apply various techniques to ingest and analyze large volumes of data. For example, data analytics platforms are often used to process data to identify, analyze and present visualizations indicative of data trends and patterns.

SUMMARY

In general, this disclosure describes a data flow graph-driven analytics platform in which highly programmable data stream processing devices, referred to generally herein as data processing units (DPUs), operate to provide a scalable, fast and efficient analytics processing architecture. In general, the DPUs are specialized data-centric processors architected for efficiently applying data manipulation operations (e.g., regular expression operations to match patterns, filtering operations, data retrieval, compression/decompression and encryption/decryption) to streams of data units, such as packet flows having network packets, a set of storage packets being retrieved from or written to storage or other data units. Techniques are described herein that leverage the data stream processing architecture of the DPUs in ways that enable high-speed analytics service capable of performing analytics operations on large volumes of data. Example architectures are described in which clusters of DPU-enhanced compute nodes and/or storage nodes provide accelerated, hardware-assisted processing of queries for data ingestion and processing to perform analytical operations.

In some examples, operation and configuration of the DPUs, including data ingestion and execution of analytics operations, is controlled by way of data flow graphs (DFGs). For example, an analytics service control node translates requests for analytical operations, such as queries for data loading and analysis as received from analytical software tools, into one or more data flow graphs as data structures for controlling execution of the DPUs. That is, the data flow graphs are designed to configure clusters of one or more DPUs to apply the requested analytical operations by ingesting data from data sources and manipulating the data as data streams flowing through the DPUs, thereby leveraging the highly efficient, specialized software and hardware components of the DPUs. In this way, the analytics service control node controls operation of DPUs to process streams of data from data sources so as to serve as a highly scalable platform for servicing analytic requests of analytic tools and other clients.

Moreover, this disclosure describes example implementations in which the DPUs include programmable, hardware-based accelerators configured to apply query predicates and other analytical operations by evaluating regular expressions against the high-speed data flows streaming through the DPUs. For example, the DPUs may include hardware-based regular expression (RegEx) accelerators; each RegEx accelerator may include one or more non-deterministic finite automata (NFA) engines and/or one or more deterministic finite automata (DFA) engines, each configured to evaluate the regular expression against the data streams. As further described herein, rather than executing query predicates on large volumes of data using general purpose processors, the described systems transform analytical queries into DFA and/or NFA representations and leverage the RegEx accelerators of the DPUs for efficiently implementing the query predicates by streaming data through the DPUs and applying regular expression processing to the data streams.

In some examples, deterministic finite automata (DFA) and/or non-deterministic finite automata (NFA) engines use DFA and NFA graphs, respectively, to perform pattern matching on streams of data units. The following disclosure describes techniques for compressing the size and complexity of the DFA graphs and the NFA graphs. In one example, a default arc is described that allows the DFA or NFA engine of a DPU to skip a pre-defined number of bytes in a payload before moving to the next node in the corresponding DFA or NFA graph. Without such an arc, the graph may require up to N additional nodes just to skip the N remaining data units in the payload.

In another example, a global counter may be used in a DFA or NFA graph to skip bytes or other sized fields in a payload, or to detect the end of a payload. Once again, such an approach reduces the size of the related DFA or NFA graph by providing a single node capable of processing the bytes remaining in a payload after, e.g., a match.

In yet another example, a combination of default arcs and global counters may be used to skip two or more different sets of data units within a payload when the contents of the data units are not relevant, further compressing the associated DFA or NFA graph.

In yet another example, one or more DPUs include an NFA engine. In one such example, the disclosure describes a technique for efficiently clearing the instruction stack of an NFA engine of a DPU while maintain a path back to the root node of the NFA graph. In one example approach, the NFA engine flips one of the bits of its stack identifiers (StackIDs) such that the paths forward have a different stackID than the path used to return the NFA engine to the root node.

In one example approach, a stackID associated with a graph node is modified before the node is pushed onto a stack during a FORK operation. In one such example, a field in a FORK instruction (the "FLIP" field) selects between two methods of pushing the addresses onto the stack. In one such example, the FLIP field is one-bit in length. Such an approach may be used, for example, to simplify clearing of an instruction stack after a match.

In one example, an integrated circuit includes memory and one or more hardware-based regular expression (RegEx) accelerators communicatively coupled to the memory, wherein each RegEx accelerator includes a regular expression engine configured to receive a DFA or NFA graph from the memory, and to perform a regular expression operation on a stream of data units based on the received graph, wherein the received graph includes a plurality of nodes connected by directional arcs, each arc representing transitions between nodes based on criteria specified for the respective arc, the plurality of nodes including nodes representing states in the regular expression operation. At least one of the arcs is a default arc, the default arc configured to skip a predefined number N of data units in the stream of data units before transitioning to another node. The regular expression engine discards the next N data units received from the stream of data units before traversing the default arc.

In another example, a method includes receiving a regular expression operation to be performed on a stream of data units; expressing the regular expression operation as a finite automata (FA) graph, the FA graph having a plurality of nodes connected by directional arcs, each arc representing transitions between nodes of the FA graph based on criteria specified for the respective arc, the plurality of nodes including nodes, including a skip node, representing states in the regular expression operation; and performing the regular expression operation on the stream of data units based on the FA graph, wherein performing includes configuring a regular expression engine to beginning at a root node in the plurality of nodes of the FA graph, step a regular expression engine through one or more nodes of the FA graph until the regular expression engine arrives at a skip node; and consume, at the skip node, two or more data units from the stream of data units before traversing one of the directional arcs to another node.

In another example, in an integrated circuit having a memory and a regular expression engine, a method comprises receiving a graph at the regular expression engine, the graph including a plurality of nodes connected by directional arcs, each arc representing transitions between nodes based on criteria specified for the respective arc, the plurality of nodes including nodes representing states in the regular expression operation, at least one node having a default arc; beginning at a root node in the plurality of nodes, stepping the regular expression engine through one or more nodes of the graph until arriving at the node having the default arc; and skipping N data units in a stream of data units before traversing the default arc.

In one example, an integrated circuit includes a memory including a finite automata (FA) graph, wherein the FA graph includes a plurality of nodes connected by directional arcs, each arc representing transitions between nodes of the FA graph based on criteria specified for the respective arc, the plurality of nodes including a skip node; and one or more hardware-based regular expression (RegEx) accelerators connected to the memory, wherein each RegEx accelerator includes a regular expression engine, the regular expression engine configured to receive the FA graph from the memory and to perform a regular expression operation on a stream of data units based on the received FA graph. The regular expression engine is further configured to, on reaching the skip node, consume two or more data units in the stream of data units before traversing one of the directional arcs to another node.

In one example, a method includes receiving a regular expression operation to be performed on a stream of data units; expressing the regular expression operation as a finite automata (FA) graph, the FA graph having a plurality of nodes connected by directional arcs, each arc representing transitions between nodes of the FA graph based on criteria specified for the respective arc, the plurality of nodes including nodes, including a skip node, representing states in the regular expression operation; and performing the regular expression operation on the stream of data units based on the FA graph, wherein performing includes configuring a regular expression engine of a hardware-based regular expression accelerator to: beginning at a root node in the plurality of nodes of the FA graph, step the regular expression engine through one or more nodes of the FA graph until the regular expression engine arrives at a skip node and consume, at the skip node, two or more data units from the stream of data units before traversing one of the directional arcs to another node.

In one example, in an integrated circuit having a regular expression engine, a method includes receiving a DFA or NFA graph, the received graph including a plurality of nodes connected by directional arcs, each arc representing transitions between nodes based on criteria specified for the respective arc, the plurality of nodes including nodes, including a skip node, representing states in the regular expression operation; selecting a stream of data units; beginning at a root node in the plurality of nodes of the received DFA or NFA graph, stepping a regular expression engine through one or more nodes of the graph until the regular expression engine arrives at a skip node; if the skip node is configured to consume on match, consuming, at the skip node, two or more data units from the selected stream of data units before traversing one of the directional arcs to another node; and if the skip node is configured to not consume on match, traversing one of the directional arcs to the other node.

In another example, a system comprises a regular expression (RegEx) engine configured to detect patterns within a stream of data units; and a controller configured to receive a request to perform an analytical operation on data from the stream of data units, the analytical operation specifying a query having at least one query predicate, wherein, in response to the request, the controller configures the RegEx engine to operate according to one or more non-deterministic finite automata (NFA) to evaluate the query predicate by applying one or more regular expressions to the stream of data units, wherein configuring the RegEx engine includes generating a set of NFA instructions, the NFA instructions including at least one FORK instruction, each FORK instruction having a plurality of execution paths, including a default execution path and one or more other execution paths, and programming the RegEx engine to operate according to the NFA instructions. The RegEx engine executes the at least one FORK instruction by attaching a first stack identifier to the default execution path, pushing the default execution path and the first stack identifier to an instruction stack, attaching a second stack identifier to the other execution paths, the second stack identifier a function of the first stack identifier, pushing the other execution paths with their respective second stack identifiers to the instruction stack, and executing each execution path in order by popping the execution path from the instruction stack.

In another example, a method includes receiving a request specifying at least one analytical operation to be performed on data, the analytical operation specifying a query having at least one query predicate; in response to the request, configuring a regular expression (RegEx) engine to input the data as one or more streams of data units and to evaluate the query predicate against the data by applying one or more regular expressions to the one or more data streams according to one or non-deterministic finite automata (NFA), wherein configuring the RegEx engine includes generating a set of NFA instructions, the NFA instructions including at least one FORK instruction, each FORK instruction having a plurality of execution paths, including a default execution path and one or more other execution paths, and programming the RegEx engine to operate according to the NFA instructions; and executing the at least one FORK instruction, wherein executing includes attaching a first stack identifier to the default execution path; pushing the default execution path and the first stack identifier to an instruction stack; attaching a second stack identifier to the other execution paths, the second stack identifier a function of the first stack identifier; pushing each other execution path with a respective second stack identifier to the instruction stack;

and executing each execution path in order by popping the execution path from the instruction stack.

The details of one or more examples are set forth in the accompanying drawings and the description below. Other features, objects, and advantages of the invention will be apparent from the description and drawings, and from the claims.

BRIEF DESCRIPTION OF DRAWINGS

FIGS. 15A and 15B are block diagrams illustrating regular expression accelerators (e.g., DFA engines) configured to operate according to different DFA graphs for executing various queries specifying logical conditions (i.e., query predicates) on one or more columns of data units streaming through one or more DPUs.

FIG. 16A is a block diagram illustrating an example DFA graph configured to apply a query specifying one or more logical conditions (i.e., query predicates) to column data.

FIG. 16D illustrates an example DFA default hash arc instruction slice configured to skip a predefined number of data units when the current data unit does not match any of the hash conditions (e.g., Byte3, Byte4, Byte5) defined in the instruction.

FIG. 18 is a flowchart illustrating example operation of a network system in which one or more analytics service control nodes and a set of data processing units (DPUs) are configured to provide a scalable, efficient platform for analytics processing.

Like reference characters refer to like elements throughout the figures and description.

DETAILED DESCRIPTION

Figure 1:
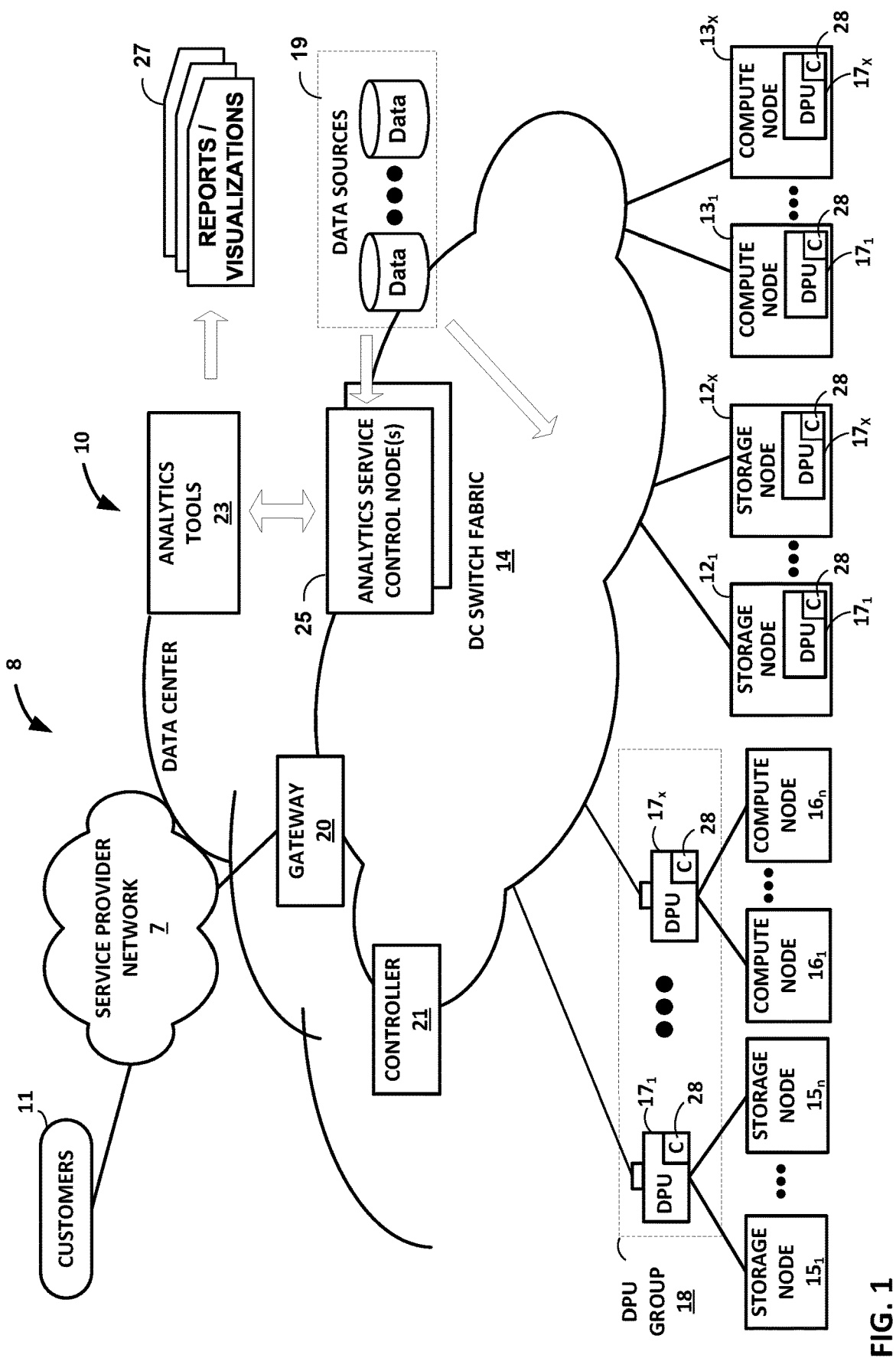
FIG. 1 is a block diagram illustrating an example network in which examples of the techniques described herein may be implemented.

FIG. 1 is a block diagram illustrating an example system 8 in which the techniques described herein may be implemented. As shown in this example, data center 10 includes one or more analytics service control nodes 25 and a set of data processing units (DPUs) 17 configured to provide an edge services platform for scalable, efficient analytics processing.

In the example of FIG. 1, one or more analytics service control nodes 25 operate as front-end controllers that present one or more interfaces (e.g., APIs) with which general analytics software tools 23 interact to direct analytics processing of data from data sources 19. As described herein, in response to requests (e.g., queries, messages, API calls, REST calls, etc.) from analytics tools 23, analytics service control node 25 operates to coordinate high-speed distributed processing of analytical operations on data ingested from data sources 19 using one or more DPUs 17. For example, analytics service control node 25 may coordinate clusters of DPUs 17 to provide accelerated, hardware-assisted processing of queries for data ingestion and processing of analytical operations specified by analytics tools 23. Based on results on the analytical operations, analytics tools 23 may generate reports/visualizations 27 indicative of trends, patterns and the like with respect to the underlying data of data sources 19. Data sources 19 may, for example, be large-scale databases or data repositories, distributed data sources, streaming data sources such as data feeds or IoT data streams, and the like.

As further described herein, unlike conventional compute models that are centered around a central processing unit (CPU), DPUs 17 are specially designed and optimized for a data-centric computing model in which the data processing tasks are centered around, and the primary responsibility of the DPU. In some examples, DPUs 17 may be viewed as a highly programmable, high-performance input/output (I/O) and data-processing hubs designed to aggregate and process network and storage I/O to and from multiple other components and/or devices.

For example, in accordance with the techniques of this disclosure, each highly programmable DPU 17 comprises a network interface (e.g., Ethernet) to connect to a network to send and receive stream data units (e.g., data packets), one or more host interfaces (e.g., Peripheral Component Interconnect-Express (PCI-e)) to connect to one or more application processors (e.g., a CPU or a graphics processing unit (GPU)) or storage devices (e.g., solid state drives (SSDs)) to send and receive stream data units, and a multi-core processor with two or more of the processing cores executing a run-to-completion data plane operating system on which a software function is invoked for processing one or more of the stream data units, and with one or more of the processing cores executing a multi-tasking control plane operating system. The data plane operating system comprises a low level, run-to-completion operating system running on bare metal of the DPU that is configured to support software functions for performing data processing tasks. In some examples, the data plane operating system is also configured to support a control plane software stack that includes the multi-tasking control plane operating system (e.g., Linux). The DPU utilizes fine-grain work units, work unit queues, and a queue manager executed on the data plane operating system to serialize packet processing such that data packets of a same packet flow are processed by a same processing core. In this way, the DPU is capable of processing any type of packet flow with fine granularity between processing cores and low processing overhead.

In the illustrated example, FIG. 1 is a block diagram illustrating an example system 8 having a data center 10 which may include various devices, such as computing nodes (devices) 16, storage nodes (devices) 15, and network devices/appliances, any of which may include one or more DPU integrated circuits configured according to the techniques of this disclosure. As illustrated in FIG. 1, in some example approaches, data center 10 also includes DPU-enhanced compute nodes 13 and DPU-enhanced storage nodes 12. In one such example approach, DPU-enhanced compute nodes 13 and/or DPU-enhanced storage nodes 12 retrieve data from data sources 19, from storage nodes 15, and/or from one or more DPU-enhanced storage nodes 12 in order to provide accelerated, hardware-assisted processing of queries as specified by analytics tools 23. In one example approach, one or more analytics service control nodes 25 operate in response to requests (e.g., queries, messages, API calls, REST calls, etc.) from analytics tools 23, coordinating high-speed distributed processing of analytical operations on data ingested from data sources 19 using a DPU selected from DPUs 17, from DPU-enhanced compute nodes 13 or from DPU-enhanced storage nodes 12. In some examples, analytics service control node 25 coordinates clusters of DPUs 17, DPU-enhanced compute nodes 13 and/or DPU-enhanced storage nodes 12 such that the clusters can provide accelerated, hardware-assisted data ingestion and processing of analytical operations specified by analytics tools 23.

In general, data center 10 provides an operating environment for applications and services for customers 11 coupled to the data center by content/service provider network 7 and gateway device 20. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet. Although described for purposes of example with respect to a cloud-based data center, the techniques described herein may be applied in any form of a computer network. As such, in other examples, content/service provider network 7 may be a data center wide-area network (DC WAN), a private network, an enterprise LAN or other type of computer network. In some examples, data center 10 may represent one of many geographically distributed network data centers. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In accordance with the techniques described herein and as noted above, various compute nodes 13 within data center 10 may include DPUs 17 used to perform data centric tasks within data center 10. As another example, various storage nodes 12 within data center 10 may interact with DPUs 17 to store data for the data centric tasks performed by the DPUs. As described herein, each DPU 17 is optimized to perform tasks for processing streams of data units, such as storage and retrieval of data to and from storage devices (such as SSDs), networking tasks and the like. For example, each DPU may be configured to execute a large number of data I/O processing tasks relative to a number of instructions that are processed. The DPU may support one or more host interfaces, such as PCI-e ports. The DPU may support one or more high-speed network interfaces, such as Ethernet ports, without the need for a separate network interface card (NIC), and may include programmable hardware specialized for network traffic. The DPU may be highly programmable such that the DPU may expose hardware primitives for selecting and programmatically configuring data processing operations. The DPU may be optimized for these processing tasks as well. For example, the DPU may include hardware implementations of high-performance data processing tasks, such as cryptography, compression (and decompression), regular expression processing, lookup engines, or the like. Example details of a DPU having hardware-based accelerators for data stream processing are described in U.S. patent application Ser. No. 16/035,416 filed Jul. 13, 2018, entitled "ARC CACHING FOR DETERMINISTIC FINITE AUTOMATA OF REGULAR EXPRESSION ACCELERATOR," U.S. patent application Ser. No. 16/035,478 filed Jul. 13, 2018, entitled "INSTRUCTION-BASED NON-DETERMINISTIC FINITE STATE AUTOMATA ACCELERATOR," U.S. patent application Ser. No. 16/035,457 filed Jul. 13, 2018, entitled "DETERMINISTIC FINITE AUTOMATA NODE CONSTRUCTION AND MEMORY MAPPING FOR REGULAR EXPRESSION ACCELERATOR," U.S. patent application Ser. No. 16/035,444 filed Jul. 13, 2018, entitled "INCREMENTAL COMPILATION OF FINITE AUTOMATA FOR A REGULAR EXPRESSION ACCELERATOR," U.S. patent application Ser. No. 16/157,265 filed Oct. 11, 2018, entitled "MULTIMODE CRYPTOGRAPHIC PROCESSOR," U.S. patent application Ser. No. 16/169,736 filed Oct. 24, 2018, entitled "INLINE RELIABILITY CODING FOR STORAGE ON A NETWORK," U.S. patent application Ser. No. 16/178,341 filed Nov. 1, 2018, entitled "DATA PROCESSING UNIT HAVING HARDWARE-BASED RANGE ENCODING AND DECODING," U.S. patent application Ser. No. 16/178,373 filed Nov. 1, 2018, entitled "DATA PROCESSING UNIT HAVING HARDWARE-BASED RANGE ENCODING AND DECODING," U.S. patent application Ser. No. 16/179,496 filed Nov. 2, 2018, entitled "MEMORY LAYOUT FOR JPEG ACCELERATOR," U.S. patent application Ser. No. 16/179,529 filed Nov. 2, 2018, entitled "WORK ALLOCATION FOR JPEG ACCELERATOR," U.S. patent application Ser. No. 16/179,558 filed Nov. 2, 2018, entitled "JPEG ACCELERATOR USING LAST-NON-ZERO (LNZ) SYNTAX ELEMENT," U.S. patent application Ser. No. 16/179,472 filed Nov. 2, 2018, entitled "PARALLEL CODING OF SYNTAX ELEMENTS FOR JPEG ACCELERATOR," U.S. patent application Ser. No. 16/195,209 filed Nov. 19, 2018, entitled "HISTORY-BASED COMPRESSION PIPELINE FOR DATA COMPRESSION ACCELERATOR OF A DATA PROCESSING UNIT," U.S. patent application Ser. No. 16/195,290 filed Nov. 19, 2018, entitled "HASHING TECHNIQUES IN DATA COMPRESSION ACCELERATOR OF A DATA PROCESSING UNIT," U.S. patent application Ser. No. 16/195,564 filed Nov. 19, 2018, entitled "MATCHING TECHNIQUES IN DATA COMPRESSION ACCELERATOR OF A DATA PROCESSING UNIT," U.S. patent application Ser. No. 16/195,644 filed Nov. 19, 2018, entitled "MERGING TECHNIQUES IN DATA COMPRESSION ACCELERATOR OF A DATA PROCESSING UNIT," U.S. patent application Ser. No. 16/195,617 filed Nov. 19, 2018, entitled "DATA STRIPING FOR MATCHING TECHNIQUES IN DATA COMPRESSION ACCELERATOR OF A DATA PROCESSING UNIT," U.S. patent application Ser. No. 16/198,607 filed Nov. 21, 2018, entitled "SERVICE CHAINING HARDWARE ACCELERATORS WITHIN A DATA STREAM PROCESSING INTEGRATED CIRCUIT," U.S. patent application Ser. No. 16/200,484 filed Nov. 26, 2018, entitled "STATIC DICTIONARY-BASED COMPRESSION HARDWARE PIPELINE FOR DATA COMPRESSION ACCELERATOR OF A DATA PROCESSING UNIT," U.S. patent application Ser. No. 16/249,658 filed Jan. 16, 2019, entitled "DATA PROCESSING UNIT HAVING HARDWARE-BASED PARALLEL VARIABLE-LENGTH CODEWORD DECODING," U.S. patent application Ser. No. 16/265,606 filed Feb. 1, 2019, entitled "FLEXIBLE RELIABILITY CODING FOR STORAGE ON A NETWORK," U.S. patent application Ser. No. 16/440,689 filed Jun. 13, 2019, entitled "CONTEXT VALUE RETRIEVAL PRIOR TO OR PARALLEL WITH EXPANSION OF PREVIOUS SYMBOL FOR CONTEXT-DECODING IN RANGE DECODER," U.S. patent application Ser. No. 16/584,293 filed Sep. 26, 2019, entitled "DATA FLOW GRAPH-DRIVEN ANALYTICS PLATFORM USING DATA PROCESSING UNITS HAVING HARDWARE ACCELERATORS," U.S. patent application Ser. No. 16/584,390 filed Sep. 26, 2019, entitled "DATA INGESTION AND STORAGE BY DATA PROCESSING UNIT HAVING STREAM-PROCESSING HARDWARE ACCELERATORS," and U.S. patent application Ser. No. 16/584,467 filed Sep. 26, 2019, entitled "QUERY PROCESSING USING DATA PROCESSING UNITS HAVING DFA/NFA HARDWARE ACCELERATORS," the entire contents of each of which are incorporated herein by reference.

In this example, storage nodes 12 and compute nodes 13 are interconnected via a high-speed data center switch fabric 14, which may include one or more layers of switches and/or routers. In some examples, storage nodes 12 and compute nodes 13 are arranged into multiple different groups, each including any number of nodes up to, for example, n storage nodes $12_1$-$12_n$ and n compute nodes $13_1$-$13_n$ (collectively, "storage nodes 12" and "compute nodes 13"). Storage nodes 12 and compute nodes 13 provide storage and computation facilities, respectively, for applications and data associated with customers 11 and may be physical (bare metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and, in some cases, physically centralized controller for facilitating operation of one or more virtual networks within data center 10 in accordance with one or more embodiments of this disclosure. In some examples, SDN controller 21 may operate in response to configuration input received from a network administrator. In some examples, SDN controller 21 operates to configure data processing units (DPUs) 17 to logically establish one or more virtual fabrics as overlay networks dynamically configured on top of the physical underlay network provided by switch fabric 14. For example, SDN controller 21 may learn and maintain knowledge of DPUs 17 and establish a communication control channel with each of DPUs 17. SDN controller 21 may, for instance, use its knowledge of DPUs 17 to define multiple sets (groups) of two of more DPUs 17 to establish different virtual fabrics over switch fabric 14. More specifically, SDN controller 21 may use the communication control channels to notify each of DPUs 17 for a given set which other DPUs 17 are included in the same set. In response, DPUs 17 may dynamically setup tunnels with the other DPUs included in the same set as a virtual fabric over packet switched network 410. In this way, SDN controller 21 defines the sets of DPUs 17 for each of the virtual fabrics, and the DPUs are responsible for establishing the virtual fabrics. As such, underlay components of switch fabric 14 may be unaware of virtual fabrics. In these examples, DPUs 17 interface with and utilize switch fabric 14 so as to provide full mesh (any-to-any) interconnectivity between DPUs of any given virtual fabric. In this way, the servers connected to any of the DPUs forming a given one of virtual fabrics may communicate packet data for a given packet flow to any other of the servers coupled to the DPUs for that virtual fabric using any of a number of parallel data paths within switch fabric 14 that interconnect the DPUs of that virtual fabric. More details of DPUs operating to spray packets within and across virtual overlay networks are available in U.S. patent application Ser. No. 16/147,099, filed Sep. 28, 2018, entitled "NETWORK ACCESS NODE VIRTUAL FABRICS CONFIGURED DYNAMICALLY OVER AN UNDERLAY NETWORK" and U.S. patent application Ser. No. 15/939,227, filed Mar. 28, 2018, entitled "NON-BLOCKING ANY-TO-ANY DATA CENTER NETWORK WITH PACKET SPRAYING OVER MULTIPLE ALTERNATE DATA PATHS", the entire contents of each of which are incorporated herein by reference.

As further described herein, in one example, each DPU 17 is a highly programmable specialized data processing unit specially designed for offloading certain data processing functions from storage nodes 12 and compute nodes 13, such as encryption, decompression, security, regular expression processing, and range encoding. In one example, each of DPUs 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 or compute nodes 13, freeing up the processors of the servers to dedicate resources to application workloads. In some example implementations, each DPU 17 may be viewed as a network interface subsystem that implements full offload of the handling of data packets (with zero copy in server memory) and storage acceleration for the attached server systems. In one example, each DPU 17 may be implemented as one or more application-specific integrated circuits (ASICs) or other hardware and software components, and may be incorporated within network appliances, compute nodes, storage nodes or other devices. DPUs 17 may also be referred to as access nodes, or devices including access nodes. In other words, the term access node may be used herein interchangeably with the term DPU. Additional details of various example DPUs are described in in U.S. patent application Ser. No. 16/031,676, filed Jul. 10, 2018, entitled "Access Node for Data Centers" and in U.S. patent application Ser. No. 16/031,921, filed Jul. 10, 2018, entitled "Data Processing Unit for Compute Nodes and Storage Nodes," the entire contents of both being incorporated herein by reference.

In example implementations, DPUs 17 are configurable to operate in a standalone network appliance having one or more DPUs. For example, DPUs 17 may be arranged into multiple different DPU groups 18, each including any number of DPUs up to, for example, x DPUs $17_1$-$17_x$. As such, multiple DPUs 17 may be grouped (e.g., within a single electronic device or network appliance), referred to herein as a DPU group 18, for providing services to a group of servers supported by the set of DPUs internal to the device. In one example, a DPU group 18 may comprise four DPUs 17, each supporting four servers so as to support a group of sixteen servers.

In the example of FIG. 1, each DPU 17 provides connectivity to switch fabric 14 for a different group of storage nodes 12, 15 or compute nodes 13, 16 and may be assigned respective IP addresses and provide routing operations for the storage nodes 12, 15 or compute nodes 13, 16 coupled thereto. As described herein, DPUs 17 provide routing and/or switching functions for communications from/directed to the individual storage nodes 12, 15 or compute nodes 13, 16. For example, as shown in FIG. 1, each DPU 17 includes a set of edge-facing electrical or optical local bus interfaces for communicating with a respective group of storage nodes 12, 15 or compute nodes 13, 16 and one or more core-facing electrical or optical interfaces for communicating with core switches within switch fabric 14. In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the servers. Although not shown in FIG. 1, DPUs 17 may be directly coupled to each other, such as direct coupling between DPUs in a common DPU group 18, to provide direct interconnectivity between the DPUs of the same group. For example, multiple DPUs 17 (e.g., 4 DPUs) may be positioned within a common DPU group 18 for servicing a group of servers (e.g., 16 servers).

In the example of FIG. 1, each DPU 17 includes a counter 28. In one example technique, counter 28 is configured as a global counter used by a DFA engine in DPU 17 to track the number of data units processed while analyzing a payload. A global counter is useful, for example, in determining when to switch between different field sizes during the analysis of a payload, in determining the end of a packet or packet slice, or for skipping data units that are not relevant to the analytical operations being performed. In one example, the global counter is decremented each time a byte or other-sized data unit is processed. The process is complete when the counter reaches zero. In one example approach, the global counter is used to reset a matching process after a certain number of bytes or fields are processed. Such an approach may be used, for example, to switch between processing fields of a pre-defined field size (other than bytes) and processing bytes, or vice versa.

In another example, a default arc is described that may be used by DPU 17 to skip a pre-defined number of data units in a payload before moving to the next node in a DFA or NFA graph. In one such example, DPU 17 employs counter 28 as a skip counter used by DPU 17 to skip the pre-defined number of bytes or fields in the payload before moving to the next node in the DFA or NFA graph. In one such example, the pre-defined number N is supplied as part of the default arc instruction.

In one example, counter 28 is set to zero at the start of the skip process and incremented each time a byte is received. DPU 17 moves to the next node in the DFA graph when the counter=N. In one such example, the counter is set equal to N and decremented each time a byte is received. DPU 17 moves to the next node in the DFA graph when the counter=0. Without such an arc, a DFA or NFA graph may require N additional nodes just to skip N bytes in the payload.

As one example, each DPU group 18 of multiple DPUs 17 may be configured as standalone network device, and may be implemented as a two-rack unit (2RU) device that occupies two rack units (e.g., slots) of an equipment rack. In another example, DPU 17 may be integrated within a server, such as a single 1RU server in which four CPUs are coupled to the forwarding ASICs described herein on a mother board deployed within a common computing device. In yet another example, one or more of DPUs 17, storage nodes 15, and compute nodes 16 may be integrated in a suitable size (e.g., 10RU) frame that may, in such an example, become a network storage compute unit (NSCU) for data center 10. For example, a DPU 17 may be integrated within a mother board of a storage node 15 or a compute node 16 or otherwise co-located with a server in a single chassis.

In some example implementations, DPUs 17 interface and utilize switch fabric 14 so as to provide full mesh (any-to-any) interconnectivity such that any of storage nodes 12, 15 or compute nodes 13, 16 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity. In this way, DPUs 17 interface and utilize switch fabric 14 so as to provide full mesh (any-to-any) interconnectivity such that any of storage nodes 12, 15 or compute nodes 13, 16 may communicate packet data for a given packet flow to any other of the servers using any of a number of parallel data paths within the data center 10. For example, in some example network architectures, DPUs spray individual packets for packet flows between the DPUs and across some or all of the multiple parallel data paths in the data center switch fabric 14 and reorder the packets for delivery to the destinations so as to provide full mesh connectivity.

In some examples, a data transmission protocol referred to as a Fabric Control Protocol (FCP) may be used by the different operational networking components of any of DPUs 17 to facilitate communication of data between DPUs 17 and across switch fabric 14 when necessary. In general, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide numerous advantages, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. The use of FCP may provide certain advantages. For example, the use of FCP may increase significantly the bandwidth utilization of the underlying switch fabric 14. Moreover, in example implementations described herein, the servers of the data center may have full mesh interconnectivity and may nevertheless be non-blocking and drop-free. More details on the FCP are available in U.S. patent application Ser. No. 16/147,070, filed Sep. 28, 2018, entitled "Fabric Control Protocol for Data Center Networks with Packet Spraying Over Multiple Alternate Data Paths," the entire contents of which is incorporated herein by reference.

Although DPUs 17 are described in FIG. 1 with respect to switch fabric 14 of data center 10, in other examples, DPUs may be used within any packet switched network. For example, the packet switched network may include a local area network (LAN), a wide area network (WAN), or a collection of one or more networks. The packet switched network may have any topology, e.g., flat or multi-tiered. The packet switched network may use any technology, including IP over Ethernet as well as other technologies. Irrespective of the type of packet switched network, in some examples, DPUs may spray individual packets for packet flows between the DPUs and across multiple parallel data paths in the packet switched network and reorder the packets for delivery to the destinations so as to provide full mesh connectivity.

In accordance with the techniques of the disclosure, one or more analytics service control nodes 25 and DPUs 17 operate to provide an edge services platform for scalable, efficient analytics processing. Analytics service control nodes 25 present one or more interfaces (e.g., APIs) with which general analytics software tools 23 interact to direct analytics processing of data from data sources 19 via one or more clusters of one or more DPU-enhanced compute nodes 13 and, in some examples, one or more DPU-enhanced storage nodes 12. As examples, each of analytics service control node may comprise any of a computing device, a server, a virtual machine, a container or a network appliance.

As further described herein, analytics service control node 25 coordinates operation of DPUs 17 associated with compute nodes 13, including data ingestion and execution of analytics operations, using data flow graphs (DFGs). As discussed, each DPU 17 is a specialized data processing unit architected for efficiently applying data manipulation operations (e.g., regular expression operations to match patterns, filtering operations, data retrieval, compression/decompression and encryption/decryption) to streams of data units, such as packet flows having network packets, a set of storage packets being retrieved from or written to storage or other data units. Analytics service control node 25 translates analytic operations, such as queries for data loading and analysis, into one or more data flow graphs that control execution of DPUs 17 when reading data from data sources 19 and when manipulating the data as data streams, thereby leveraging the highly efficient, specialized software and hardware components of the DPUs. In this way, analytics service control node 25 controls operation of the DPUs 17 processing streams of data from data sources 19 so as to serve as a platform for servicing the analytic requests of analytic tools 23.

In one example approach, an analytics service control node 25 translates requests for analytical operations, such as queries for data loading and analysis received from analytical software tools 23, into one or more data flow graphs. Each data flow graph is then used to configure DPUs 17 as the DPUs 17 apply the requested analytical operations by ingesting data from data sources 19 and manipulating the data as data streams. In this way, the analytics service control node 25 controls the use of DPUs 17 to process streams of data from data sources 19.

Moreover, in some example approaches, each DPU 17 includes programmable, hardware-based accelerators configured to apply query predicates and other analytical operations by evaluating regular expressions against the high-speed data flows streaming through the DPUs 17. For example, a DPU 17 may include hardware-based regular expression (RegEx) accelerators that include one or more NFA engines and/or one or more DFA engines, each engine configured to evaluate the regular expression against the data streams. As further described herein, rather than executing query predicates on large volumes of data using general purpose processors, the described systems transform analytical queries into DFA and/or NFA representations and leverage the RegEx accelerators of the DPUs 17 for efficiently implementing the query predicates by streaming data through the DPUs 17 and applying regular expression processing to the data streams.

In some examples, DFA and/or NFA graphs compiled from the data flow graphs may be used to perform pattern matching on streams of data units. The following disclosure describes techniques for compressing the size and complexity of the DFA graphs and the NFA graphs. In one example, a default arc is described that allows the DFA or NFA engine of a DPU to skip a pre-defined number of bytes in a payload before moving to the next node in the corresponding DFA or NFA graph. Without such an arc, the graph may require up to N additional nodes just to skip the N remaining data units in the payload.

In another example, a global counter may be used in a DFA or NFA graph to skip bytes or other sized fields in a payload, or to detect the end of a payload. Once again, such an approach reduces the size of the related DFA or NFA graph by providing a single node capable of processing the bytes remaining in a payload after, e.g., a match.

In yet another example, a combination of default arcs and global counters may be used to skip two or more different sets of data units within a payload when the contents of the data units are not relevant, further compressing the associated DFA or NFA graph.

In yet another example, one or more DPUs 17 include an NFA engine. In one such example, the disclosure describes a technique for efficiently clearing the instruction stack of an NFA engine of a DPU 17 while maintain a path back to the root node of the NFA graph. In one example approach, the NFA engine flips one of the bits of its stack identifiers (StackIDs) such that the paths forward have a different stackID than the path used to return the NFA engine to the root node.

Figure 2:
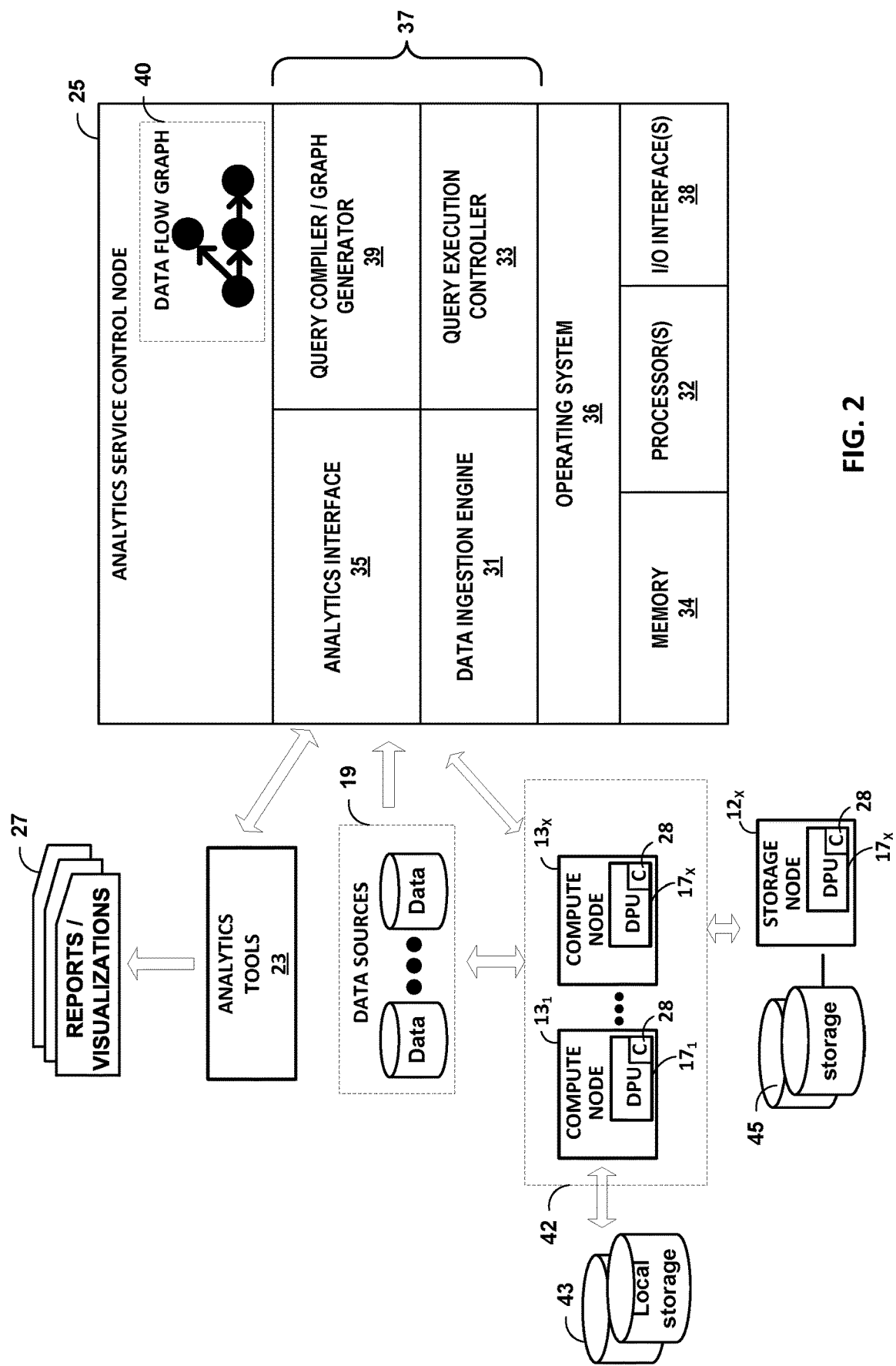
FIG. 2 is a block diagram illustrating an example analytics service control node of FIG. 1 in further detail.

FIG. 2 is a block diagram illustrating an example analytics service control node 25 of FIG. 1 in further detail. In this example, analytics service control node 25 includes one or more processors 32 and memory 34 that, in some examples, provide a computer platform for executing an operating system 36, which may be a general-purpose operating system, for instance, or other type of operating system. In turn, operating system 36 provides a multitasking operating environment for executing one or more software components 37, including data ingestion engine 31, query execution controller 33, analytics interface 35 and query compiler/data flow graph (DFG) generator 39. In some examples, processors 32 and memory 34 may be separate, discrete components. In other examples, memory 34 may be on-chip memory collocated with processors 32 within a single integrated circuit.

In some examples, analytics service control node 25 is a single computing device, such as a compute server, workstation, a desktop computer, a laptop. As other examples, analytics service control node 25 may operate as a virtual machine, container or other executional component within a virtualized environment. In some examples, at least a portion of software components 37 of analytics service control node 25 may be distributed across a cluster of devices operating within a network, such as data center 10 or any cloud computing system, enterprise network, private local area network or other communications network.

Processors 32 are coupled to one or more I/O interfaces 38, providing one or more I/O interfaces for communicating with external devices, such as a keyboards, display devices, input devices, and the like. Moreover, the one or more I/O interfaces 38 may include one or more wired or wireless network interface controllers (NICs) for communicating with a network, such as data center switch fabric 14. Each of processors 32 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 34 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In general, each analytics service control node 25 is a computing device that operates as a front-end controller to present one or more interfaces (e.g., APIs) with which general analytics software tools 23 interacts to direct analytics processing of data from data sources 19. As described herein, in response to requests (e.g., queries, messages, API calls, REST calls, etc.) from analytics tools 23, analytics service control node 25 operates to coordinate high-speed distributed processing of analytical operations on data ingested from data sources 19 using one or more of the DPUs 17.

More specifically, analytics interface 35 presents one or more interfaces (e.g., RESTful APIs, JSON queries, SOAP protocol messages) for communicating with analytics tools 23, which may be software analytics platforms executing on control node 25 or other devices. That is, analytics service control node 25 may receive requests (e.g., queries) for performing analytics services on data stored within data sources 19. In response to the queries, data ingestion engine 31 coordinates the loading of data from data sources 19 into a cluster 42 of one or more compute nodes 13, or into one or more storage nodes 12.

In general, data ingestion engine 31 coordinates data loading & unloading of the compute nodes 13 in cluster 42 and/or of the storage nodes 12 that are to be used for satisfying the particular analytics operations specified by analytics tools 23. Under the direction of data ingestion engine 31, data from data sources 19 is loaded into compute nodes 13, which may store the data in locally attached storage 43 or within remote storage 45 of storage nodes 12 reachable via switch fabric 14. In one example, data ingestion engine 31 reads rows of tables of data from data sources 19 and distributes the rows of data to compute nodes 13 or to storage nodes 12 via DPUs 17 using distribution keys for storage and subsequent, high-speed analytics processing. Alternatively, in some implementations, data ingestion engine 31 may horizontally slice each table of data within data sources 19 into N slices and allocate each slice to one of the storage nodes 12 or to one of the compute nodes 13 of cluster 42 identified by analytics service control node 25 for servicing the request. In one example, the number of slices N is the same as the number of compute nodes 13 selected for the cluster servicing the request. In one such example, each compute node 13 (or storage node 12) reads the slice or slices from data sources 19 that are assigned to the compute node for retrieval. Upon retrieving the slice or slices, each compute node 13 (or storage node 12) retains and stores the rows that are assigned to itself and, in some cases, distributes other rows of the retrieved slices to the other respective peer compute nodes within the cluster 42 formed by analytics service control node 25 to service the request. In this case, data flow during the ingestion phase need not flow through analytics service control node 25 and partial or even full tables may be shared between compute nodes 13 of cluster 42 during data ingestion. Data loading may be faster as multiple compute nodes 13 are retrieving data from data sources 19 in parallel and sharing the data within cluster 42 such that each compute node ultimately receives the rows of data assigned to the compute node by data ingestion engine 31.

As further explained herein, in some example implementations, analytics service control node 25 coordinates operation of DPUs 17 associated with compute nodes 13 and storage nodes 12, including data ingestion and execution of analytics operations, using data flow graphs (DFGs). More specifically, in response to receiving a query via analytics interface 35, query compiler/DFG generator 39 compiles the query (which may take a conventional form such as an SQL query, a Spark SQL query, a GraphX operation) and dynamically constructs a data flow graph (DFG) 40 representing a set of operations to be performed by DPUs 17 for implementing analytical operations on the ingested data. That is, query compiler 39 generates data flow graph 40 as a data structure having one or more graph nodes connected by arcs. Each arc in DFG 40 represents a stream of data units (e.g., packets) such that an arc traversing from a first graph node to a second graph node represents an output stream of data units to be produced by the first graph node and used as an input stream of data units to be received and operated on by the second graph node. Moreover, each graph node in DFG 40 has a defined node TYPE (e.g., Extract, Filter, Transmit) and logically represents a set of low-level, high-speed data stream processing operations to be performed by DPUs 17 on the input data streams received by that graph node so as to generate any output data stream to be produced by the graph node.

Query execution controller 33 is tasked with the responsibility of coordinating the overall servicing of an analytics request received via analytics interface 35, including coordinating selection and identification of compute nodes 13 so as to form cluster 42 for servicing the request, generation of DFG 40 by query compiler 39, data ingestion by data ingestion engine 31, and distribution of all or portions of DFG 40 to compute nodes 13 and/or storage nodes 12 for performing the data processing operations represented by the data flow graph. In some examples, query execution controller 33 also aggregates results from compute nodes 13 and storage nodes 12 for output to analytics tools 23 by way of the analytics interface 35.

Figure 3:
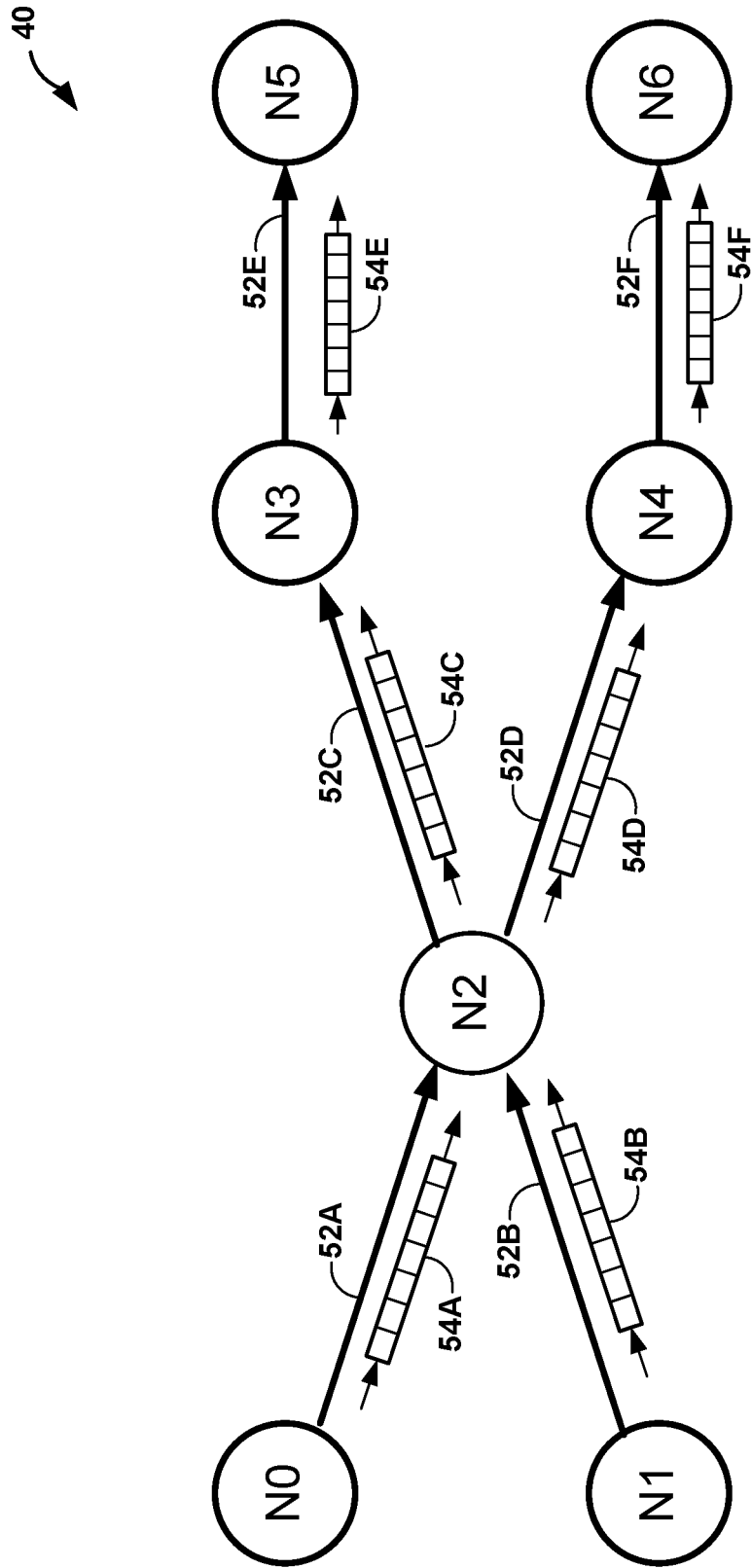
FIG. 3 is a block diagram illustrating an example data flow graph generated by the analytics service control node for controlling operation of one or more data processing units.

FIG. 3 is a block diagram illustrating an example data flow graph 40 having, in this example, a plurality of graph nodes N0-N6 and arcs 52A-52F. As explained above, each arc 52 in DFG 40 represents a stream of data units 54A-54F that may be consumed, internally manipulated and/or transmitted by any of DPUs 17 when servicing the analytics request. Moreover, each graph node in DFG 40 logically represents a set of one or more low-level, high-speed data stream processing operations to be performed by software components and/or hardware accelerators of DPUs 17 on any input data streams received by that graph node so as to generate any output data streams to be produced by the graph node.

As such, an arc traversing from a first graph node to a second graph node represents an output stream of data units to be produced by the first graph node and used as an input stream of data units to be received and operated on by the second graph node. As examples, an arc in DFG 40 may represent a set of data units that, during execution, may be a stream of data units ingested and stored by a DPU 17, a temporary set of data units generated within a memory of a DPU 17 and manipulated by a hardware or software component of DPU 17, or a set of data units transmitted by a DPU to local storage or across a network to a storage node 12 or 15.

In the example of FIG. 3, arcs 52A, 52B indicate that the operations to be performed by DPUs 17 as represented by graph nodes N0 and N1 result in the DPUs generating respective streams of data units 54A, 54B. As examples, graph nodes N0 and N1 may represent data extraction operations to be performed by components of DPUs 17 to read data from data sources 19 as part of the data ingestion phase. As such, data flows 54A, 54B may be two streams of data values read from one or more rows of a table from data sources 19.

Further, arcs 52A, 52B indicate that data flows 54A, 54B operate as input data flows to graph node N2, which represents operations to be performed by DPUs 17 to receive, as inputs, the two data streams represented by arcs 52A, 52B, to operate on the input data streams and to output two streams of data units represented by arcs 52C, 52D. In some examples, data flows 54C, 54D may be two distinct data flows carrying different values while in other examples an output data flow may be sent to and/or shared as input data flows by multiple DPU components.

In this example, graph nodes N3, N4 represent respective sets of operations by DPUs 17 to process, as inputs, data flows 54C, 54D to produce data flows 54E, 54F, respectively. In this way, graph nodes N2, N3 and N4 are intermediate graph nodes for high-speed processing of streams of data. Graph nodes N5, N6 operate as sink nodes to terminate analytical processing of the data flows and transmit the resultant data to one or more destinations, such as analytics service control node(s) 25 that initiated the operations via DFG 40, local storage 43, storage nodes 12 and/or 15, data sources 19 or even directly to analytics tools 23.

The following table provides an example set of defined graph node types for one implementation of data flow graph 40:

| Node Type | Config | In Degree | Out Degree | Description |
|---|---|---|---|---|
| Extract | Table, Column | 0 or 1 | 1 | Extract data from data source at the specified Table & Column; perform decryption, decompression and any necessary decoding; output a data flow serializing the extracted data |
| Filter | LHS Column RHS Value | 1 | 1 | Apply regular expression hardware accelerators and other DPU components to perform pattern matching on data streams for counting and evaluating expression |
| Shuffle | Input interface for endpoint where the horizontal partition is available (can be PCIe/Ethernet etc.) | 1 | N | Operates to receive a packet flow representing a set of rows from a data source (which may be a horizontal partition of a larger set), extracts data from one or more columns within the set of rows and outputs the extracted column data as respective data streams to one or more other nodes (e.g., Receive nodes for local processing or Transmit nodes for remote processing). |
| Transmit | Output Interface | 1 | 0 | Operates as a sink node to receive an input data flow (e.g., results) and transmit the data as an output data flow to the defined interface, such as PCIe, Ethernet, display |

-continued

| Node Type | Config | In Degree | Out Degree | Description |
|---|---|---|---|---|
| HashAggregate | Function | 1 | 1 | Apply a GroupBy operation that applies a function to two or more input stream of data to produce an output stream of data containing aggregate values for values represented in the input streams |
| Sequence | From value, To value, By (increment), Data type | 0 | 1 | Generate and output a data flow having a sequence of data values starting at 'From' ending at 'To' using the defined increment 'By' where the values are of the defined data type |
| Limit | Maximum | 1 | 1 | Operate on an input data flow to produce an output data flow that sends a 'Maximum' number of the incoming data elements followed by an End of File |
| Receive | Input Interface, Table, Column from which to extract data | 1 | 0 | Operate as a sink node to receive an input data flow, invoke accelerators to perform and specified encryption, compression and any necessary encoding, and store the resultant data flow within storage | where Node Type represents the defined type, Config represents configuration parameters that can be defined by analytics service control node(s) 25 for nodes of the respective type, In Degree represents the permissible number of input data flows to nodes of the given type, Out Degree represents the expected number of output data flows produced by nodes of the given type and Description describes the overall operation for nodes of that type.

As shown in the above example node types, in-degree is the number of incoming edges and out-degree is the number of outgoing edges. As one example, Filter nodes have both in-degree and out-degree of 1, i.e., filter nodes receive input packets on only one in-coming edge, filter them and send matching row numbers on only one out-going edge. As another example, Extract nodes can have in-degree of 0 or 1 and out-degree of 1. If an Extract node has no incoming edge, i.e., all=true, then the DPU performs operations to extract the entire column. If it has one in-coming edge, i.e., all=false, then the DPU extracts only the row numbers coming on the in-coming edge and sends out the data on the out-going edge.

As noted above, the HashAggregate node type causes the DPU to apply a GroupBy operation that applies a function to two or more input stream of data to produce an output stream of data containing aggregate values for values represented in the input streams. The HashAggregate node type has in-degree of 'n' where n>=2 and out-degree of 1. For example, if a particular HashAggregate node has in-degree of 2 and the values coming on edge '1' are "steve art art steve . . . " and the values coming on the other edge '2' are "10 20 25 15 . . . ". Assuming the aggregate function configured for HashAggregate node is "Sum", then HashAggregate node generates and outputs a data stream conveying the following hash table:

'Steve'→10+15+ . . .
'Art'→20+25+ . . .

In this way, wherever a data unit value of "Steve" is on one edge, the corresponding value from other edge is added to the summation total for that value. Similarly, wherever a data unit value of "art" is on one edge, the corresponding value from other edge is added to the summation total for that value. Once an end of file (EOF) on the in-coming data stream is received, the DPU sends the hash table as the output data flow represented by the out-going edge of the data flow graph.

In one example approach, one of the graph node types, such as, e.g., the Filter node type, includes a field indicating if a DFA engine should ignore the last N fields of the payload. In one such approach, the field includes an entry that indicates that the arc slot is to be considered a default arc. When present, a DFA engine in the DPU 17 moves to the next graph node after consuming a pre-defined number of payload bytes or fields. In one example approach, a node label corresponding to the node executing the default arc includes the number of payload data units to skip. In one example approach, an NFA default arc provides a similar function.

Figure 4:
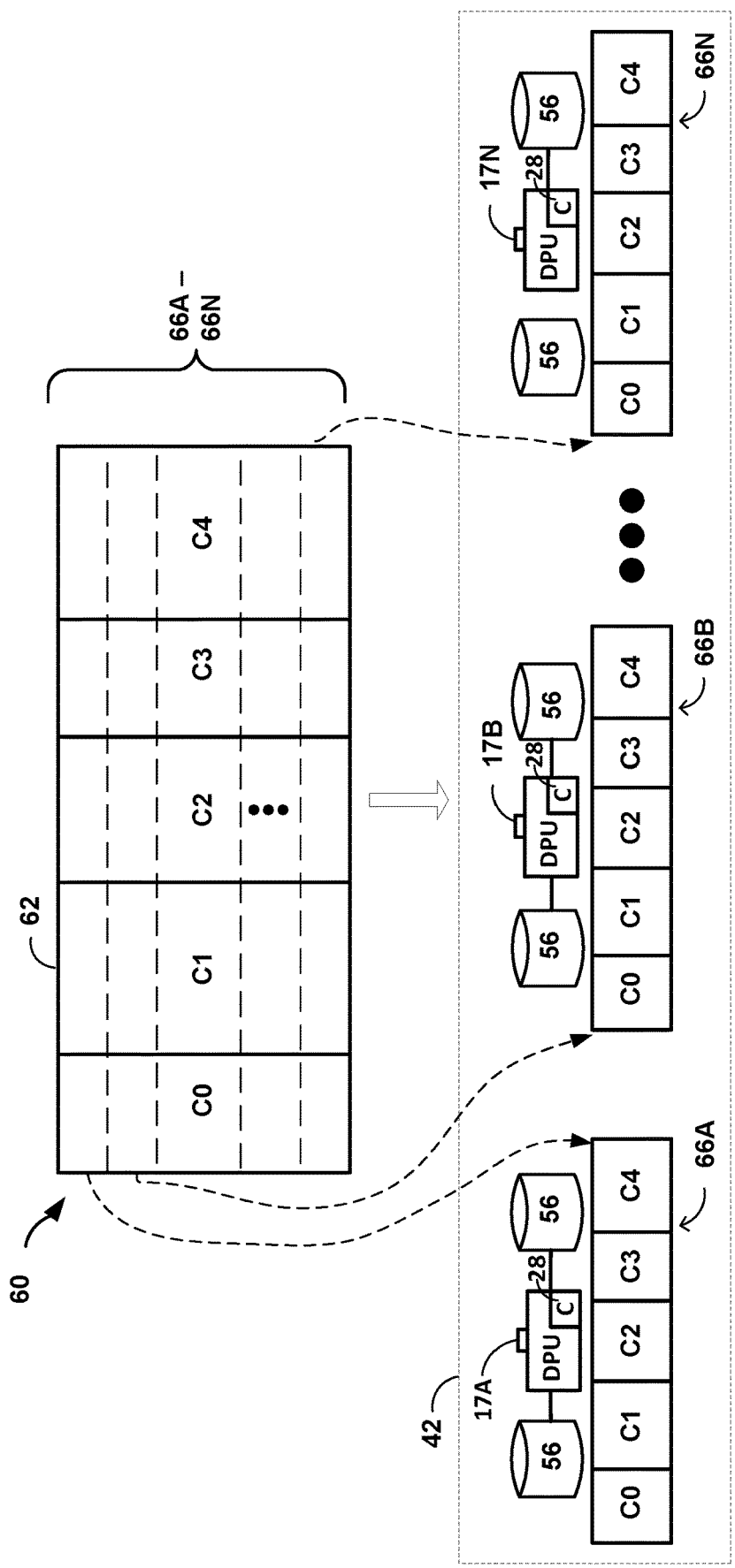
FIG. 4 is a block diagram showing example data ingestion by DPUs when extracting data from data sources and storing the data to local or network storage.

FIG. 4 is a block diagram showing example data ingestion by DPUs 17A-17N when extracting data from data sources 19 and storing to storage 56, which may represent any of storage 12, 15, 43, or 45. In this example, DPUs 17 of cluster 42 have been instructed to extract and ingest table 60 from data sources 19, where table 60 includes five columns 62 of data (labeled "C0-C4"). In the example shown in FIG. 4, columns C0-C4 may each be of a different width, reflecting the size of the field(s) within each column.

In the example shown in FIG. 4, analytics service control node 25 has directed DPUs 17 (e.g., by way of a data flow graph) to horizontally partition table 60 into a plurality of shards 66A-66N and assigned each of DPUs 17A-17N a different one of the shards.

In this example, software executing on each of DPUs 17 configures the respective DPU to ingest and store a partial table in column format such that table 60 is effectively distributed across the compute nodes 13 of cluster 42, where one or more of the columns 62 (C1 in this example) functions as a distribution key for which the data is ingested and stored in sorted order. As described, during the data ingestion operations, DPUs 17 may apply various hardware and/or software accelerated operations to the data when storing the data to storage 56, such as compression, encryption, encoding or other operations. Moreover, as further described below, DPUs may store the data in a logical tree-like format such that the column data of each of columns C0-C5 is indexed by row numbers with respect to the distribution key for fast and efficient identification of relevant rows during query execution without needing to decrypt, decode and/or decompress blocks of column data that do not satisfy the query. Although described with respect to a single table 60, multiple tables may be sharded and ingested by DPUs 17 in parallel in a similar manner.

Figure 5:
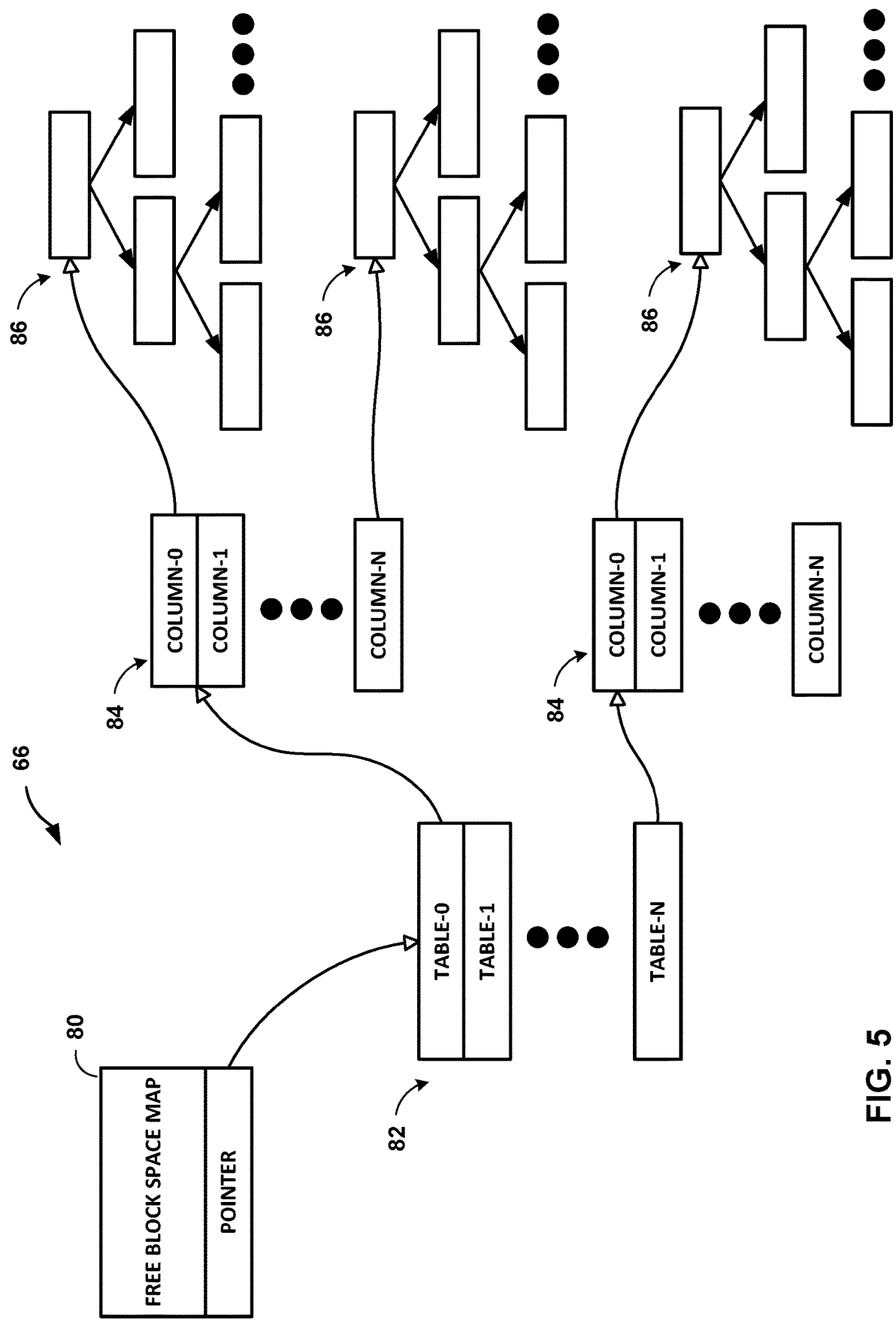
FIG. 5 is a block diagram illustrating an example on-disk format for data shards upon ingestion and storage by the DPUs on storage.

FIG. 5 is a block diagram illustrating an example on-disk format for data shards 66 upon ingestion and storage by DPUs 17 to storage 56. In this example format, DPUs 17 write each data shard 66 (e.g., data shard 66A) to disk in a tree-like structure having a root node 80 storing meta data defining free data blocks on the storage device. As shown, root node 80 points to a first level of storing table pointers 82, where each of the table pointer points to a set of column pointers 84 of a second level. In turn, each of the column pointers 84 points to a column structure 86 for storing the data of the respective column, where each column structure 86 is formed as a sub-tree storing meta data (see FIG. 6) that indexes the row of the column with respect to the distribution key for fast and efficient identification of relevant rows during query execution. As such, the underlying data horizontal partition (shard) of data stored via a DPU 17 for a given column need only be decompressed/decrypted/decoded after determining the data is relevant for performing the requested analytical operation, e.g., query.

Figure 6:
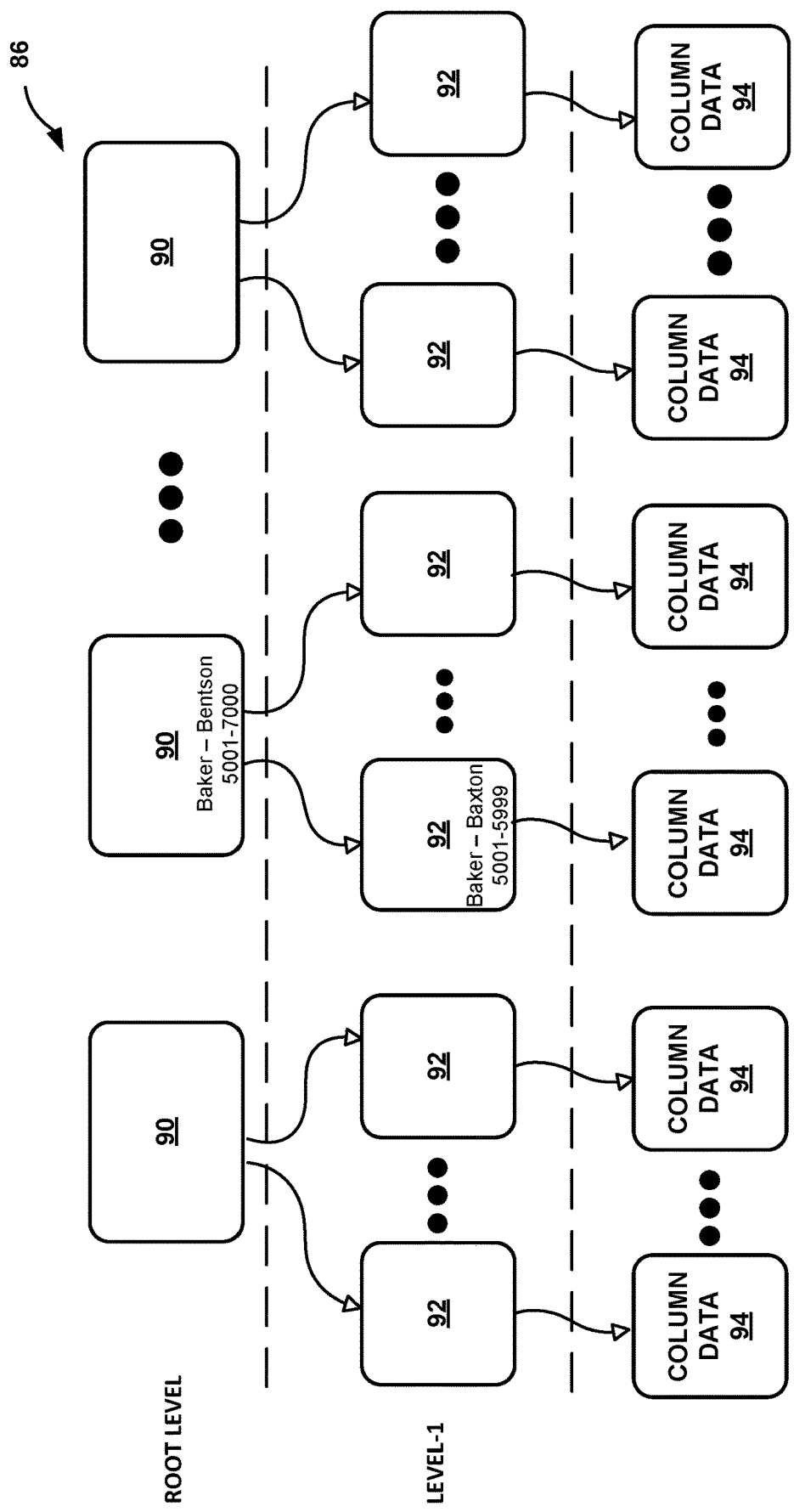
FIG. 6 is block diagram illustrating in further detail an example of a column structure, which is a sub-tree of an overall structure used to store column data for a partial table (data shards) in compress, indexed format.

FIG. 6 is block diagram illustrating in further detail an example of column structure 86, which is a sub-tree of the overall structure used to store column data for a partial table (data shards 66) in indexed format, where each block of column data may be stored in clear text, compressed, encrypted and/or encoded format.

In this example, column structure 86 includes a root level having a plurality of logical block address (LBA) nodes 90. Each LBA node 90 of the root level specifies one or more logical block addresses (shown as arrows) that each identifies one of a plurality of first level ('level 1') LBA nodes 92. In turn, each LBA node 92 points to a logical block address (also shown as an arrow) for a respective column data block 94 of column data stored on the storage unit. In this way, LBA nodes 92 store the logical block addresses of an overall address space used to store the underlying column data block 94 within the physical storage area (e.g., sectors) of one or more storage devices. As shown, each of the root level of LBA nodes 90 points to one or more first level of LBA nodes 92. Each of the first level of LBA nodes 92 points to a respective column data block 94 of the column data written to the storage device(s). In one example, column data blocks 94 are written to the storage device such that the column data is in a sorted order within the logical block address space, and each of the root level LBA nodes 90 and first level of LBA nodes 92 may be are arranged on within tree-like column structure 86 in an order that corresponds to the sorted order for the blocks of column data.

Each column data block 94 represents column data written to the storage unit by DPU 17 upon ingesting the data from data sources for analytical processing. While ingesting the data, DPU 17 may perform one or more hardware accelerated operations on the data such that each column data block 94 may be compressed and/or encoded for conserving storage space, encrypted for security and the like. For example, in some environments, column data block 94 may store millions or even hundreds of millions of data values in compressed format.

By walking the column structure 86 as a data structure tree stored on the storage unit, DPU 17 can effectively "seek" into the compressed column data block 94 without unnecessary decompressing, decoding and/or decrypting data that is not relevant for satisfying a desired analytical operation. In particular, in some examples, each of first level LBA nodes 92 contains index information for the row values stored with the respective column data block 94 identified by the LBA node. Similarly, each of root level LBA nodes 90 contains index information for the row values stored with the set of column data blocks 94 for the set of level 1 LBA nodes 92 identified by the root level LBA node 90. In some examples, each of root level LBA nodes 90 and/or level 1 LBA nodes 92 include Bloom filters that identify undefined (i.e., invalid) data field ranges within the column of data.

Example index information includes: (1) a data begin value and/or a data end value when the column is sorted, such as "Sampson" and "Smith" for column data of last names, and (2) a starting row number and/or an ending row number which identify the range of rows for the partial table (shard) stored within the particular column data block 94, such as row 501 through row 1,000. In this example, LBA nodes 90 of the root level may include index information that specifies the range of data values (e.g., 'Baker' through 'Bentson') or range of rows numbers (e.g., 5001-7000) associated with the set of LBA nodes 92 pointed to by the respective LBA node 90, and each of LBA nodes 92 includes index information that specifies a range of data values (e.g., 'Baker' through 'Baxton') and/or range of row numbers (e.g., 5001-5999) for the underlying column data block referenced by the LBA node 92. In this information, an LBA node 90 includes index information 'Baker-Bentson' and/or '5001-7000' indicating that the set of LBA nodes 92 associated with the LBA node includes column data for all records from Baker through Bentson (rows 5001-7000) of the column. Moreover, as shown, an LBA node 92 of the set include index information 'Baker-Baxton' and/or '5001-5999' indicating that the column data block 94 identified by the LBA node stores column data for all records from Baker through Baxton (rows 5001-5999).

As such, DPU 17 may traverse the root level and/or level-1 of column structure 86 to identify, based on the index information, the column data blocks 92 necessary to retrieve for satisfying a desired query operation without first having to decompress, decrypt and/or decode each the column data of each column data block. Each of LBA nodes 90, 92 may also store compression information, such as Bloom filter information specifying the "holes" within the data of column data blocks 94 when compressed by DPU 17. That is, when retrieving data for an analytical operation (e.g., executing a query), such as selecting specific data values for rows of a column within a certain range of values (e.g., sales people with sales between $50,000 and $100,000), DPU 17 can efficiently traverse column structure 86 by accessing root level LBA nodes 90 to identify one or more LBA nodes 90 having index information (e.g., data begin and data end values) relevant to the query, i.e., a range that overlaps or subsumes the desired data values. DPU 17 then traverses level 1 LBA nodes 92 to further refine the results to identify one or more LBA nodes 92 having index information (e.g., data begin and data end values) relevant to the query. DPU 17 decompresses, decrypts and/or decodes column block data 94 for only those blocks of data that are relevant to the query, thereby reducing computational resources and access time when performing the analytics.

Figure 7:
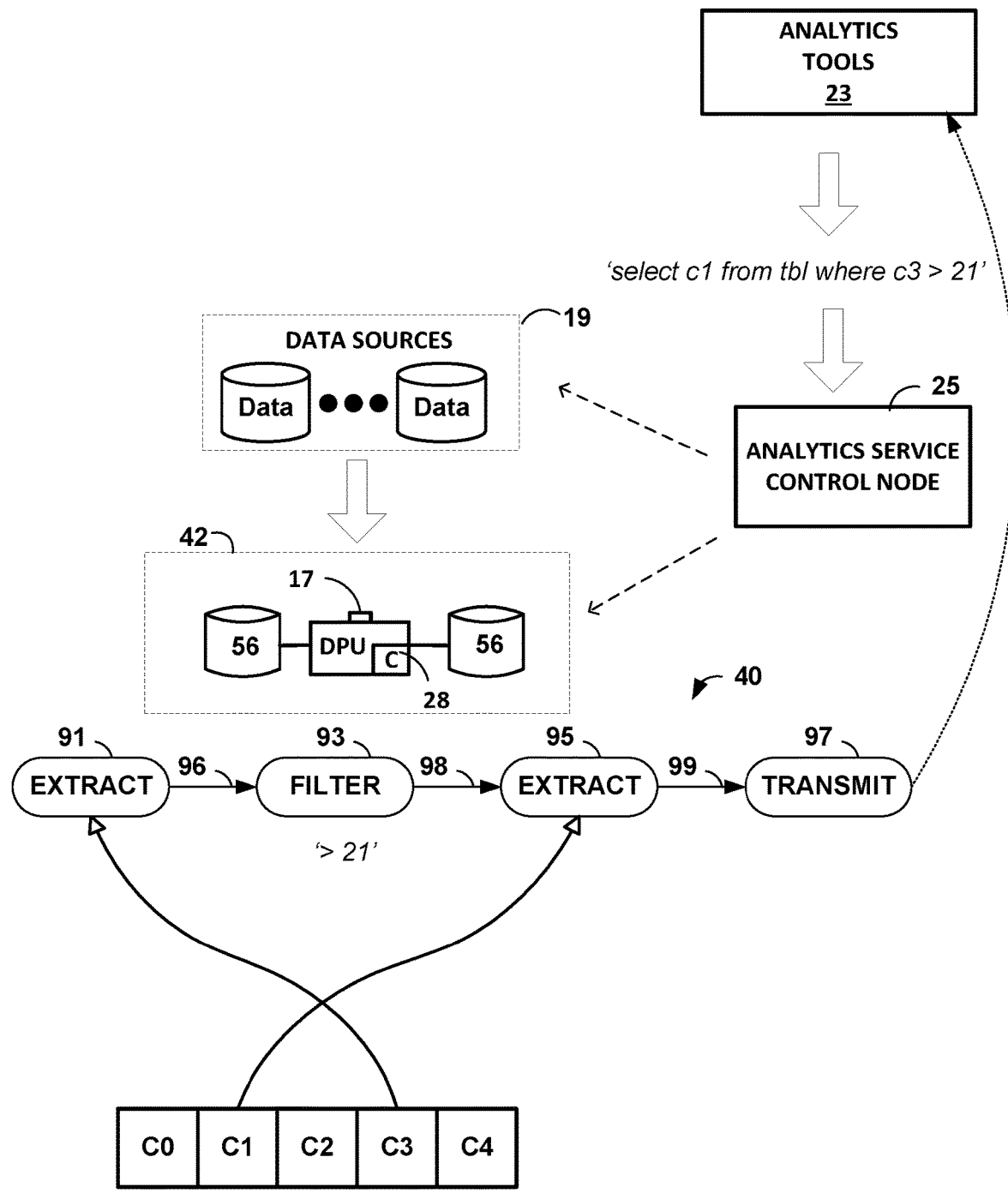
FIG. 7 is a block diagram illustrating an example execution of a data flow graph by one or more DPUs.

FIG. 7 is a block diagram illustrating an example execution of a data flow graph by one or more DPUs 17. In this example, analytics interface 35 (FIG. 2) of analytics service control node 25 receives a query from analytics tools 23. In response, query compiler 39 processes the query to generate data flow graph 40 as a graphic description for the query, where DFG 40 includes, in this example, four graph nodes: EXTRACT 91, FILTER 93, EXTRACT 95 and TRANSMIT 97 for executing the query on one or more DPUs 17. In particular, query execution controller 33 selects one or more DPUs of cluster 42 for executing the query described by DFG 40 in accordance with the techniques described herein.

As shown, DPUs 17 have already ingested column data from a data source 19 as directed by data ingestion engine 31, storing the column data in one of the storages 56, where the example table TBL includes five columns C0-C4. EXTRACT graph node 91 directs DPUs 17 to retrieve column data for column C3 from storage 56, where in some examples the column data has been written to the storage by DPUs 17 in the format described above with respect FIGS. 4-6. In one example approach, DPUs 17 are configured to efficiently process streams of data units (e.g., sequences of values, network packets, storage packets), as further described below. In addition, in some example approaches, DPUs 17 are configured to accelerate the loading of data to the DPU 17. As a result of the operations, DPUs 17 produce (e.g., store internally) data flow 96 of stream data units, where each data unit may contain a data value and/or a row identifier specifying the particular row within column C3 for the data value.

Next, FILTER graph node 93 in DFG 40 directs DPUs 17 to perform a filtering operation on data flow 96 to produce data flow 98 of data units, where data flow 98 includes data units having data values and row identifiers of column C3 for the data values of column C3 having a value greater than 21. In some examples, DPUs 17 perform the filtering operation by pattern matching making use of hardware-based regular expression accelerators operable on deterministic and non-deterministic finite automata (DFAs and NFAs). Further examples of data processing units (DPUs) having regular expression hardware units are described in U.S. patent application Ser. Nos. 16/035,416, 16/035,478, 16/035,457 and 16/035,444, each of which is incorporated herein by reference.

EXTRACT graph node 95 directs DPUs 17 to retrieve data for column C1 from storage 56 for those rows specified by the row identifiers within data flow 98. That is, when operating according to EXTRACT graph node 95, DPUs 17 operate on data flow 98 as an input data stream to produce data flow 99 as an output data stream, where the data units of data flow 99 include data values and row identifiers of column C1 where, for the same row, the data value for column C3>21. TRANSMIT graph node 97 represents a sink node in DFG 40 and directs DPUs 17 to receive data flow 99 as an input data flow and to transmit the data as an output data flow to a defined interface, such as PCIe, Ethernet, display, for storage or presentation, e.g., via analytics tools 23.

Although a single DPU 17 may be used to operate on an entire table or tables of data, in some examples, multiple DPUs 17 may be directed to operate in parallel on respective portions of one or more tables of data. Moreover, when utilizing multiple DPUs 17, stream data units for a given data flow may be directed across the DPUs, such as from a sending DPU to a receiving DPU. This may be beneficial for optimizing execution of more complex queries, such as inner joins across multiple tables that are sharded across storages 56 associated with multiple DPUs 17.

Figure 8:
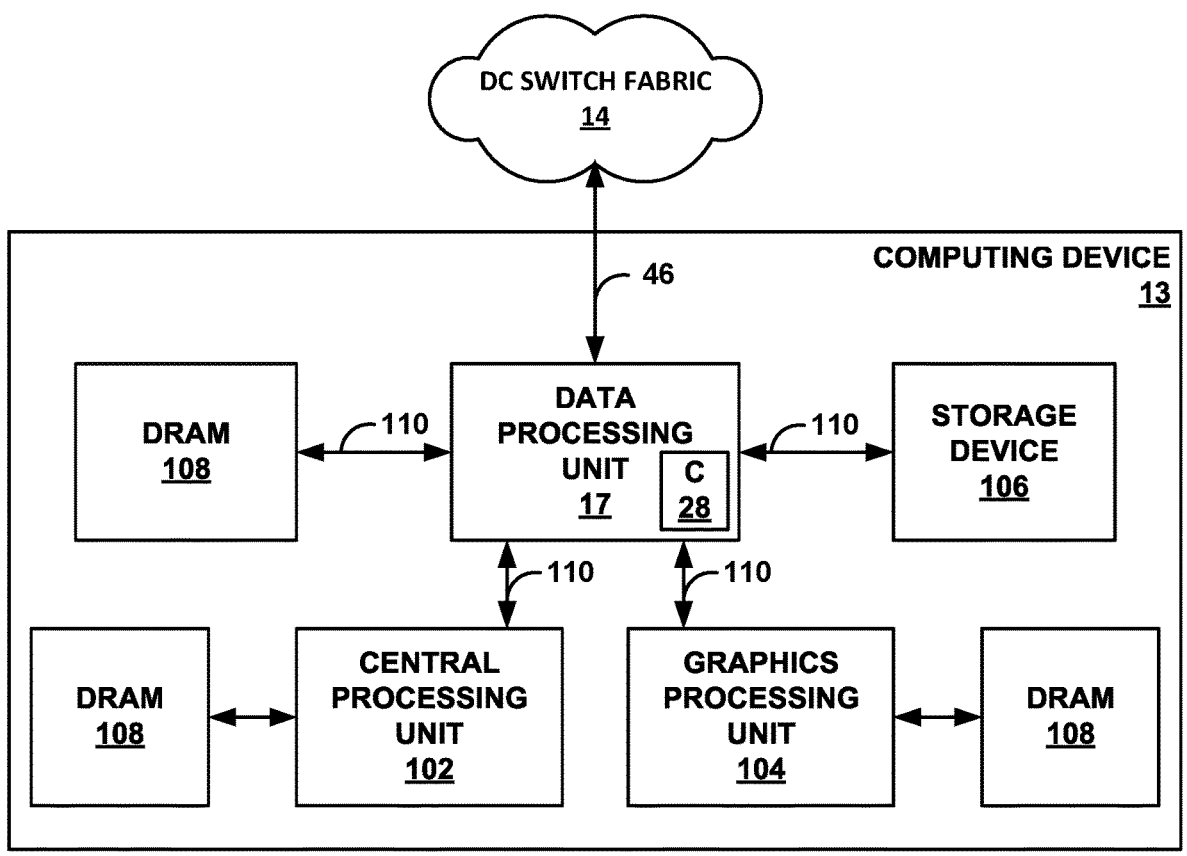
FIG. 8 is a block diagram illustrating an example in which a DPU is incorporated within a computing device 13.

FIG. 8 is a block diagram illustrating an example in which a DPU 17 is incorporated within a computing device 13. In this example, DPU 17 is configured according to the techniques of this disclosure and communicatively coupled to a central processing unit 102. As examples, computing device 13 may represent a workstation computer, a server, blade computing device or the like.

In general, DPU 17 operates as a new type of processor separate from any CPU or GPU of computing device 13. That is, DPU 17 represents and enables a new processing architecture. Unlike conventional compute models that are centered around a central processing unit (CPU), example implementations described herein leverage a DPU that is specially designed and optimized for a data-centric computing model in which the data processing tasks are centered around, and the primary responsibility of the DPU. The DPU may be viewed as a highly programmable, high-performance input/output (I/O) and data-processing hub designed to aggregate and process network and storage I/O to and from multiple other components and/or devices.

In the example of FIG. 8, computing device 13 includes DPU 17, CPU 102, and GPU 104, each of which may have respective and/or shared dynamic random-access memory (DRAM) 108, and storage device 106. DPU 17 is coupled to CPU 102, GPU 104, DRAM 108, and storage device 106 via host interfaces, Peripheral Component Interconnect-Express (PCI-e) buses 110 in this example. DPU 17 also acts as a network interface 46 for computing device 13 to a network, such as DC switch fabric 14. In this way, DPU 17 may be positioned between and communicatively coupled to CPU 102, storage device 106, and GPU 104. Although only one storage device 106 is shown, multiple such storage devices may be included within or coupled to computing device 13 (and DPU 17 may be coupled to each of the storage devices, e.g., via PCI-e buses).

DPU 17 may be configured according to the various techniques of this disclosure. In one example approach, DPU 17 is a highly programmable I/O processor with a plurality of processing cores (as discussed below, e.g., with respect to FIGS. 9-12). Two or more of the processing cores execute a run-to-completion data plane operating system configured to support software functions for performing data processing tasks on behalf of CPU 102, and one or more of the processing cores execute a multi-tasking control plane operating system (as discussed below, e.g., with respect to FIG. 9). In addition, the multi-core processor is equipped with hardware engines that allow CPU 102 to offload various processes, such as counters 28, cryptographic functions, compression, and regular expression processing. In one example approach, DPU 17 includes a network interface subsystem that can form a nexus between various components and devices, e.g., CPU 102, GPU 104, storage device 106, and network devices of network 14.

In the example shown in FIG. 8, DPU 17 provides access between DC switch fabric 14, storage device 106, GPU 104, and CPU 102. In other examples, a DPU such as DPU 17 may aggregate and process network and SSD I/O to multiple server devices including application processors. In this manner, DPU 17 is configured to retrieve data from storage device 106 on behalf of CPU 102, store data to storage device 106 on behalf of CPU 102, and retrieve data from DC switch fabric 14 on behalf of CPU 102. Furthermore, DPU 17 is also configured to send offloaded processing tasks (e.g., graphics intensive processing tasks, or other tasks that may benefit from the highly parallel processing nature of a graphics processing unit) to GPU 104, to receive output for the offloaded processing tasks from GPU 104, and to provide the output for the offloaded processing tasks to CPU 102.

In general, software programs executable on CPU 102 perform instructions to offload some or all data-intensive processing tasks associated with the software program to DPU 17. Each of the processing cores of DPU 17 may be programmable using a high-level programming language, e.g., C, C++, or the like. In general, the various hardware implementations of processes provided by DPU 17 may be associated with software libraries in the high-level programming language that may be utilized to construct software applications for execution by CPU 102 that, by way of the host interfaces, invoke and leverage the functionality of DPU 17. Thus, a programmer can write a software program in the programming language and use function or procedure calls associated with the hardware implementations of various processes of DPU 17 to perform these functions, and when CPU 102 executes the software program, CPU 102 offloads performance of these functions/procedures to DPU 17.

Additionally, or alternatively, CPU 102 may offload other software procedures or functions to DPU 17 to be executed by processing cores of DPU 17. Furthermore, CPU 102 may offload software procedures or functions to GPU 104 via DPU 17 (e.g., computer graphics processes). In this manner, DPU 17 represents a dynamically programmable processing unit that can execute software instructions, as well as provide hardware implementations of various procedures or functions for data-processing tasks, which may improve performance of these procedures or functions. Further example details of DPU 17 are described in patent application Ser. No. 16/031,945, filed Jul. 10, 2018, entitled "DATA PROCESSING UNIT FOR STREAM PROCESSING," the entire content of which is incorporated herein by reference.

In one example approach, the hardware and software architectures of the DPU are optimized for high performance and high efficiency stream processing. A stream is defined as an ordered, unidirectional sequence of computational objects (referred to herein as stream data units generally or, as a specific example, data packets of a packet flow) that can be of unbounded or undetermined length. In a simple example, a stream originates in a producer and terminates at a consumer, and is operated on sequentially. In some examples, a stream can be defined as a sequence of stream fragments; each stream fragment including a memory block contiguously addressable in physical address space, an offset into that block, and a valid length. Streams can be discrete, such as a sequence of packets received from the network, or continuous, such as a stream of bytes read from a storage device. A stream of one type may be transformed into another type as a result of processing. Independent of the stream type, stream manipulation requires efficient fragment manipulation.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within a DPU can safely access different windows within the stream.

As described herein, processing of stream information may be associated with a "work unit." A work unit (WU) is a container that is associated with a stream state and used to describe (i.e., point to) data within a stream (stored in memory) along with any associated meta-data and operations to be performed on the data. Work units may dynamically originate within a peripheral unit of a DPU (e.g. injected by a networking unit, a host unit, or a storage device interface) or within a processor of the DPU in association with one or more streams of data, and terminate at another peripheral unit or another processor of the DPU. Stream processing is typically initiated as a result of receiving one or more work units associated with respective portions of the stream, e.g., one or more stream data units or data packets of a packet flow.

A work unit may represent a fixed length data structure including an action value and one or more arguments. In one example, a work unit includes four words, a first word having a value representing an action value and three additional words each representing an argument. The action value may be considered a work unit header containing information necessary for message delivery and information used for work unit execution. More specifically, the action value of a work unit specifies a software function (also referred to as an event handler or work unit (WU) handler) for processing the one or more stream data units associated with the work unit, and specifies source and destination processing cores for executing the software function. The other arguments of the work unit data structure may include a frame argument having a value acting as a pointer to a continuation work unit to invoke a subsequent WU handler, a flow argument having a value acting as a pointer to state that is relevant to the WU handler, and a stream data unit argument having a value acting as a pointer to the associated stream data units.

A data structure referred to as a work unit (WU) stack may be used in the multi-core processor system of the DPU to more readily manage and utilize an event driven, run-to-completion programming model of an operating system executed by the DPU. The WU data structure is a building block in the WU stack and can readily be used to compose a processing pipeline and services execution in the multi-core processor system of the DPU. The WU stack structure carries state, memory, and other information in auxiliary variables external to the instruction stack for any given processor core.

More details on work units, work unit stacks, and stream processing by data processing units are available in U.S. patent application Ser. No. 16/197,179, filed Nov. 20, 2018, entitled "Work Unit Stack Data Structures in Multiple Core Processor System for Stream Data Processing,", and U.S. patent application Ser. No. 15/949,692, entitled "Efficient Work Unit Processing in a Multicore System,", filed Apr. 10, 2018, the entire content of each of which is incorporated herein by reference.

In one example approach, computing device 13 leverages the data stream processing architecture of DPU 17 so as to enable the computing device to participate in high-speed analytics operations on large volumes of data. As explained herein, in this particular example, computing device 13 may participate in a cluster of DPU-enhanced compute nodes and/or storage nodes to utilize the data specialized stream processing functions of DPU 17 to provide accelerated, hardware-assisted processing of queries for data ingestion and processing to perform analytical operations.

Figure 9:
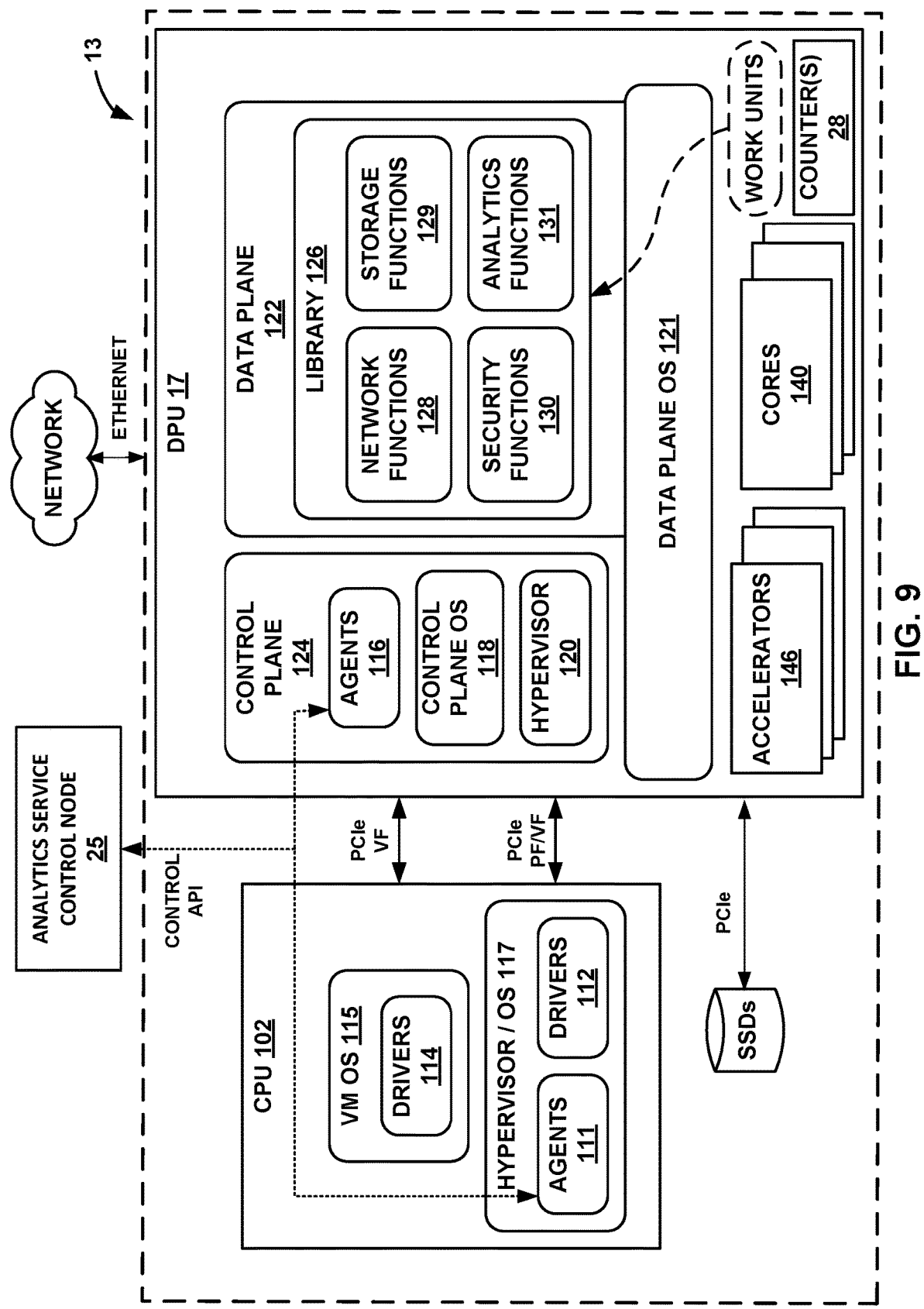
FIG. 9 is a block diagram illustrating in further detail an example computing device having a data processing unit (DPU) including a run-to-completion data plane operating system (OS) configured to process work units for performing analytical operations using, in some instances, hardware accelerators of the DPU.

FIG. 9 is a block diagram illustrating in further detail an example computing device 13 having a data processing unit (DPU) 17 including a run-to-completion data plane operating system (OS) 121 configured to process work units, in accordance with the techniques of this disclosure. In the illustrated example of FIG. 9, computing device 13 also includes CPU 102 communicatively coupled to DPU 17. Each of DPU 17 and CPU 102 generally represents a hardware chip implemented in digital logic circuitry. In some alternative examples, DPU 17 and CPU 102 may be hosted in separate devices.

DPU 17 is a highly programmable I/O processor with a plurality of processing cores (as discussed below). In the illustrated example, DPU 17 includes a network interface (e.g., an Ethernet interface) to connect directly to a network, and a plurality of host interfaces (e.g., PCI-e interfaces) to connect directly to one or more application processors (e.g., CPU 102) and one or more storage devices (e.g., SSDs). DPU 17 also includes a run-to-completion data plane operating system (OS) 121 executing on two or more of the plurality of processing cores. Data plane OS 121 provides data plane 122 as an execution environment for a run-to-completion software function invoked on data plane OS 121 to process a work unit. As described above, the work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 126 provided by data plane OS 121. In the illustrated example, library 126 includes network functions 128, storage functions 129, security functions 130, and analytics functions 131. Network functions 128 may, for example, include network I/O data processing functions related to Ethernet, network overlays, networking protocols, encryption, and firewalls. Storage functions 129 may, for example, include storage I/O data processing functions related to NVME (non-volatile memory express), compression, encryption, replication, erasure coding, and pooling. Security functions 130 may, for example, include security data processing functions related to encryption, regular expression processing, and hash processing. Analytics functions 131 may, for example, include analytical data processing functions related to a customizable pipeline of data transformations.

In general, data plane OS 121 is a low level, run-to-completion operating system running on bare metal of DPU 17 that runs hardware threads for data processing and manages work units. As described in more detail below, data plane OS 121 includes the logic of a queue manager to manage work unit interfaces, enqueue and dequeue work units from queues, and invoke a software function specified by a work unit on a processing core specified by the work unit. In the run-to-completion programming model, data plane OS 121 is configured to dequeue a work unit from a queue, process the work unit on the processing core, and return the results of processing the work unit to the queues.

DPU 17 also includes a multi-tasking control plane operating system executing on one or more of the plurality of processing cores. In some examples, the multi-tasking control plane operating system may comprise Linux, Unix, or a special-purpose operating system. In some examples, as illustrated in FIG. 9, data plane OS 121 provides a control plane 124 including a control plane software stack executing on data plane OS 121. As illustrated, the control plane software stack includes a hypervisor 120, a multi-tasking control plane OS 118 executing on hypervisor 120, and one or more control plane service agents 116 executing on control plane OS 118. Hypervisor 120 may operate to isolate control plane OS 118 from the work unit and data processing performed on data plane OS 121. Control plane service agents 116 executing on control plane OS 118 comprise application level software configured to perform set up and tear down of software structures to support work unit processing performed by the software function executing on data plane OS 121. In the example of data packet processing, control plane service agents 116 are configured to set up the packet flow for data packet processing by the software function on data plane OS 121, and tear down the packet flow once the packet processing is complete. In this way, DPU 17 comprises a highly programmable processor that can run application level processing while leveraging the underlying work unit data structure for highly parallelized stream processing.

In another example, instead of running on top of data plane OS 121, the multi-tasking control plane operating system may run on one or more independent processing cores that are dedicated to the control plane operating system and different than the processing cores executing data plane OS 121. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

CPU 102 is an application processor with one or more processing cores optimized for computing-intensive tasks. In the illustrated example of FIG. 9, CPU 102 includes a plurality of host interfaces (e.g., PCI-e interfaces) to connect directly to DPU 17. CPU 102 includes a hypervisor/OS 117 that supports one or more service agents 111 and one or more drivers 112. As illustrated in FIG. 9, CPU 102 may also include a virtual machine (VM) OS 115 executing on top of hypervisor/OS 117 that supports one or more drivers 114. Application level software, such as agents 110 or drivers 112 executing on OS 117 or drivers 114 executing on VM OS 115, of CPU 102 may determine which data processing tasks to offload from CPU 102 to DPU 17. For example, hypervisor/OS 117 of CPU 102 may offload data processing tasks to DPU 17 using physical functions (PFs) and/or virtual functions (VFs) of PCIe links. VM OS 115 of CPU 102 may offload data processing tasks to DPU 17 using VFs of PCIe links.

In the illustrated example, analytics service control node 25 communicates with any of DPU 17 and/or CPU 102 via a control application programming interface (API). As described herein, analytics service control node 25 may provide a high-level controller for configuring and managing application level software executing on a control plane operating system of each of DPU 17 and CPU 102. For example, control node 25 may configure and manage which data processing tasks are to be offloaded from CPU 102 to DPU 17. As examples, analytics service control node 25 may communicate one or more data flow graphs 40 via the API for parsing and processing by compute device 13 leveraging the specialized data processing software and hardware of DPU 17.

Data plane OS 121 of DPU 17 is configured to receive stream data units for processing. In the example of packet processing, the stream data units may comprise data packets of packet flows as discussed above as represented by edges of a data flow graph. In this example, the received packet flows may include any of networking packet flows, storage packet flows, security packet flow, analytics packet flows, or any combination thereof. Data plane OS 121 executing on one of the processing cores of DPU 17 may receive each of the packet flows in the form of one or more work units from a networking unit, host unit, or another one of the processing cores (as discussed below, e.g., with respect to FIGS. 10-12) of DPU 17. Each of the work units for a received packet flow may be associated with one or more data packets of the packet flow. Upon receipt of the packet flow, data plane OS 121 performs a lookup in a flow table to determine that the packet flow is legitimate, and maps the entire packet flow to one of the processing cores of DPU 17 for serialized processing of the packets of the packet flow. The flow table may comprise a hardware implemented flow table that is updated and maintained with legitimate packet flows by control plane 124, and used to assign processing cores to packet flows.

In the case where the received packet flow is not recognized by data plane OS 121, e.g., the packet flow is not yet set up in the flow table, data plane OS 121 may send the packet flow through the slow path in control plane 124 for set up. Control plane service agents 116 executing on control plane OS 118 then determine that the packet flow is legitimate, and send an instruction to data plane OS 121 to set up the packet flow in the flow table.

Once the packet flow is set up by control plane service agents 116, data plane OS 121 may assign the packet flow to a particular processing core of DPU 17 that perform stream processing for the packet flow. As one example, data plane OS 121 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 121 also provides an interface to one or more counters 28 of DPU 17. Data plane OS 121 may use counters 28, for instance, to count data units within a packet flow. Data plane OS 121 further provides interfaces to one or more hardware accelerators 146 of DPU 17 (as discussed below) configured to perform acceleration for various data processing functions. Data plane OS 121 may use the hardware accelerators to process one or more portions of the packet flow, i.e., one or more work units, arranged as a work unit (WU) stack. In the WU stack, a first work unit includes an identifier of a subsequent work unit within the WU stack for further processing of the packets upon completion of the first work unit. To perform stream processing for the packet flow, a hardware accelerator is configured to perform one or more hardware commands included in the WU stack as input parameters of the first work unit, and upon completion of the one or more hardware commands, proceed to the subsequent work unit within the WU stack identified by the first work unit.

As described herein, the DPU utilizes fine-grain work units, work unit queues, and a queue manager executed on the data plane operating system of each processing core to serialize packet processing such that data packets of a same packet flow are processed by a same processing core. In this way, the DPU is capable of processing any type of packet flow with fine granularity between processing cores and low processing overhead. For comparison, other multi-core systems may communicate using shared memory and locking to ensure coherency in memory. The locking schemes may be an order of magnitude larger grain than the work unit scheme described herein. For example, the processing overhead associated with the work unit scheme is less than 100 clock cycles. Processing overhead may include the number of cycles to implement a work unit and the number of cycles to dequeue and deploy the work unit to a given processing core for processing. Serializing packet processing on the given run-to-completion hardware thread to maintain synchronization, as described herein, results in roughly the same overhead as the locking schemes used in conventional multi-core systems.

In general, a controller (e.g., control hardware and/or software, such as agents 116 having software instructions executing on DPUs 17 and/or agents 110 having software instructions executing on CPU 102), receive the data flow graphs from analytics service control nodes 25 and parse the data flow graphs to identify the graph nodes and arcs defined by the data flow graph, where each graph node represents a set of one or more low-level, high-speed data stream processing operations to be performed by software components and/or hardware accelerators of DPUs 17, and each arc represents a stream of data units either processed by or produced by the DPUs. Upon parsing the received data flow graphs, the control software constructs work units, e.g., in the form of one or more work unit stacks, and configures the DPUs to perform high-speed, chained operations on data flows streaming through the DPU using, for example, data plane software functions (e.g., library 126 of data plane 122) executable by internal processor cores 140 and/or hardware accelerators 146 of the DPU. Accelerators 146 may be invoked by data plane 122 software functions when processing work units to perform hardware-based acceleration for various data-processing functions, such as table lookups, matrix multiplication, cryptography, compression, regular expressions, or the like. For example, accelerators 146 may comprise hardware implementations of lookup engines, matrix multipliers, cryptographic engines, compression engines, regular expression interpreters, or the like.

During operation, DPU 17 executes work units to ingest data into DPU-managed storage according to the data flow graphs received from analytics service control node 25 and to stream data through the DPUs according to data flow graphs for processing with data plane 122 and accelerators 146. Example details of configuring DPU 17 for applying data streams to chains of processing software and hardware are described in U.S. patent application Ser. No. 16/198,607, entitled "SERVICE CHAINING HARDWARE ACCELERATORS WITHIN A DATA STREAM PROCESSING INTEGRATED CIRCUIT, filed Nov. 11, 2018, incorporated herein by reference.

Figure 10:
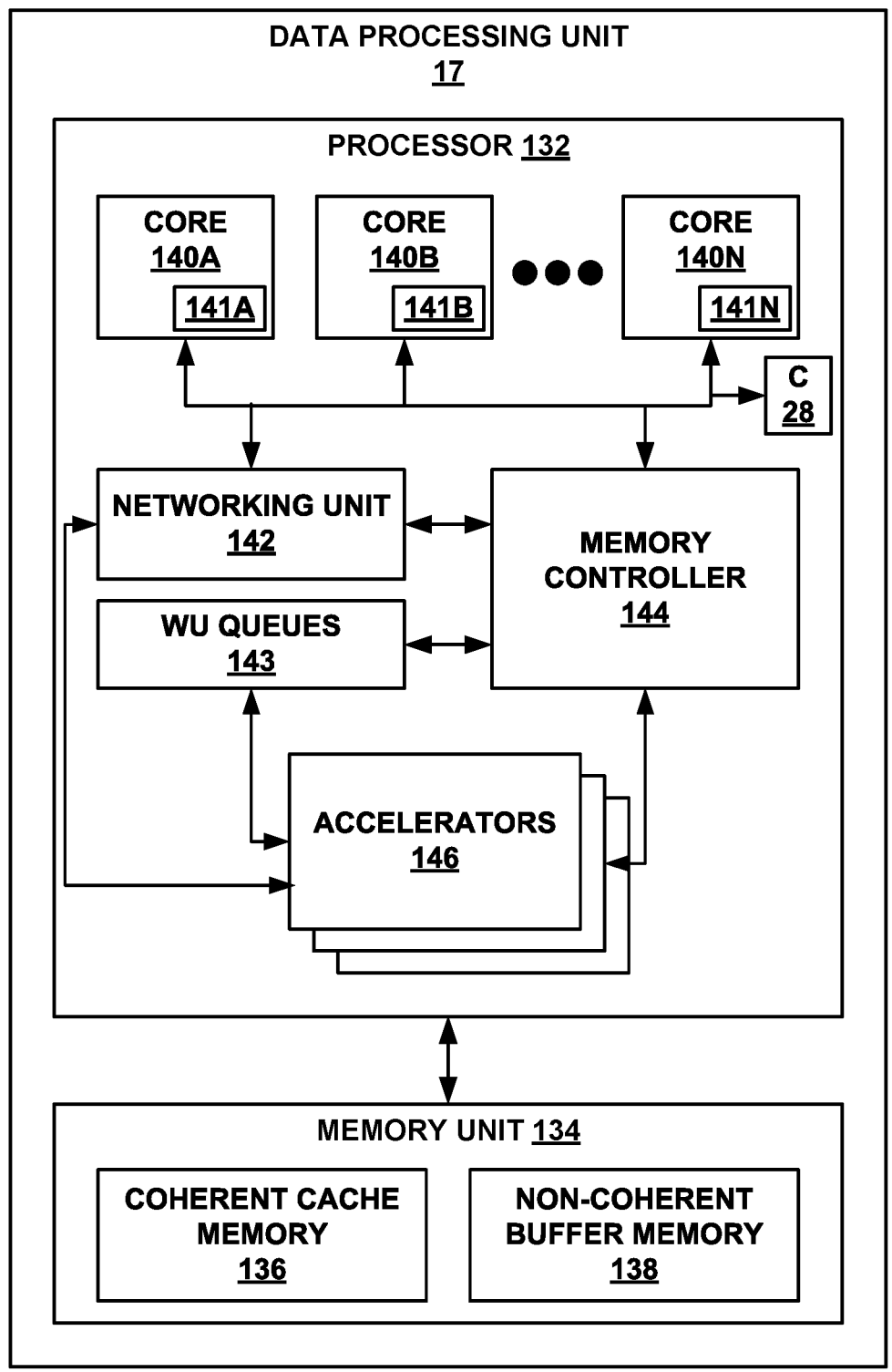
FIGS. 10 and 11 are block diagrams illustrating examples of DPUs.

FIG. 10 is a block diagram illustrating an example data processing unit (DPU) 17 that operates to implement analytical operations by performing data stream processing in accordance with the techniques of this disclosure. That is, a controller (e.g., control hardware and/or software executing on DPUs 17 and/or software executing on CPU 102 or other device), configure DPU 17 in accordance with data flow graphs to perform high-speed, chained operations on data flows streaming through the DPU using, for example, data plane software functions executable by internal processor cores 140 and/or hardware accelerators 146 of the DPU.

In this example, DPU 17 generally represents a hardware chip implemented in digital logic circuitry and may be used in any computing or network device. Thus, DPU 17 may be communicatively coupled to one or more network devices, server devices (e.g., storage servers 12 or compute nodes 13), random access memory, storage media (e.g., solid state drives (SSDs)), a data center fabric (e.g., switch fabric 14), or the like, e.g., via PCI-e, Ethernet (wired or wireless), or other such communication media. Moreover, DPU 17 may be implemented as one or more application-specific integrated circuits (ASICs), may be configurable to operate as a component of a network appliance or may be integrated with other DPUs within a device.

In the illustrated example, DPU 17 includes a multi-core processor 132 having a plurality of programmable processing cores 140A-140N ("cores 140") coupled to a counter 28 and to an on-chip memory unit 134. Each of cores 140 includes a level 1 cache 141 (level 1 caches 141A, 141B, and 141N are associated with cores 140A, 140B, and 140N, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 146. As illustrated in FIG. 10, each of cores 140, networking unit 142, WU queues 143, memory controller 144, memory unit 134, and accelerators 146 are communicatively coupled to each other. Processor 132 of DPU 17 further includes one or more accelerators 146 configured to perform acceleration for various data-processing functions, such as look-ups, matrix multiplication, cryptography, compression, regular expressions, or the like.

In this example, DPU 17 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1. DPU 17 may also include one or more interfaces for connectivity to host devices (e.g., servers) and data storage devices, e.g., solid state drives (SSDs) via PCIe lanes. DPU 17 may further include one or more high bandwidth interfaces for connectivity to off-chip external memory.

Processor 132 further includes accelerators 146 configured to perform acceleration for various data-processing functions, such as look-ups, matrix multiplication, cryptography, compression, regular expressions, or the like. For example, accelerators 146 may comprise hardware implementations of look-up engines, matrix multipliers, cryptographic engines, compression engines, or the like. The functionality of different hardware accelerators is described is more detail below. In one example, at least one of accelerators 146 represents a hardware implementation of a regular expression engine that includes one or more NFA and/or DFA engines configured to execute DFAs/NFA representing regular expressions, as discussed in greater detail below.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. patent application Ser. No. 15/949,892, filed Apr. 10, 2018, and titled "Relay Consistent Memory Management in a Multiple Processor System," the entire content of which is incorporated herein by reference.

Cores 140 may comprise one or more microprocessors without interlocked pipeline stages (MIPS) cores, reduced instruction set computing (RISC) cores, advanced RISC machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 17. The load/store unit may also include logic for flushing cache segments and/or cache lines to non-coherent buffer memory 138 and/or memory external to DPU 17. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141. As described herein, concurrent with execution of work units by cores 140, a load store unit of memory controller 144 may be configured to prefetch, from non-coherent memory 138, data associated with work units within WU queues 143 that are expected to be processed in the future, e.g., the WUs now at the top of the WU queues are next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 11:
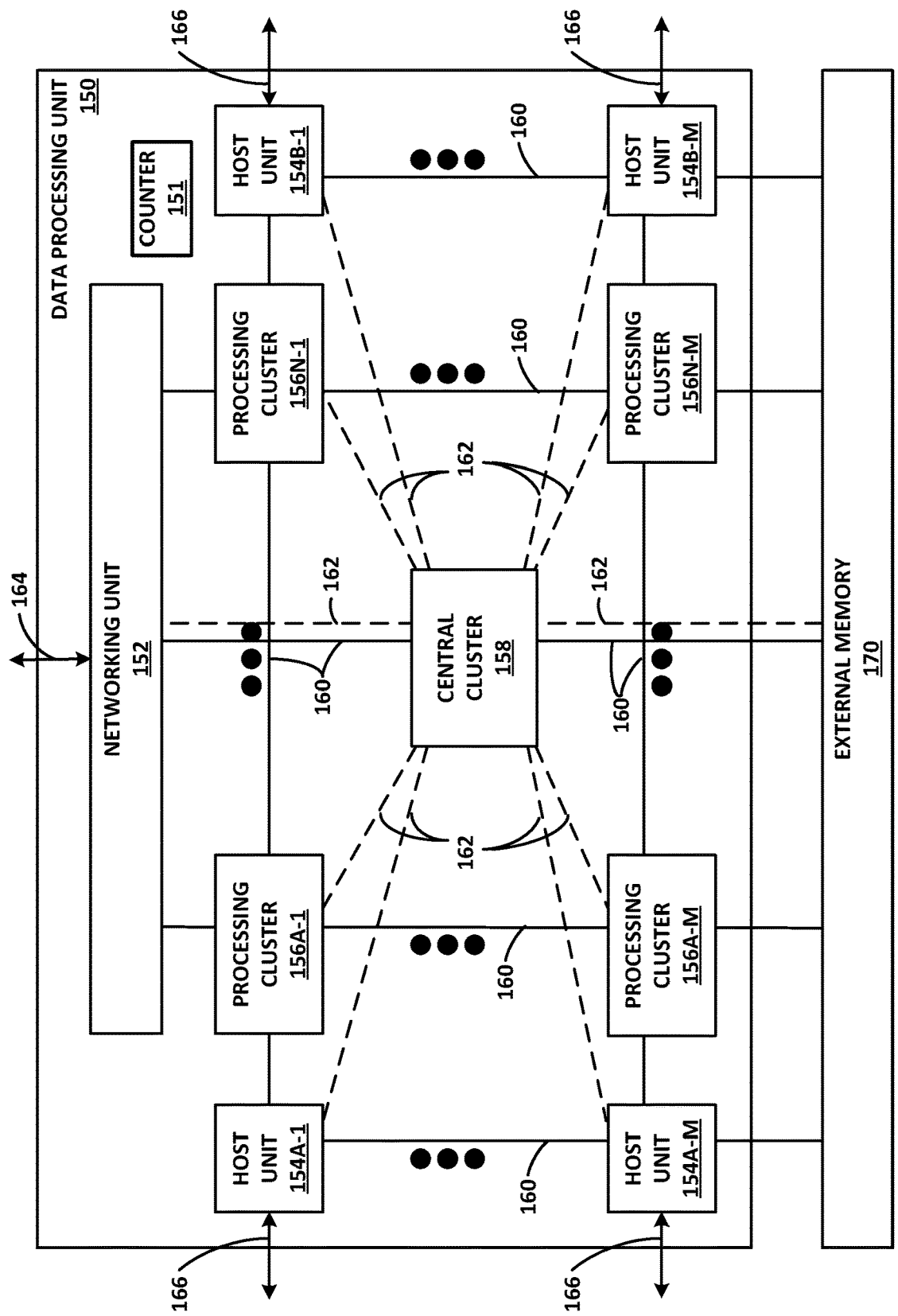

FIG. 11 is a block diagram illustrating another example of a DPU 150 for performing analytical operations as described herein. In this example, DPU 150 includes a networking unit, at least one host unit, and two or more processing clusters. DPU 150 may represent one example of any of DPUs 17 described herein. Thus, DPU 150 may be communicatively coupled to a data center fabric (e.g., switch fabric 14), one or more server devices (e.g., storage nodes 12 and/or compute nodes 13), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 11, DPU 150 includes counter 151, networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random-access memory (DRAM). In some examples, DPU 150 uses counter 151 as a global counter as further described below. In other examples, DPU 150 uses counter 151 to skip bytes in a payload, as further described, for instance, in the default arc discussed below.

As shown, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 156 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. patent application Ser. No. 16/197,179, filed Nov. 20, 2018, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

In this example, the data stream processing architecture of DPU 17 enables high-speed analytics operations to be performed on large volumes of data by operating on data flows, i.e., streams of data units.

Figure 12:
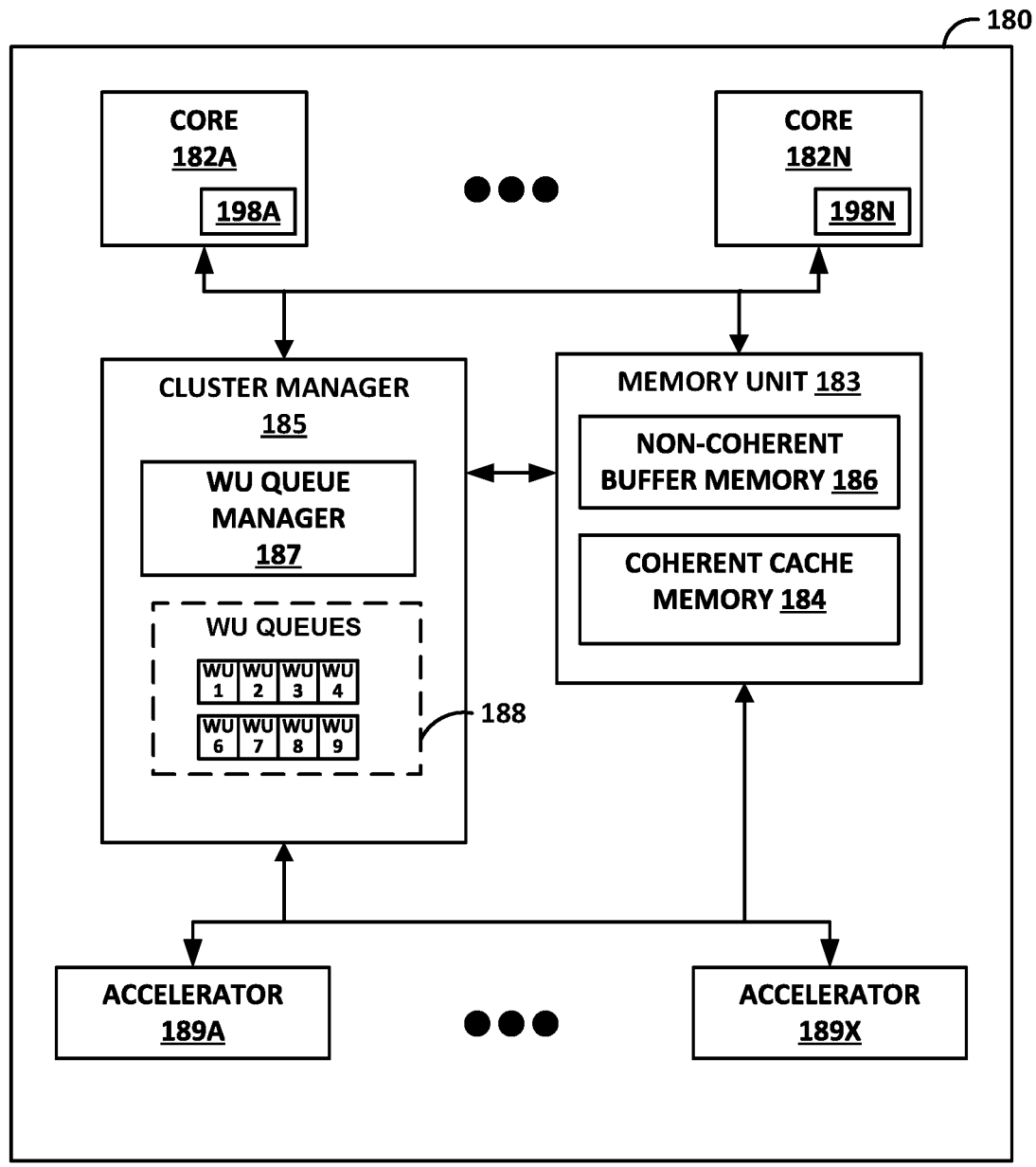
FIG. 12 is a block diagram illustrating an example processing cluster 180 including a plurality of programmable processing cores 182A-182N.

FIG. 12 is a block diagram illustrating an example processing cluster 180 of DPU 150, where each processing cluster includes a plurality of programmable processing cores 182A-182N. Each of processing clusters 156 of DPU 150, for example, may be configured in a manner substantially similar to that shown in FIG. 12. In the example, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182A includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

DPU 150 may support two distinct memory systems: a coherent memory system and a non-coherent buffer memory system. In the example, coherent cache memory 184 represents part of the coherent memory system while non-coherent buffer memory 186 represents part of the non-coherent buffer memory system. Cores 182 may represent the processing cores discussed with respect to DPU 150. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

As noted above, in accordance with the techniques of this disclosure, one or more of accelerators 189 may be configured to evaluate regular expressions for hardware-accelerated analytics operations. A RegEx accelerator of accelerators 189, in accordance with the techniques of this disclosure, may include a hardware implemented DFA engine that executes one or more DFAs constructed according to target regular expressions, i.e., regular expressions to be evaluated as part of a service. That is, the DFA engine of a RegEx accelerator walks one or more DFA graphs to, effectively, compare an input search string to one or more regular expressions, to which the DFA graphs correspond, to determine whether the input search string matches any of the regular expression, as discussed in greater detail below.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 186 and/or external memory 170. Core 182A may first look for the corresponding data in cache 198A, and in the event of a cache miss, may access the data from non-coherent memory 186 and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

In some example embodiments, various implementations of the data processing units (DPUs) described herein include programmable, hardware-based accelerators configured to apply query predicates and other analytical operations by evaluating regular expressions against the high-speed data flows streaming through the DPUs. For example, the DPUs may include hardware-based regular expression (RegEx) accelerators that includes one or more NFA and/or DFA engines configured to evaluate the regular expression against the data streams. As further described herein, rather than executing query predicates on large volumes of data using general purposes processors, the described systems transform analytical queries into DFA and/or NFA representations and leverage the RegEx accelerators of the DPUs for efficiently implementing the query predicates be streaming data through the DPUs and applying regular expression processing to the data streams.

Figure 13:
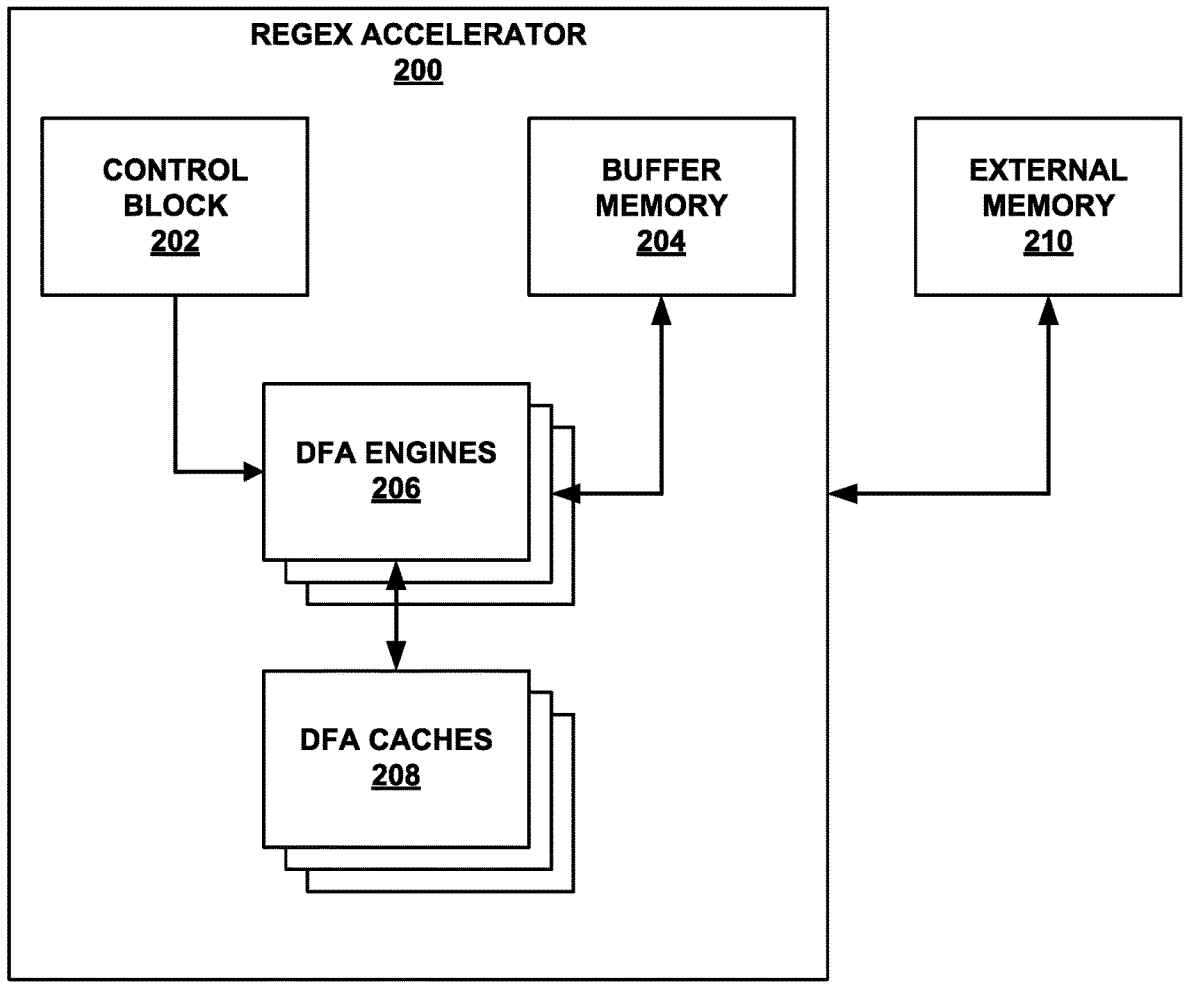
FIGS. 13 and 14 are block diagrams illustrating example regular expression (RegEx) accelerators for DPUs.
Figure 14:
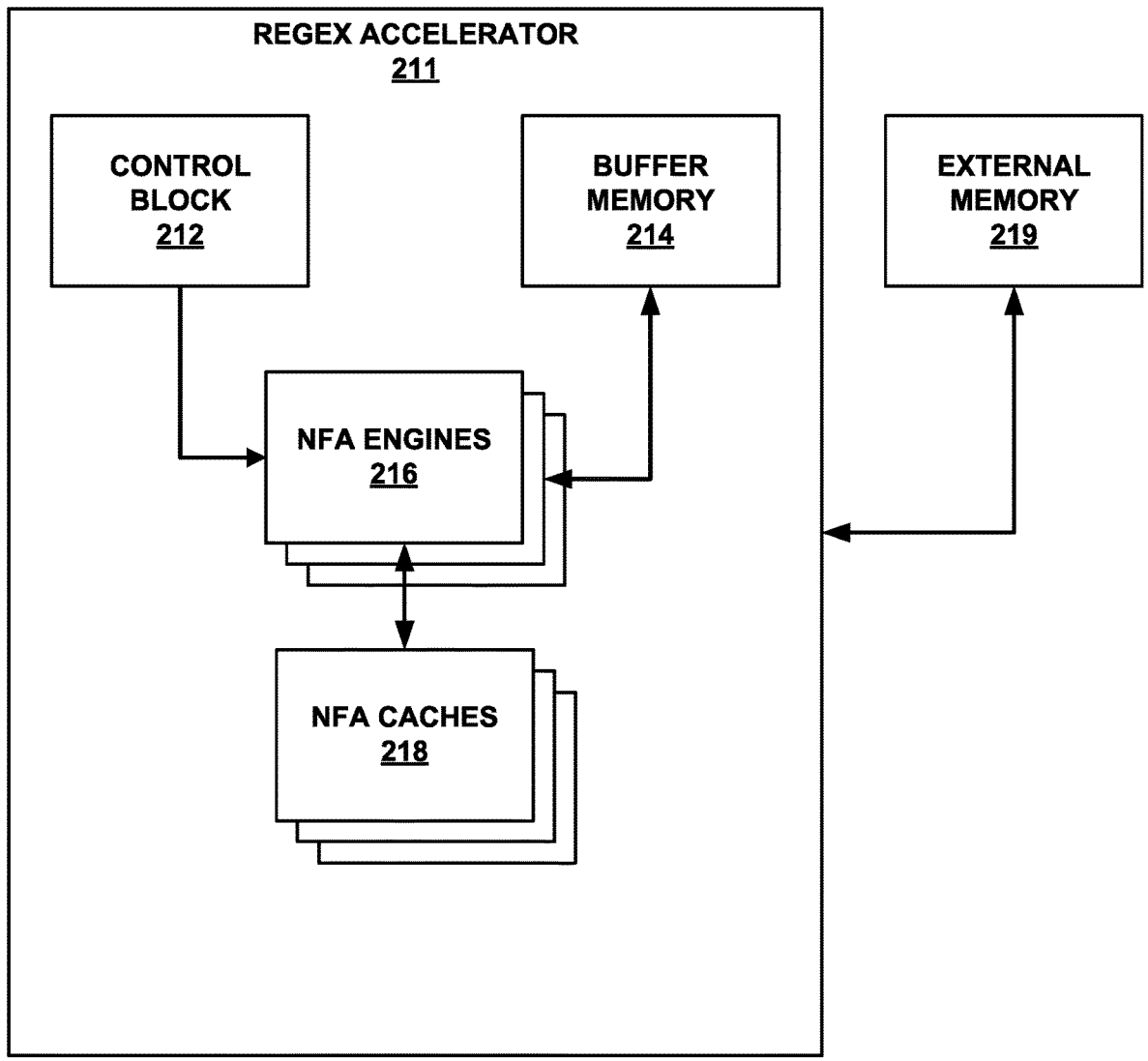

FIGS. 13 and 14 are block diagrams illustrating example regular expression (RegEx) accelerators 200, 211 for DPU 17, in accordance with the techniques of this disclosure. That is, DPUs 17 may, in some examples, include RegEx accelerators 200, 211 that operate according to deterministic and/or non-deterministic finite automata to efficiently apply query predicates by performing pattern matching on streams of data units. As examples, RegEx accelerators 200, 211 may correspond to one of accelerators 146 or one of accelerators 189.

For example, FIG. 13 is a block diagram illustrating an example regular expression (RegEx) accelerator 200 having one or more hardware-based deterministic finite automata (DFA) engines that operate according to DFA graphs to efficiently apply query predicates by performing pattern matching on streams of data units. In the example of FIG. 13, RegEx accelerator 200 includes control block 202, dedicated on-chip memory referred to as buffer memory 204, deterministic finite automata (DFA) engines 206, and DFA caches 208, which operates as high-speed on-chip cache memory for caching select DFA arcs. As shown in FIG. 13, RegEx accelerator 200 is also in communication with external memory 210. External memory 210 is so named because external memory 210 is external to RegEx accelerator 200, i.e., off chip, and generally has longer memory access cycles. For example, external memory 210 may correspond to memory unit 134 (e.g., non-coherent buffer memory 138), external memory 170, or non-coherent buffer memory 186. Further example details of a hardware-based RegEx accelerator having DFA engines are described in Ser. No. 16/035,416, 16/035,457 and 16/035,444, each of which is incorporated herein by reference.

In general, control block 202 represents a processing unit (implemented in circuitry) that controls operation of other components of RegEx accelerator 200. For example, control block 202 may receive work units from external components (such as processing cores) to traverse a DFA (representing a regular expression) for target input data (e.g., a payload of a packet).

With respect to DFA engines 206, one or more cores of a processing cluster, such as cores 182 of processing cluster 180 in FIG. 4, issue an instruction to load, and control block 202 loads, a DFA graph (or in some cases, multiple DFA graphs) that was previously compiled from a corresponding regular expression by a compiler. In this way, each DFA graph generated by the compiler corresponds to at least a portion of a regular expression and is a data structure represents the pattern and/or rule matching criteria set forth within the regular expression. As described in further detail below, after a compiler compiles regular expressions into DFA graphs, a loader may allocate data for the DFA graph to on-chip buffer memory 204 and/or external memory 210, and may optimize the structure of the data based on the particular memory to which the data will be stored when used for stream processing. In some examples, the loader allocates data for nodes of the DFA graph by traversing the DFA graph in a breadth-first manner starting from a root of the DFA graph so as to allocate the nodes of the DFA that are closer to the root first to buffer memory 204 and then to external memory 210 once buffer memory 204 is full or a pre-determined amount of buffer memory 204 will be utilized by the portion of the DFA graph allocated to the buffer memory.

After compilation, the loader stores data representing the DFA graph initially in external memory 210 or a different computer-readable storage medium for loading when needed for stream processing. In some examples, control block 202 may receive work units including instructions to retrieve at least a portion of a DFA graph from external memory 210 allocated and structurally arranged for buffer memory 204 by the loader following compilation of the regular expression. In response, control block 202 may retrieve the designated portion of the DFA graph from external memory 210 and store the portion of the DFA graph to one or more of buffer memory 204, and in some cases may preload certain nodes into high-speed, on-chip DFA caches 208, which may operate as L1 caches. Likewise, after one or more searches have been conducted, control block 202 may receive work units including instructions to clear one or more of DFA caches 208 and/or unload portions of DFAs from buffer memory 204. Furthermore, control block 202 may receive work units including instructions to initiate a search, e.g., indicating a payload to be searched using a loaded DFA graph. In some examples, a single work unit may represent both a command to load a DFA and to perform a search using the loaded DFA.

In general, a DFA graph includes a set of nodes directly linked by arcs, where each node in the graph represents a state and each arc represents transitions between states based on criteria specified for the respective arc. Each node of a DFA graph may contain one or more arcs directionally linking the node to itself and/or to other nodes within the DFA graph.

As further described below, when compiling one or more regular expressions into one or more DFA graphs, the compiler may generate one or more of the nodes in a form of a hash table having a set of hash buckets for storing data indicative of the state transitions represented by the arcs originating from the node. Input, such as symbols within payloads of stream data, are hashed to hash buckets to determine whether the input results in a state transition for the given node. Moreover, the compiler may arrange each hash bucket in the form of a set of slots, and data representative of the arcs of the DFA may be stored in the slots of hash buckets. Further, when generating the DFA graph, the compiler may control and arrange the number of slots each hash bucket for a given node based on the target memory designated to store the node when the DFA graph is to be applied. For example, each of buffer memory 204 and external memory 210 are configured so as to allow a certain amount of memory to be read in a single access, generally referred to herein as a memory slice. A memory slice may, for example, represent a certain number of memory-aligned bytes in buffer memory 204 or a certain number of aligned bytes in external memory 210. Moreover, the number of bytes of buffer memory 204 allocated for memory slices may differ from that of external memory 210. In general, memory slices of external memory 210 are larger that memory slices of buffer memory 204, such that buffer memory 204 generally stores fewer bytes for memory slices than external memory 210. In one example, buffer memory 204 stores memory slices having 32 bytes of data and is 32-byte aligned, while external memory 210 stores memory slices having 64 bytes of data and is 64-byte aligned. As further described below, the compiler may construct the format and arrangement of the hash table representing a given node in a DFA graph to optimize the node for memory access based on the target memory to which the node will be allocated when used by RegEx accelerator 200 for stream processing. For example, the compiler may control the number of slots within each row of the hash table (i.e., each hash bucket) so that the row occupies a single or multiple of the memory slice for the memory selected by the compiler for storing the node when the DFA graph is loaded for use, thereby decreasing memory access times when applying the DFA graph for stream processing.

In this way, the compiler allocates a node with more arcs than the number of slots per slice to a power of 2 slices using one or more hash functions, with these nodes being referred to herein as HASH nodes. Labels for arcs from a node of the DFA graph may act as keys to the hash functions, such that DFA engines 206 execute the hash functions on the labels of the arcs. In other words, the hash functions may map the labels for the arcs to respective hash buckets, which may correspond to slots within one or more additional memory slices for a current node of the DFA graph storing, the slots of the additional memory slices storing additional arcs for the current node. Control block 202 or one of DFA engines 206 may locate data for the nodes of the DFA graph using a mode value describing in which way the node is allocated. Thus, control block 202 or one of DFA engines 206 stores retrieves data describing the mode value for a particular node.

In yet another example, the compiler may generate some of the nodes not as hash tables but instead in a more compact form such that the node can be stored within a single memory slice of the memory designated for storage of the node. The compiler, for example, may determine that a node of a DFA graph has fewer arcs than the number of slots per memory slice and may then construct the node so as to occupy a single slice. In some examples, the compiler may allocate the node for storage in the target memory in a manner that overlays the node on unused slots of a memory slice that is designated to store a hash bucket for a hash node. In other words, these nodes (referred to herein as a 'fill nodes') are constructed and allocated to memory addresses of the targeted memory so as to occupy unused slots of hash buckets of HASH nodes.

In some examples, a first subset of the nodes of a DFA graph may be stored in buffer memory 204 and transition to the remaining nodes of the DFA graph stored in external memory 210. The data representative of the arcs may, in these examples, include a locator value that indicates whether data for a respective subsequent node of the DFA graph (pointed to by the arc) is stored in buffer memory 204 or external memory 210. In this manner, DFA engines 206 may use the locator value to retrieve data for the respective subsequent arc from either buffer memory 204 or external memory 210, and store the retrieved data in, e.g., a respective one of DFA caches 208. In some examples, when the data for the subsequent node is stored in external memory 210, DFA engines 206 may retrieve the data for the subsequent node from external memory 210 and store this retrieved data to buffer memory 204.

Each of DFA engines 206 include one or more hardware threads configured to execute respective search processes according to a DFA graph. Each of the threads may include, for example, one or more respective memories (e.g., registers, caches, or the like) for storing a current node of a corresponding DFA graph and a current position of a payload data being inspected. That is, the threads may store data representing a current node locator and a payload offset. The current node locator may correspond to a value stored by a thread including a memory type (e.g., buffer memory 204 or external memory 210), address, and mode (size and layout) of the current node.

DFA engines 206 also include respective processing units for comparing a current symbol of the payload data to labels for arcs from the current node of the DFA graph. The threads of each of DFA engines 206 may share a common processing unit, or the threads may each include a corresponding processing unit. In general, the processing unit determines a node to which to transition from the current node (i.e., the node to which the arc having a label matching the current symbol of the payload data points). More particularly, given a current node locator and an input byte (i.e., the value of a current symbol of the payload data), the processing unit reads the node from the memory location indicated by the current node locator and determines an arc of the node (if any) having a label that is the same as the input byte. If the processing unit finds such an arc, the processing unit provides the next node locator for the next input byte. On the other hand, if no such arc is found, the processing unit may reinitialize the next node locator to the start node (i.e., a root of the DFA graph).

The processing unit or the thread of the corresponding one of DFA engines 206 may then update the current node locator and the payload offset. The processing unit may continue this evaluation until either the entire set of payload data has been examined without finding a match, or a resulting node of the DFA graph is a matching node. In response to reaching a matching node, the thread of the one of DFA engines 206 may return data indicating that a match has been identified.

In some examples, before evaluating payload data, DFA engines 206 may preload at least a portion of a DFA graph into buffer memory 204 from external memory 210 or a different computer-readable medium based on the memory allocation specified by the compiler for each node. Additionally, or alternatively, DFA engines 206 may preload a portion of the DFA graph into memory of a thread of the one of DFA engines 206. In particular, DFA engines 206 may be configured to receive a DFA LOAD work unit, including instructions to direct the DFA engine to load at least a portion of a DFA graph (e.g., a root of the DFA graph, and/or other portions of the DFA graph) into buffer memory 204 and/or memory of one of the threads of the DFA engines 206. The at least portion of the DFA graph may include a root node of the DFA graph and/or data representing one or more nodes and/or arcs of the nodes of the DFA graph. Likewise, DFA engines 206 may be configured to unload a loaded portion of a DFA graph from the thread memory and/or from buffer memory 204, e.g., in response to a DFA UNLOAD work unit. The DFA UNLOAD work unit may include instructions indicating that one or more loaded arcs of a DFA graph are to be removed from thread memory and/or buffer memory 204, and/or to unlock and clear a root buffer for a DFA graph from the thread memory and/or buffer memory 204.

To perform a search, DFA engines 206 may receive a DFA SEARCH work unit including instructions to cause DFA engines 206 to select an idle thread of DFA engines 206 to be used to search payload data against a DFA graph, at least a portion of which may have been previously loaded in response to a DFA LOAD work unit. To perform the search, DFA engines 206 may provide to the idle thread: data representing locations of the DFA graph (including a root of the graph, a base address of a portion of the DFA graph loaded into buffer memory 204, and a base address of a portion of the DFA graph in external memory 210), a node from which to start the DFA graph traversal, addresses of payload buffers to be processed in a work unit stack frame, and an address and size of a result buffer in the work unit stack frame.

Accordingly, as discussed above, a thread and a processing unit of one of DFA engines 206 may perform a search in response to a DFA SEARCH work unit. In particular, the processing unit may retrieve a current symbol from payload data of the work unit stack frame, as indicated by the DFA SEARCH work unit, and ultimately output an indication of whether a match occurred to the result buffer in the work unit stack frame.

An example search algorithm is described below. Inputs to the algorithm include a location of a root of a DFA graph (root_node_locator), addresses of the DFA graph in buffer memory 204 and external memory 210, a starting node for the traversal of the DFA graph, payload bytes used to traverse the graph, and an address to which to write matching results. Starting from the first byte in the first payload buffer and the start node locator, a DFA thread of one of DFA engines 206 matches each payload byte (cur_label:=payload[cur_offset]) with an arc to a DFA node (cur_node:=dfa_graph[cur_node_locator]). The example matching algorithm, which may be performed by the processing unit of the one of DFA engines 206, is as follows:

1. If the node at cur_node_locator contains an arc that maps cur_label to a next_node_locator, then:
   a. cur_offset←cur_offset+1
   b. cur_node_locator←next_node_locator
2. If the node at cur_node_locator does NOT contain an arc for cur_label, then:
   a. cur_offset remains the same
   b. cur_node_locator←root_node_locator.

After step 2 above, the processing unit matches the current payload byte to the arcs from the root node. In some examples, this match may be performed in parallel with another byte of the payload, e.g., if the root is preloaded into one of DFA cache memories 208 associated with the thread.

The following example algorithm describes one process for writing data to a result buffer. In this example, a DFA thread may add a result entry to the result buffer. If the current node arc has a MATCH attribute indicating that the subsequent node from this arc is a MATCH, the DFA thread adds data representing the current payload offset and next node locator to the result buffer.

The DFA thread may continue to match consecutive payload bytes with successive DFA nodes until either the last payload byte is processed, the result buffer becomes full, or a memory error is detected. Ultimately, DFA engines 206 may generate a return work unit including data indicating that the search has resulted in a match (but not the last match), the search has resulted in a match and it is the last match, that the result buffer is full, or an error code if an error occurred during the search. RegEx accelerator 200 may send the return work unit to the unit that issued the DFA SEARCH work unit.

Each of DFA engines 206 correspond to respective, private DFA cache memories 208. DFA cache memories 208 may serve two purposes: cache arc data (e.g., recently traversed arcs from a node for which data is stored in external memory 210), and cache root buffer data (e.g., caching pre-loaded root data from external memory 210 for parallel lookups in response to arc cache misses). An entire one of DFA cache memories 208 may be used as an arc cache, where each cache line holds one node arc. DFA engines 206 may load these node arcs and evict these node arcs dynamically in the arc cache when they are accessed and traversed by a respective DFA thread.

In addition, DFA engines 206 may use part of the respective one of DFA cache memories 208 as a software-managed root buffer, where each cache line may hold two preloaded root arcs. If a DFA graph has its root data in external memory 210, DFA engines 206 may first need to receive a DFA LOAD work unit to preload the root arcs into the root buffer before performing a search using the DFA graph. Eventually, DFA engines 206 may also need to receive a DFA UNLOAD work unit to unload the DFA arcs, once the DFA graph is no longer in use.

FIG. 14 is a block diagram illustrating an example regular expression (RegEx) accelerator 211 having one or more hardware-based non-deterministic finite automata (NFA) engines 216 that operate to efficiently apply query predicates to data by performing pattern matching on streams of data units. As further explained below, in one example, rather than operate by storing and traversing NFA graphs, in some examples, NFA engines 216 are instruction-based engines that execute instructions generated in view of one or more NFA graphs, thereby implementing NFA regular expression operations without traversing NFA graphs while processing streams of data units.

In the example of FIG. 14, RegEx accelerator 211 includes control block 212, buffer memory 214 and external memory 219 similar to Regex accelerator 200. In contrast, RegEx accelerator 211 includes non-deterministic finite automata (NFA) engine 216 and NFA caches 218. In particular, one or more cores of a processing cluster, such as cores 182 of processing cluster 180 in FIG. 12, execute a compiler to compile a regular expression into instructions of an NFA graph (or in some cases, multiple NFA graphs, and in some cases, one or more deterministic finite automata (DFA) graphs). In this way, each instruction generated by the compiler corresponds to at least a portion of a regular expression and is a data structure that represents the pattern and/or rule matching criteria set forth within the regular expression. As described in further detail below, when compiling regular expressions, the compiler may allocate data for the instructions to on-chip buffer memory 214 and/or external memory 219, and optimizes the structure of the data based on the particular memory to which the data will be stored when used for stream processing.

In general, an NFA graph includes a set of nodes directly linked by arcs, where each node in the graph represents a state and each arch represents transitions between states based on criteria specified for the respective arc. Each node of an NFA graph may contain one or more arcs directionally linking the node to itself and/or other nodes within the NFA graph. In some examples, transitions between states may consume a symbol of a payload. In some examples, transitions between states may not consume a symbol of a payload. Transitions that do not consume a symbol may be referred to herein as epsilon (c) transitions.

When compiling a set of regular expressions into instructions of an NFA graph, the compiler may generate macro-instructions operable by NFA engines 216. For example, rather than NFA engines 216 executing a first instruction for searching for the character 'a', a second instruction for searching for the character and a third instruction for searching for the character 'c' to search for the string 'abc', NFA engines 216 may executing a single instruction for searching for the string 'abc'.

In this way, the compiler may reduce a quantity of instructions used to traverse an NFA graph. The compiler thereby reduces an amount of data stored for the NFA graph, which may reduce power usage of RegEx accelerator 211. Moreover, using macro-instructions may increase a number of symbols that are processed during a single clock cycle, thereby resulting in increasing a search speed of RegEx accelerator 211.

Each of NFA engines 216 includes one or more hardware threads configured to execute respective search processes according to an NFA. Each of the threads may include, for example, one or more respective memories (e.g., registers, caches, or the like) for storing a program counter for a next instruction for an arc of an NFA and a current position of a payload data being inspected. That is, the threads may store data representing a program counter and a payload offset.

NFA engines 216 also include respective processing units for determining the current symbol and one or more subsequent symbols of the payload segment that satisfy a match condition. The threads of each of NFA engines 216 may share a common processing unit, or the threads may each include a corresponding processing unit. In general, the processing unit determines whether traversal of the NFA graph through application of the symbols of the payload results in reaching a match node of the NFA graph.

The processing unit or the thread of the corresponding one of NFA engines 216 may then update a program counter and the payload offset. The processing unit may continue this evaluation until either the entire set of payload data has been examined without satisfying a match condition, or resulting in an instruction that is a final instruction indicating a matching condition. In response to satisfying the matching condition, the thread of the one of NFA engines 216 may return data indicating that a match has been identified.

In some examples, before evaluating payload data, NFA engines 216 may load at least a portion of instructions of an NFA graph into buffer memory 214 from external memory 219 or a different computer-readable medium based on the memory allocation specified by the compiler for each of the nodes. Additionally, or alternatively, NFA engines 216 may load a portion of instructions of the NFA graph into memory of a thread of the one of NFA engines 216. In particular, NFA engines 216 may be configured to receive an NFA LOAD work unit, including instructions to direct the NFA engine to load at least a portion of instructions of an NFA graph (e.g., a root of the NFA graph, and/or other portions of the NFA graph) into buffer memory 204 and/or memory of one of the threads of the NFA engines 216. The at least portion of the NFA graph may include a root node of the NFA graph and/or data representing one or more nodes and/or arcs of the nodes of the NFA graph. Likewise, NFA engines 216 may be configured to unload a loaded portion of instructions of an NFA graph from the thread memory and/or from buffer memory 204, e.g., in response to an NFA UNLOAD work unit. The NFA UNLOAD work unit may include instructions indicating that one or more loaded instructions of an NFA graph are to be removed from thread memory and/or buffer memory 204.

Accordingly, as discussed above, a thread and a processing unit of one of NFA engines 216 may perform a search in response to an NFA SEARCH work unit. In particular, the processing unit may retrieve a current symbol from payload data of the work unit stack frame, as indicated by the NFA SEARCH work unit, and ultimately output an indication of whether a match occurred to the result buffer in the work unit stack frame.

Example macro-instructions are described below. A hardware thread of NFA engines 216 may receive one or more addresses of instructions of the NFA graph in buffer memory 214 and external memory 219, one or more addresses of "current" instruction stack to start the NFA searches, one or more addresses of a "next" instruction stack to output pending NFA searches, an address of a "top" of the current instruction stack, one or more addresses of payload buffers to be processed, and an address and size of a result buffer.

An array compare instruction may cause one of NFA engines 216 to match a fixed number of characters with consecutive payload bytes. For example, the array compare instruction may cause one of NFA engines 216 to compare characters stored in the variable-length instruction against bytes in payload. The compare may be successful if all characters compare true to the corresponding payload bytes.

A closure compare instruction may cause one of NFA engines 216 to match a label repeatedly against consecutive payload bytes. As used herein, a label may refer to, for example, but not limited to, one or more case sensitive characters, one or more case insensitive characters, a character class (e.g., a set of characters), or another label. For example, the closure compare instruction may specify two paths. A first path (e.g., path #0) of the closure compare instruction may cause one of NFA engines 216 to compare a "repeat" label with the payload byte(s) and stay at the same instruction. A second path (e.g., path #1) of the closure compare instruction may cause one of NFA engines 216 to compare an "exit" label with the payload byte and jump to the respective target address. If the first path (e.g., path #0) is taken, one of NFA engines 216 may consume the payload byte; otherwise, the payload byte is NOT consumed (e.g., the byte is matched speculatively). In some examples, one of NFA engines 216 may execute instructions for the first path of the closure compare instruction (e.g., path #0) first when the closure compare is "greedy." In some examples, one of NFA engines 216 may execute instructions for the first path of the closure compare instruction (e.g., path #0) last when the closure compare is "lazy." Upon taking a path, the closure compare instruction may cause one of NFA engines 216 to push a closure compare instruction with the index of the not taken path to the instruction stack to facilitate potential backtracking later.

A fork instruction may cause one of NFA engines 216 to branch between two to 'n' number of target instructions (as shown, e.g., in FIG. 17). The fork instruction may cause one of NFA engines 216 to update the program counter to point to a target instruction if the character specified for each path compares true to the payload byte. Instructions for a first path (e.g., Path #0) of the fork instruction may cause one of NFA engines 216 to "jump" to the following (fall-through) instruction. Other paths of the fork instruction may cause one of NFA engines 216 to jump to a respective target addresses. In all cases, the fork instruction does not consume the payload byte (e.g., matched speculatively). The fork instruction may cause one of NFA engines 216 to push a subsequent fork instruction with the index of the not taken path to the instruction stack to facilitate potential backtracking later.

A join instruction may cause one of NFA engines 216 to jump to a target instruction after matching up to 'n' number of labels. For example, the join instruction may cause one of NFA engines 216 to jump to a target instruction after matching and consuming up to 'n' number of payload bytes.

An assert instruction may cause one of NFA engines 216 to assert a character class and/or position of current and/or previous byte. For example, the assert instruction may cause one of NFA engines 216 to assert the character class values and/or positions of the current and/or the previous payload bytes.

A capture group instruction may cause one of NFA engines 216 to record capture group or make back reference to the capture group. For example, the capture group instruction may cause one of NFA engines 216 to perform one of the following operations before or after matching and consuming up to 5 payload bytes: (1) write the content of a capture group register with the current payload position; or (2) make a back reference to the payload segment specified by a pair of capture group registers.

A final instruction may cause one of NFA engines 216 to report an NFA match or jump to a "flip" target. For example, the final instruction may cause one of NFA engines 216 to report an NFA (semi-)match to the result buffer, and optionally jump to a "flip" address and reverse the payload matching direction.

While executing instructions of an NFA graph, each NFA thread may push some entries onto its private instruction stack to remember the alternative paths to walk the NFA graph, for example, in response to executing a join instruction or closure compare instruction.

Further examples of data processing units (DPUs) having NFA-based hardware engines for regular expression processing are described in U.S. patent application Ser. No. 16/035,478, entitled "INSTRUCTION-BASED NON-DETERMINISTIC FINITE STATE AUTOMATA ACCELERATOR", filed Jul. 13, 2018, the entire content of which is incorporated herein by reference.

In general, rather than implement queries entirely in software to process one or more columns of data, DPUs 17 operate to stream data through hardware accelerators (e.g., accelerators 146) to implement analytical operations in highly efficient manner. That is, DPUs 17 apply regular expression accelerators to performing streaming operations on streams of data units in a manner that effectively executes analytical query operations on the data, including operations for data ingestion to load data into storage, data processing for analytical operations and data retrieval and transmission to analytics tools 23.

In example implementations, DPUs 17 leveraging regular expression (DFA/NFA) accelerators within DPU 17, that may typically be used for data stream processing for pattern matching, to instead perform analytical operations on large volumes of data streaming through the hardware accelerators.

The following are example predicates that can be implemented by regular expression evaluation of a stream of data units using one or more DFA/NFA graphs. In the examples, 'X' is a variable that holds a value to be compared, i.e., a value of a particular data unit with the stream of data units being process. The stream of data units may be any data type, such as a stream of integers, doubles, strings and the like. 'C' and 'S' are integer and string constants, respectively, to be compared against each data unit in the stream, where 'X' represents a given data unit being compared. As examples, a minimum length of the constants 'C' and 'S' may be '1-byte' and a maximum length of the stream of data units could be any, limited only by computational resources such as an amount of memory available to the accelerators.

| Example Predicates | |
|---|---|
| $X < C$ | Outputs all data units in the stream that are less than C |
| $X \leq C$ | Outputs all data units in the stream that are less than C |
| $X = C$ | Outputs all data units in the stream that are less than C |
| $X \neq C$ | Outputs all data units in the stream that are less than C |
| $X > C$ | Outputs all data units in the stream that are less than C |
| $X \geq C$ | Outputs all data units in the stream that are less than C |
| X BETWEEN $C_0$ and $C_1$ | Outputs all data units in the stream that are less than C |
| X LIKE S | Outputs all data units in the stream that match the string S (e.g., 'minneso*' where * is a wild card) |
| X NOT LIKE S | Outputs all data units in the stream that do not match the string S (e.g., 'minneso*' where * is a wild card) |

FIG. 15A is a block diagram illustrating regular expression accelerators (e.g., DFA engines 206) configured to operate according to an example DFA graph 220 for implementing a simple query specifying a single logical condition (i.e., query predicate) to be applied to one or more columns of integer data units. In this example, analytics tools 23 issues a query 'select c1 from tbl where c1<69' to be applied to one or more columns of data. In response, analytics service control node 25 generates a data flow graph 221 having, in this example, three graph nodes that configure one or more DPUs 17 to: (1) EXTRACT the one or more columns of data and to direct the data through the hardware accelerators of the DPUs as a stream of data units (as data flow 222 in this example), (2) FILTER the data flow so as to apply the query predicate 'X<69' to produce an output data flow (e.g., data flow 224) containing a stream of values indicating which data units of the input data flow satisfy the query predicate (i.e., is an integer value less than 69 decimals) and (3) TRANSMIT the matching data.

In response to receiving data flow graph 221, DPUs 17 generate DFA graph 220, which represents an example deterministic finite automata (DFA) graph specially generated for implementing the FILTER graph node of the initial data flow graph so as to process the columns of data using regular expression accelerators, e.g., DFA engines 206, according to the specified query predicate, i.e., 'X<69.' As explained above, a DFA graph includes a set of nodes directly linked by arcs, where each node in the graph represents a state and each arc represents transitions between states based on criteria specified for the respective arc. Each node of a DFA graph may contain one or more arcs directionally linking the node to itself and/or other nodes within the DFA graph. The DFA engines 206 of DPUs 17 include respective processing units that operate to process streams of data units using DFA graphs and traverse the graph by: (1) comparing a current data unit (symbol) of the stream as identified by pointer 225 to the labels for each arcs from a current node of the DFA graph, and (2) traversing the arc that is satisfied by the current data unit to a node in the DFA pointed to by the arc, (3) perform any actions defined by that node, (4) incrementing pointer 225 to point to the next data unit in the stream of data units, and (5) repeating the evaluation process on the next data unit.

In this example, DFA graph 220 has three nodes N0-N2. N0 represents a root node (START node) of DFA graph 220 that is initially traversed when the regular expression (RegEx) accelerator evaluates a first unit in the stream of data units. N1 is a MATCH node that represents a state indicative of a match for the query predicate and that, in this example, causes the RegEx accelerator (DFA engines 206) to output a value (e.g., 'Y') indicative that the current data unit of data flow 222 being evaluated satisfies the match condition. N2 is a FAIL node that represents a fail state that, in this example, causes the RegEx accelerator (DFA engines 206) to output a value (e.g., 'N') indicative that the current data unit of data flow 222 being evaluated does NOT satisfy the match condition.

For example, in accordance with DFA graph 220, one or more RegEx accelerators of the DPUs (shown as DFA engines 206) initially evaluate a first data unit (i.e., '0x39') of data flow 222 using root node N0. DFA engines 206 evaluate the first unit '0x39' in the stream of data units, as identified by pointer 225 and compare the first unit '0x39' to the labels ('0x00 to 0x44' and '0x45 to 0xff') of each arc 230, 232, respectively, from the current node N0 of the DFA graph. Given that the first data unit '0x39' satisfies arc 230 (i.e., the first unit value of '0x39' is a value that satisfies the criteria '0x00 to 0x44'), DFA engines 206 traverse arc 230 to the node pointed to by arc 230 (i.e., MATCH node N1), where the MATCH node causes the DFA engines 206 to output 'Y' indicative that the current data unit '0x39' of data flow 222 being evaluated satisfies the query predicate. DFA engines 206 increments pointer 225 to point to the next data unit (i.e., '0x56') in the stream of data units 222 and continues operation according to DFA graph 220.

At MATCH node N1, DFA engines 206 evaluates the next unit '0x56' as identified by pointer 225 to the labels ('0x00 to 0x44' and '0x45 to 0xff') for arc 234 and arc 236, respectively, from the current node N1 of DFA graph 220. Given that the next unit '0x56' satisfies the arc 236 (i.e., the next unit value of '0x56' is a value that satisfies the criteria '0x45 to 0xff'), DFA engines 206 traverse arc 236 to the node pointed to by arc 236 (i.e., FAIL node N2), where the FAIL node causes the DFA engines 206 to output 'N' indicative that the current data unit '0x56' of data flow 222 being evaluated does not satisfy the match condition. DFA engines 206 increment pointer 225 to point to the next data unit (i.e., '0x39') in the stream of data units 222.

At FAIL node N2, DFA engines 206 evaluate the next unit '0x39' as identified by pointer 225 to the labels ('0x45 to 0xff' and '0x00 to 0x44') for arc 238 and arc 239, respectively, from the current node N2 of the DFA graph. Given that the next unit '0x39' satisfies the arc 239 (i.e., the next unit value of '0x39' is a value that satisfies the criteria '0x00 to 0x44'), DFA engines 206 traverse the arc 239 to the node pointed to by arc 239 (i.e., MATCH node N1), where the MATCH node will cause the RegEx accelerator (DFA engines 206) to output 'Y' indicative that the current data unit '0x39' of data flow 222 being evaluated satisfies the match condition. DFA engines 206 increment pointer 225 to point to the next data unit (i.e., '0x89') in the stream of data units 222.

At MATCH node N1, the RegEx accelerator (DFA engines 206) evaluates the next unit '0x89' as identified by pointer 225 to the labels ('0x00 to 0x44' and '0x45 to 0xff') for arc 234 and arc 236, respectively, from the current node N1 of the DFA graph. Given that the next unit '0x89' satisfies the arc 236 (i.e., the next unit value of '0x89' is a value that satisfies the criteria '0x45 to 0xff'), DFA engines 206 traverse arc 236 to the node pointed to by arc 236 (i.e., FAIL node N2), where the FAIL node causes the RegEx accelerator (DFA engines 206) to output 'N' indicative that the current data unit '0x89' of data flow 222 being evaluated does not satisfy the match condition. DFA engines 206 increment pointer 225 to point to the next data unit (i.e., '0x55') in the stream of data units 222.

At FAIL node N2, the RegEx accelerator (DFA engines 206) evaluates the next unit '0x55' as identified by pointer 225 to the labels ('0x45 to 0xff' and '0x00 to 0x44') for arc 238 and arc 239, respectively, from the current node N2 of the DFA graph. Given that the next unit '0x55' satisfies the arc 238 (i.e., the next unit value of '0x55' is a value that satisfies the criteria '0x45 to 0xff'), DFA engines 206 traverse the arc 238 to the node pointed to by arc 238 (i.e., FAIL node N2), where the FAIL node causes the RegEx accelerator (DFA engines 206) to output 'N' indicative that the current data unit '0x55' of data flow 222 being evaluated does not satisfy the match condition. DFA engines 206 increment pointer 225 to point to the next data unit (i.e., '0x49') in the stream of data units 222.

At FAIL node N2, the RegEx accelerator (DFA engines 206) evaluates the next unit '0x49' as identified by pointer 225 to the labels ('0x45 to 0xff' and '0x00 to 0x44') for arc 238 and arc 239, respectively, from the current node N2 of the DFA graph. Given that the next unit '0x49' satisfies the arc 238 (i.e., the next unit value of '0x49' is a value that satisfies the criteria '0x45 to 0xff'), DFA engines 206 traverse the arc 238 to the node pointed to by arc 238 (i.e., FAIL node N2), where the FAIL node causes the RegEx accelerator (DFA engines 206) to output 'N' indicative that the current data unit '49' of data flow 222 being evaluated does not satisfy the match condition. DFA engines 206 increment pointer 225 to point to the next data unit (i.e., '0x24') in the stream of data units 222.

At FAIL node N2, the RegEx accelerator (DFA engines 206) evaluates the next unit '0x24' as identified by pointer 225 to the labels ('0x45 to 0xff' and '0x00 to 0x44') for arc 238 and arc 239, respectively, from the current node N2 of the DFA graph. Given that the next unit '0x24' satisfies the arc 239 (i.e., the next unit value of '0x24' is a value that satisfies the criteria '0x00 to 0x44'), DFA engines 206 traverse the arc 239 to the node pointed to by arc 239 (i.e., MATCH node N1), where the MATCH node will cause the RegEx accelerator (DFA engines 206) to output 'Y' indicative that the current data unit '0x24' of data flow 222 being evaluated satisfies the match condition. The DFA accelerators will then continue this process until incrementing pointer 225 to point to a final data unit (i.e., '32') in the stream of data units 222.

At MATCH node N1, the RegEx accelerator (DFA engines 206) evaluates the final data unit '0x32' as identified by pointer 225 to the labels ('0x00 to 0x44' and '0x45 to 0xff') for arc 234 and arc 236 from the current node N1 of the DFA graph. Given that the final data unit '0x32' satisfies the arc 234 (i.e., the final data unit '0x32' is a value that satisfies the criteria '0x00 to 0x44'), DFA engines 206 traverse arc 234 to the node pointed to by arc 234 (i.e., MATCH node N1), where the MATCH node causes the RegEx accelerator (DFA engines 206) to output 'Y' indicative that the current data unit '32' of data flow 222 being evaluated satisfies the match condition. As such, in this example, DFA engines 206 operate according to DFA graph 220 to generate a data flow (i.e., data flow 224) 'Y . . . Y N N N Y N Y' to implement FILTER node of data flow graph 221.

Figure 15B:
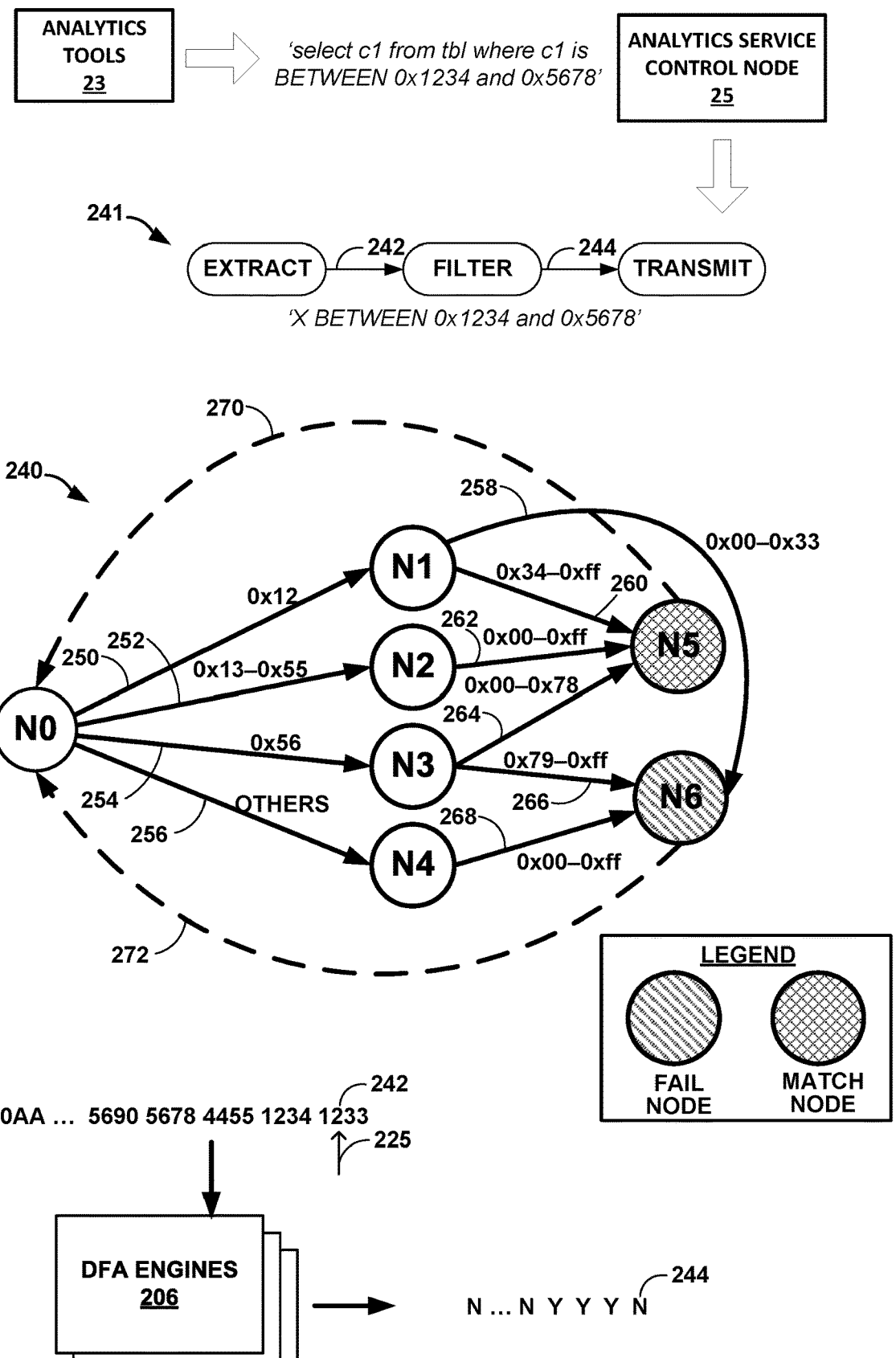

FIG. 15B is a block diagram illustrating regular expression accelerators (e.g., DFA engines 206) configured to operate according to an example DFA graph 240 for implementing a simple query specifying a single logical condition (i.e., query predicate) to be applied to one or more columns of integer data units.

In this example, analytics tools 23 issues a query 'select c1 from tbl where c1 is BETWEEN 0x1234 and 0x5678' to be applied to one or more columns of data (c1 in this example). In response, analytics service control node 25 generates a data flow graph 241 having three graph nodes that configure one or more DPUs to: (1) EXTRACT the one or more columns of data and to direct the data through the hardware accelerators of the DPUs as a stream of data units (as data flow 242 in this example), (2) FILTER the data flow so as to apply the query predicate 'X BETWEEN 0x1234 and 0x5678' to produce an output data flow (e.g., data flow 244) containing values indicating which data units of the input data flow satisfy the query predicate (i.e., is an integer value between than 0x1234 and 0x5678) and (3) TRANSMIT the matching data.

In this example, DFA graph 240 has seven nodes N0-N6. N0 represents a root node (START node) of DFA graph 240 that is initially traversed when the regular expression (RegEx) accelerator evaluates a first unit (i.e., '0x1233') in the stream of data units. N5 is a MATCH node that represents a state indicative of a match for the query predicate and that, in this example, causes the RegEx accelerator (DFA engines 206) to output a value (e.g., 'Y') indicative that the current data unit of data flow 242 being evaluated satisfies the match condition. N6 is a FAIL node that represents a fail state that, in this example, causes the RegEx accelerator (DFA engines 206) to output a value (e.g., 'N') indicative that the current data unit of data flow 242 being evaluated does NOT satisfy the match condition. Intermediate nodes N1-N4 represent an intermediate state where a data unit is evaluated after traversing from the root node (i.e., N0) and before traversing to one of the MATCH node (i.e., N5) or the FAIL node (i.e., N6).

For example, in accordance with DFA graph 240, DFA engines 206 initially evaluate a first data unit (i.e., '0x1233') of data flow 242 using root node N0. The RegEx accelerator (DFA engines 206) evaluates the first unit '0x1233' in the stream of data units, as identified by pointer 225 and compares the first byte of the first data unit '0x12' to the labels ('0x12,' '0x13 to 0x55,' '0x56,' and 'OTHERS') of each arc 250-256, from the current node N0 of the DFA graph. Given that the first byte '0x12' satisfies arc 250 (i.e., the first byte unit value of '0x12' is a value that satisfies the criteria '0x12'), DFA engines 206 traverse arc 252 to the node pointed to by arc 250 (i.e., intermediate node N1). The RegEx accelerator then compares the second byte of first unit '0x33' to the labels ('0x00-0x33,' '0x34 to 0xff') of arcs 258, 260, respectively, from the current intermediate node N1 of the DFA graph. Given that the second byte of first unit '0x33' satisfies the arc 258 (i.e., the second byte of first unit value of '0x33' is a value that satisfies the criteria '0x00 to 0x33'), DFA engines 206 traverse arc 258 to the node pointed to by arc 258 (i.e., the FAIL node N6) where the FAIL node causes the RegEx accelerator (DFA engines 206) to output 'N' indicative that the current data unit '0x1233' of data flow 242 being evaluated does not satisfy the match condition. DFA engines 206 increment pointer 225 to point to the next data unit (i.e., '0x1234') in the stream of data units 242 and DFA engines 206 traverse arc 272, returning to root node N0.

At root node N0, the RegEx accelerator (DFA engines 206) evaluates the next data unit '0x1234' in the stream of data units, as identified by pointer 225 and compares the first byte of the next data unit '0x12' to the labels ('0x12,' '0x13 to 0x55,' '0x56,' and OTHERS) of each arc 250-256, from the current node N0 of the DFA graph. Given that the first byte '0x12' satisfies arc 250 (i.e., the first byte unit value of '0x12' is a value that satisfies the criteria '0x12'), DFA engines 206 traverse arc 250 to the node pointed to by arc 250 (i.e., intermediate node N1). The RegEx accelerator then compares the second byte '0x34' of the data unit to the labels ('0x00 to 0x33,' '0x34 to 0xff') of arcs 258, 260, respectively, from the current intermediate node N1 of the DFA graph. Given that the second byte '0x34' of data unit satisfies arc 260 (i.e., the second byte '34' of the data unit is a value that satisfies the criteria '0x33 to 0xff'), DFA engines 206 traverse the arc 260 to the node pointed to by arc 260 (i.e., the MATCH node N5) where the MATCH node causes the RegEx accelerator (DFA engines 206) to output 'Y' indicative that the current data unit '0x1234' of data flow 242 being evaluated satisfies the match condition. DFA engines 206 increment pointer 225 to point to the next data unit (i.e., '0x4455') in the stream of data units 242 and DFA engines 206 traverse arc 270, returning to root node N0.

Next, the RegEx accelerator (DFA engines 206) evaluates the next data unit '0x4455' in the stream of data units, as identified by pointer 225 by comparing the first data byte '0x44' of the data unit to the labels ('0x12,' '0x13 to 0x55,' '0x56,' and 'OTHERS') of each arc 250-256, from the current node N0 of the DFA graph. Given that the byte '0x44' satisfies arc 252 (i.e., the value of '0x44' is a value that satisfies the criteria '0x13' to '0x55'), DFA engines 206 traverse arc 252 to the node pointed to by arc 252 (i.e., intermediate node N2). The RegEx accelerator then compares the second byte of first unit '0x55' to the label ('0x00 to 0xff') of arc 262 from the current intermediate node N2 of the DFA graph. Given that the second byte '0x55' of next data unit satisfies the arc 262 (i.e., the value of '0X55' is a value that satisfies the criteria '0x00 to 0xff'), DFA engines 206 traverse the arc 262 to the node pointed to by arc 262 (i.e., the MATCH node N5) where the MATCH node causes the RegEx accelerator (DFA engines 206) to output 'Y' indicative that the current data unit '0x4455' of data flow 242 being evaluated satisfies the match condition. DFA engines 206 increment pointer 225 to point to the next data unit (i.e., '0x5678') in the stream of data units 242 and DFA engines 206 traverse arc 270, returning to root node N0.

At root node N0, the RegEx accelerator (DFA engines 206) evaluates the data unit '0x5678' in the stream of data units, as identified by pointer 225, by first comparing the first byte '0x56' of the data unit to the labels ('0x12,' '0x13 to 0x55,' '0x56,' and 'OTHERS') of each arc 250-256, from the current node N0 of the DFA graph. Given that the first byte '0x56' satisfies arc 254 (i.e., the first byte value of '0x56' is a value that satisfies the criteria '0x56'), DFA engines 206 traverse the arc 254 to the node pointed to by arc 254 (i.e., intermediate node N3). The RegEx accelerator then compares the second byte '0x78' of the data unit to the labels ('0x00 to 0x78' and '0x79 to 0xff') of arcs 264, 266, respectively, from the current intermediate node N3 of the DFA graph. Given that the second byte '78' of the data unit satisfies the arc 264 (i.e., the second byte '78' of the data unit is a value that satisfies the criteria '0x00 to 0x78'), DFA engines 206 traverse the arc 264 to the node pointed to by arc 264 (i.e., the MATCH node N5) where the MATCH node causes the RegEx accelerator (DFA engines 206) to output 'Y' indicative that the current data unit '0x5678' of data flow 242 being evaluated satisfies the match condition. DFA engines 206 increment pointer 225 to point to the next data unit (i.e., '0x5690') in the stream of data units 242 and DFA engines 206 traverse arc 270, returning to root node N0.

Next, the RegEx accelerator (DFA engines 206) evaluates the data unit '0x5690' in the stream of data units, as identified by pointer 225 and compares the first byte '56' of the data unit to the labels ('0x12,' '0x13 to 0x55,' '0x56,' and OTHERS) of each arc 250-256, from the current node N0 of the DFA graph. Given that the first byte '0x56' satisfies the arc 254 (i.e., the first byte '0x56' is a value that satisfies the criteria '0x56'), DFA engines 206 traverse arc 254 to the node pointed to by arc 254 (i.e., intermediate node N3). The RegEx accelerator then compares the second byte '0x90' of data unit to the labels ('0x00 to 0x78' and '0x79 to 0xff') of arcs 264, 266, respectively, from the current intermediate node N3 of the DFA graph. Given that the second byte '90' of the data unit satisfies arc 266 (i.e., the second byte of data unit value of '0x90' is a value that satisfies the criteria '0x79 to 0xff'), DFA engines 206 traverse arc 266 to the node pointed to by arc 266 (i.e., the FAIL node N6) where the FAIL node causes the RegEx accelerator (DFA engines 206) to output 'N' indicative that the current data unit '0x5690' of data flow 242 being evaluated does not satisfy the match condition. DFA engines 206 increment pointer 225 to point to the next data unit (i.e., '0x60AA') in the stream of data units 242 and DFA engines 206 traverse arc 272, returning to root node N0.

At root node N0, the RegEx accelerator (DFA engines 206) evaluates the last data unit '0x60AA' in the stream of data units, as identified by pointer 225 and compares the first byte '60' of the last unit to the labels ('0x12,' '0x13 to 0x55,' '0x56,' and OTHERS) of each arc 250-256, from the current node N0 of the DFA graph. Given that the first byte '0x60' satisfies arc 256 (i.e., the first byte unit value of '0x60' is a value that satisfies the criteria 'OTHERS'), DFA engines 206 traverse arc 256 to the node pointed to by arc 256 (i.e., intermediate node N4). The RegEx accelerator then compares the second byte of last data unit 'AA' to the label ('0x00 to 0xff') of arc 268 from the current intermediate node N4 of the DFA graph. Given that the second byte of last data unit 'AA' satisfies the arc 268 (i.e., the second byte of first unit value of '0xAA' is a value that satisfies the criteria '0x00 to 0xff'), DFA engines 206 traverse the arc 268 to the node pointed to by arc 268 (i.e., the FAIL node N6) where the FAIL node causes the RegEx accelerator (DFA engines 206) to output 'N' indicative that the current data unit '0x60AA' of data flow 242 being evaluated satisfies the match condition. As such, in this example, DFA engines 206 operate according to DFA graph 240 to generate a data flow (i.e., data flow 244) 'N ... N Y Y Y N' to implement FILTER node of data flow graph 241.

In some examples, DPUs 17 may be configured to utilize regular expression (RegEx) accelerators in the form of non-deterministic finite automata (NFA) engines 216 to implement FILTER node operations of a data flow graph instead of or in conjunction with utilization of DFA engines. For example, as described with respect to FIG. 14, in some examples DPUs 17 include one or more hardware-based non-deterministic finite automata (NFA) engines 216 that operate to efficiently process streams of data units.

The DFA graphs of FIGS. 15A and 15B are relatively simple, easily expressed within a single page. DFA graphs used in practical applications, however, are generally more complex and may rely on the evaluation of two or more logical expressions against the target payload. In one example approach, each row of the column is a target payload and each target payload may include one or more different data units. In one example approach, for instance, each data unit in a column is associated with a datatype. An integer datatype may be defined to be 1, 2, 4, or 8 bytes, while a string data type may be defined to be 1000 bytes or more. In one such approach, system 10 supports the following datatypes:

| INTEGER | STRING |
| --- | --- |
| 1B | varchar(1000B) |
| 2B | char(1000B) |
| 4B | |
| 8B | |

In one example approach, each target payload contains the same data unit, although the contents of each data unit may be different. For instance, a target payload may include a string of 1000B, where each data unit is a two-byte character. In another example approach, each target payload includes two or more data units, although the two or more different data units may share the same datatype. For instance, a target payload may include two strings, the first string defined to contain 10 data units, where each data unit is a two-byte character, and the second string defined to be 5 data units, where each data unit is a two-byte character, the second string following the first in the payload.

Currently, DFA graphs require a minimum of one node for each data unit in the target payload. In the example above, a string of 1000B includes 500 two-byte data units. Currently, DFA graphs for such payloads require at least 500 nodes for processing each payload. As such, large payloads place a burden on analytics control node 25 and/or DPUs 17 to generate DFA graphs sufficiently large enough to process the target payloads. The following describes techniques for reducing the size of (i.e., compressing) the DFA graphs generated for the DFA engines of DPU 17.

FIG. 16A is a block diagram illustrating an example DFA graph configured to apply a query specifying one or more logical conditions (i.e., query predicates) to column data. In the example of FIG. 16A, each DPU 17 employs a counter 28 as a global counter. The global counter is used in a DFA graph to skip bytes or other sized data units in a payload. Such an approach reduces the size of the data grow graph by providing a single node capable of processing the data units remaining in a payload after, e.g., a match. The global counter may also be used to detect the end of a payload.

In one example approach, DPU 17 includes an integrated circuit. The integrated circuit includes a memory and one or more hardware-based regular expression (RegEx) accelerators connected to the memory. The memory includes a finite automata (FA) graph. The FA graph includes a plurality of nodes connected by directional arcs, each arc representing transitions between nodes of the FA graph based on criteria specified for the respective arc, the plurality of nodes including a skip node.

Each RegEx accelerator includes a regular expression engine, the regular expression engine configured to receive the FA graph from the memory and to perform a regular expression operation on a stream of data units based on the received FA graph, wherein the regular expression engine is configured to, on reaching the skip node, consume two or more data units in the stream of data units before traversing one of the directional arcs to another node.

In one example approach, the regular expression engine is a deterministic finite automata (DFA) engine, the received FA graph is a DFA graph, and the regular expression engine is configured to remain at the skip node consuming data units received from the stream of data units until a counter indicates an Nth data unit has been consumed. In one such example approach, the regular expression engine loads a global counter value M into a global counter and decrements the global counter each time a data unit is received from the stream of data units, transitioning to another node when M=0.

In another example approach, the regular expression engine is a non-deterministic finite automata (NFA) engine, the received FA graph is an NFA graph, and the regular expression engine is configured to remain at the skip node consuming data units received from the stream of data units until a counter indicates an Nth data unit has been consumed. In one such example approach, the regular expression engine loads a global counter value M into a global counter and decrements the global counter each time a data unit is received from the stream of data units, transitioning to another node when M=0.

In another example approach, the regular expression engine is a deterministic finite automata (DFA) engine, the received FA graph is a DFA graph, and the regular expression engine is further configured to remain at the skip node consuming data units received from the stream of data units until the regular expression engine encounters an end marker in the data stream. In one such example approach, the regular expression engine loads a global counter value M into a global counter and decrements the global counter each time a data unit is received from the stream of data units, transitioning to another node when M=0.

In another example approach, the regular expression engine is a non-deterministic finite automata (NFA) engine, the received FA graph is an NFA graph, and the regular expression engine is further configured to remain at the skip node consuming data units received from the stream of data units until the regular expression engine encounters an end marker in the data stream. In one such example approach, the regular expression engine loads a global counter value M into a global counter and decrements the global counter each time a data unit is received from the stream of data units, transitioning to another node when M=0.

In the example shown in FIG. 16A, analytics tools 23 issues the query 'like Steve' to be applied to one or more columns 400 in which each row 402 has a string datatype. In response, analytics service control node 25 provides a data flow graph (not shown) that is used to generate DFA graph 410. As noted above, each DFA graph 410 is a sequence of interconnected nodes that process data from column 400 using regular expression accelerators, e.g., DFA engines 206, according to the specified query predicates. Each node of DFA graph 410 contains two or more arcs directionally linking the node to itself and/or to other nodes within the DFA graph 410. The DFA engines 206 of DPUs 17 include respective processing units that operate to process streams of data units from column 400 using the DFA graph 410 and that traverse DFA graph 410 as a function of the query predicates from the data flow graph.

In the example of FIG. 16A, DFA graph 410 has six nodes N0-N5, each with a default arc 422 that returns to root node N0 upon a failure to match during the evaluation. N0 represents a root node (START node) of DFA graph 410. That is, N0 is the node initially traversed when the regular expression (RegEx) accelerator (e.g., a DFA engine such as DFA engine 206) evaluates a first unit in the stream of data units. In the example shown in FIG. 16A, the data units processed are from comments column 400, which has a string datatype and a width of 1000 bytes. Each data unit in column 400 is a character defined by two bytes. There are, therefore, 500 data units in each row 402 of column 400, for a target payload of 500 data units.

In one example approach, the process applying DFA graph 410 ends when 'Steve' is detected in the payload or at the end of the payload (such that DFA engine 206 doesn't detect the 'Steve' going across payload boundaries.) In one such example approach, the DFA engine loads counter 28 with the number of data units in the payload. The DFA engine then decrements counter 28 each time a new data unit is encountered. Once a match has occurred, DFA engine discards the remaining data units in the payload. The process ends when the counter=0.

In another such example approach, the target payload includes N rows 402 of column 400, where N is an integer greater than one. The global counter is set to a multiple of N times the number of data units in each row 402 or, in this example, N*500. In one such example approach, the process of DFA graph 410 ends when 'Steve' is detected in the payload or at the end of the target payload. In another such example approach, the process of DFA graph 410 notes the location of each 'Steve' in the payload (including across row boundaries) and stops at the end of the payload.

An example in which the process applying DFA graph 410 ends at the end of the payload or when 'Steve' is detected in the payload, whichever comes first, will be discussed next. From the example shown in FIG. 16A, a check is made at node N0 to determine if the first unit in the stream of data units is an 'S.' If so, the DFA engine traverses arc 412 to node N1. If the first unit in the stream of data units is not an 'S,' however, the DFA engine traverses return arc 422 to remain at node N0 and process the next data unit (if global counter>0). In this example, the global counter is set to 500 (1000B/(2 bytes/data unit)) at the start of each payload and, as each new data unit is extracted from the payload, the global counter is decremented by one.

When a match for 'S' is found at node N0, the DFA engine determines if the global counter>0. If the global counter=0, the DFA engine ends the process. If the global counter>0, the DFA engine reads the next data unit, decrements the global counter and traverses arc 412 to node N1. At node N1, the DFA engine 206 determines if the current data unit matches the character 't.' If the current data unit is not an "t," the DFA engine 206 returns to node N0 via return arc 422, before determining, at node N0, whether the current data unit matches the character 'S.'

In some example approaches, the DFA graph includes a global counter node used to track the global counter and to terminate the process when the global counter=0. In one such example approach, root node N0 is a global counter node.

When a match for 't' is found at node N1, the DFA engine determines if the global counter>0. If the global counter=0, the DFA engine traverses arc 422 to node N0. Otherwise, the DFA engine reads the next data unit, decrements the global counter and traverses arc 414 to node N2. At node N2, the DFA engine 206 determines if the current data unit matches the character 'e.' If the current data unit is not an "e," the DFA engine 206 returns to node N0 via return arc 422, before determining, at node N0, whether the current data unit matches the character 'S.'

When a match for 'e' is found at node N2, the DFA engine determines if the global counter>0. If the global counter=0, the DFA engine traverses arc 422 to node N0. Otherwise, the DFA engine reads the next data unit, decrements the global counter and traverses arc 416 to node N3. At node N3, the DFA engine 206 determines if the current data unit matches the character 'v.' If the current data unit is not an "v," the DFA engine 206 returns to node N0 via return arc 422, before determining, at node N0, whether the current data unit matches the character 'S.'

When a match for 'v' is found at node N3, the DFA engine determines if the global counter>0. If the global counter=0, the DFA engine traverses arc 422 to node N0. Otherwise, the DFA engine reads the next data unit, decrements the global counter and traverses arc 418 to node N4. At node N4, the DFA engine 206 determines if the current data unit matches the character 'e.' If the current data unit is not an "e," the DFA engine 206 returns to node N0 via return arc 422, before determining, at node N0, whether the current data unit matches the character 'S.'

When a match for 'e' is found at node N4, the DFA engine notes the location of the string 'Steve.' In one example approach, the DFA engine maintains a bit vector having 500 bits (the number of data units in the payload) and sets a bit in the bit vector at a location associated with the string 'Steve,' when detected. Then, if, at node N4, the global counter=0, the DFA engine traverses arc 422 to node N0. Otherwise, the DFA engine reads the next data unit, decrements the global counter and traverses arc 420 to node N5.

At node N5, the DFA engine 206 determines if the global counter=0. If the global counter=0, the DFA engine traverses arc 422 to node N0. Otherwise, the DFA engine reads the next data unit, decrements the global counter and traverses arc 424 to node N5, where it repeats the process until global counter=0.

In one example approach, node N5 is a skip node. In one such example approach, the skip node is configured with a Counter value (N), a NextNodeArc whenCounterValue==0 and a NextNodeArc whenCounterValue!=0. When a RegEx engine encounters the skip node, the RegEx engine initializes counter 28 as a global counter with counter value N. The RegEx engine then consumes data units from the stream of data, decrementing counter 28 accordingly. In the example shown in FIG. 16A, the NextNodeArc whenCounterValue==0 leads to node N0, while the NextNodeArc whenCounterValue!=0 leads to node N5.

In one example approach, arc 420 is an epsilon arc (i.e., the RegEx engine does not consume any data units on the transition to node N5).

In one example approach, the skip node also may be configured with a Boolean Flag—consume_on_match. In one such example approach, the consume_on_match flag selects between simply traversing arc 422 to node N0 on a match without consuming any more data units and consuming the remaining data units on a match (until global counter=0) before traversing arc 422 to node N0. In one such example approach, the RegEx engine finishes the match node processing (such as by declaring match, etc.) and then, based on the consume_on_match flag, the RegEx engine either consumes the rest of the remaining bytes before following the NextNodeArc whenCounterValue==0 to N0 or does not consume the remaining bytes before returning to N0. For example, if the consume_on_match flag is active (e.g., set)) the RegEx engine consumes the remaining bytes before returning to N0. On the other hand, if the consume_on_match flag is not active (e.g., cleared)) the RegEx engine returns to N0 without consuming the rest of the remaining bytes.

In one example approach, arc 422 is an epsilon arc (i.e., the RegEx engine does not consume any data units on the transition to node N0). In another example approach, arc 422 consumes a data unit when transitioning to node N0.

Mechanisms other than counters may be used to indicate an end in consuming data units. In one example approach, skip node N5 remains at node N5 consuming data units until the RegEx engine detects a symbol that serves as an end marker. When the RegEx engine finds the end marker symbol, the RegEx engine follows the arc 422 to node N0. In one such example, a start marker symbol and an end marker symbol are used to begin and end the processing of data units from a data stream.

In one example end marker approach, the skip node includes an End Marker Symbol, a NextNodeArc whenEndMarker==End Marker Symbol and a NextNodeArc whenEndMarker!=End Marker Symbol. When a RegEx engine encounters the skip node, the RegEx engine begins consuming data units received from the data stream, matching the data units to the End Marker Symbol until the RegEx engine detects the End Marker Symbol. In the example shown in FIG. 16A, the NextNodeArc whenEndMarker==End Marker Symbol leads to node N0, while the NextNodeArc whenEndMarker! End Marker Symbol leads to node N5.

In one example approach, the skip node also may be configured with a Boolean Flag—consume_on_match. In one such example approach, the consume_on_match flag selects between simply traversing arc 422 to node N0 on a match without consuming any more data units and consuming the remaining data units on a match (until encountering the End Marker Symbol) before traversing arc 422 to node N0. In one such example approach, the RegEx engine finishes the match node processing (such as by declaring match, etc.) and then, based on the consume_on_match flag, the RegEx engine either consumes the rest of the data units (until reaching the End Marker Symbol) before following the NextNodeArc whenEndMarker==End Marker Symbol or does not consume any remaining bytes before following the NextNodeArc whenEndMarker=End Marker Symbol.

As noted above, the global counter may be used advantageously to reduce the size of the DFA graph. The approach described above for node N5 reduces the size of the data grow graph by providing a single node capable of processing the bytes remaining in a payload after, e.g., a match. In the example shown above, a DFA graph capable of processing 500 data units has been compressed from 500 nodes to 6 nodes. In addition, the global counter may be used to detect the end of a payload, whether the payload is one row 402 of data units, or more than one row 402 of data units.

The global counter becomes even more critical as the DFA graphs get more complicated. For instance, in one example approach, each RegEx accelerator includes two or more counters 28. The first counter 28 is used as a global counter, while the remaining counters 28 are used as counters for arcs across a subset of the data units encompassed by the global counter.

Figure 16B:
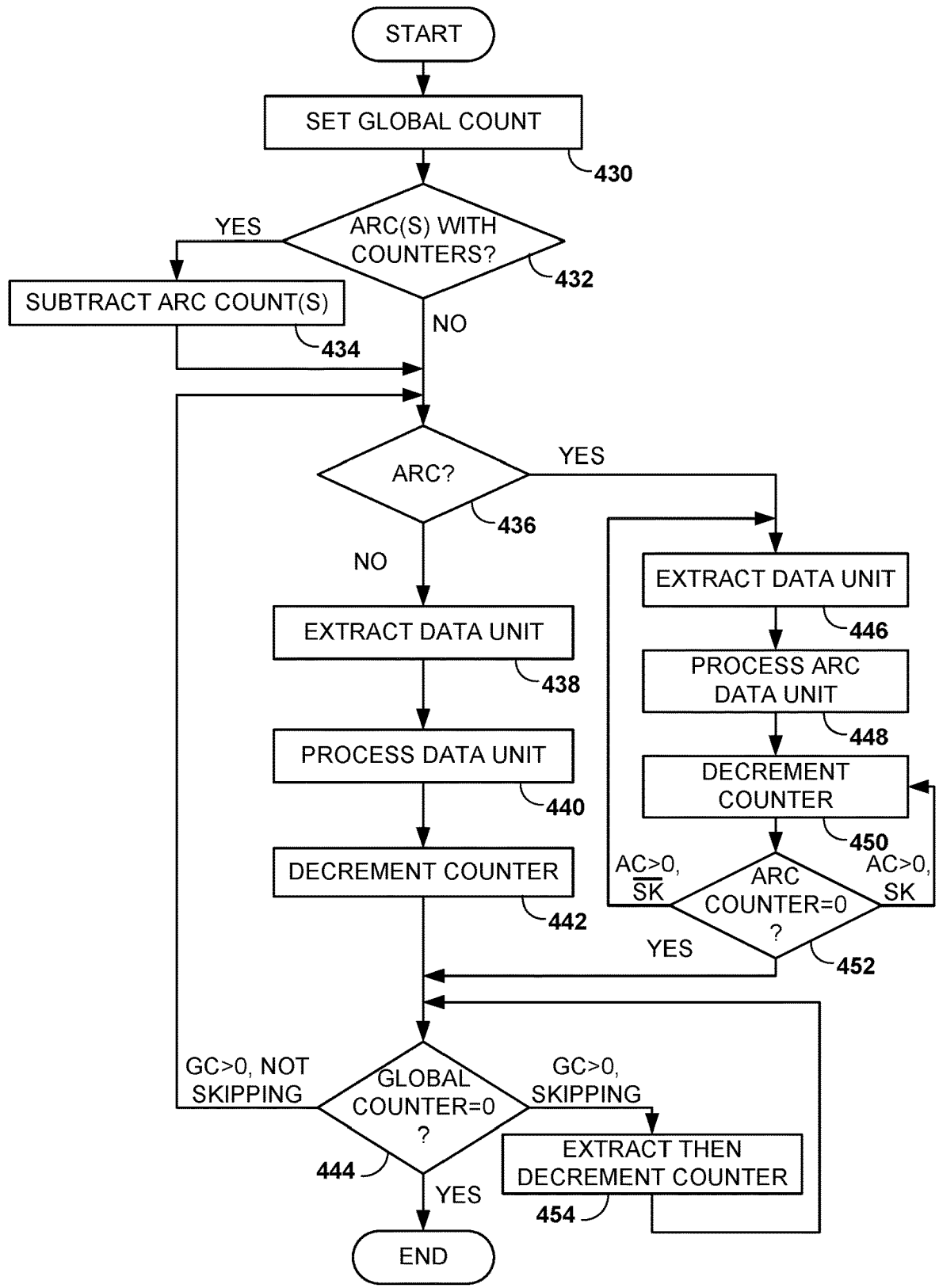
FIG. 16B is a flow diagram illustrating an example DFA graph configured to apply a query specifying different sets of one or more logical conditions (i.e., query predicates) to column data.

FIG. 16B is a flow diagram illustrating an example DFA graph configured to apply a query specifying different sets of one or more logical conditions (i.e., query predicates) to column data. In the example of FIG. 16B, each DPU 17 employs a counter 28 as a global counter and one or more counters 28 as counters for arcs across a subset of the data units encompassed by the global counter. The global counter is used in a DFA or NFA graph to skip bytes or other sized data units in a payload. The arc counters may likewise be used to skip bytes or other sized data units in a payload, but only within the subset of data units encompassed by the arc. The arc counter/global counter combination may be used, for instance, to find an instance of 'Mark' in a particular segment of the target payload, while looking for an instance of 'Steve' in the rest of the payload. It may also be used to find an instance of 'Mark' in a one segment of the target payload and an instance of 'Mary' in another segment of the payload, while looking for an instance of 'Steve' in the rest of the payload.

In one example approach, a data processing unit (DPU) includes an integrated circuit. The integrated circuit includes one or more programmable processor cores and one or more hardware-based RegEx accelerators, wherein each RegEx accelerator includes a RegEx engine configured to receive a DFA or NFA graph, and to perform a regular expression operation on a stream of data units based on the received graph. Each received graph includes a plurality of nodes connected by directional arcs, each arc representing transitions between nodes based on criteria specified for the respective arc, the plurality of nodes including nodes representing states in the regular expression operation. In one such example approach, at least one of the arcs is a default arc, the default arc configured to skip a predefined number N of data units in the stream of data units before transitioning to another node. The RegEx engine discards the next N data units received from the stream of data units before traversing the default arc.

In one example approach, a DFA engine (such as DFA engine 206) sets the global counter to the predetermined number of data units. (430) In the example of FIG. 16A, the global counter is set to 500. The DFA engine determines if one or more subset arcs exists (432) and, if so, DPU 17 subtracts the arc count(s) from the count in the global counter. (434)

The DFA engine determines if the first data unit is part of a subset arc. (436) If the first data unit is not part of a subset arc, the DFA engine extracts the first data unit (438), processes the data unit (440) according to the DFA graph associated with the global counter and decrements the global counter. (442) The processing may include processing a character data unit within a string datatype in the manner detailed for nodes N0-N4 of FIG. 16A above. The DFA engine then determines if the global counter=0. (444)

In the example shown in FIG. 16A above, when the DFA engine found the first occurrence of the string matching 'Steve,' all remaining data units in the target payload were ignored (i.e., skipped). In the example shown in FIG. 16B, if the global counter=0 at 444, the process is complete. If the global counter>0 and the logical expression or combination of expressions has not been encountered (e.g., the DFA engine in the example of FIG. 16A has not found the first occurrence of 'Steve'), the DFA engine moves to 436 and determines if the next data unit is the start of a subset arc. If the global counter>0 and the logical expression or combination of expressions has been encountered (e.g., the DFA engine in the example of FIG. 16A has found the first occurrence of 'Steve'), the DFA engine extracts another data unit and decrements the global counter. (454) The DFA engine then determines if the global counter=0. (444)

If, at 436, the first data unit is part of a subset arc, the DFA engine extracts the first data unit (446), processes the data unit (448) according to the DFA graph associated with the arc counter and decrements the arc counter. (450) The processing may include processing a character data unit within a string datatype in the manner detailed for nodes N0-N4 of FIG. 16A above. As an example, the arc may involve looking for the character string 'Mark' or 'Mary' in particular parts of the target payload. The DFA engine then determines if the arc counter=0. (452)

In the example shown in FIG. 16A above, when the DFA engine found the first occurrence of the string matching 'Steve,' all remaining data units in the target payload were ignored (i.e., skipped). In the example shown in FIG. 16B, if the arc counter=0 at 452, the arc is complete and the DFA engine checks to determine if the global counter=0. (444) If the arc counter>0 and the logical expression or combination of expressions has not been encountered (e.g., the DFA engine in the example of FIG. 16A has not found the first occurrence of 'Mark'), the DFA engine moves to 446 and extracts another data unit from the target payload. If the global counter>0 and the logical expression or combination of expressions has been encountered (e.g., the DFA engine in the example of FIG. 16A has found the first occurrence of 'Mark'), the DFA engine extracts another data unit and decrements the global counter. (450) The DFA engine then determines once more if the global counter=0. (444) The process continues until every data unit in the arc segment has been read.

As noted above in the discussion of the global counter and the arc counter, it can be advantageous to skip nodes in a DFA graph when the contents of the data units are not relevant to the query. As detailed above, the global counter can be used advantageously to skip the data units remaining in a target payload once a match has been detected. Similarly, the arc counter may be used advantageously to skip the data units remaining in a segment of target payload once a match has been detected in that segment, while the global counter is used to skip the remaining data units when all logical expressions have been met. Both approaches, reduce the size required for the DFA graph in meaningful ways as the size of the payload increases.

At the same time, it can be advantageous to skip a series of sets of data units in a target payload. For instance, as noted above, a column may include more than one data field on each line. For instance, a column may include a first name followed by a second name, followed by the zip code of the location where the person lives. The first name may be a string datatype with a width of sixteen data units of two bytes each, while the last name may be a string datatype with a width of 24 data units of two bytes each and the zip code may be a string datatype with a width of 5 data units of two bytes each. The query may be select first.last.zip code where first like 'Mary' second like 'Smith' and zip code like '66061'. Currently such a query would require sixteen nodes for the first name, 24 data nodes for the last name and five nodes for the zip code, for a total of 45 nodes. The following describes another technique for reducing the number of nodes needed in a DFA graph.

Figure 16C:
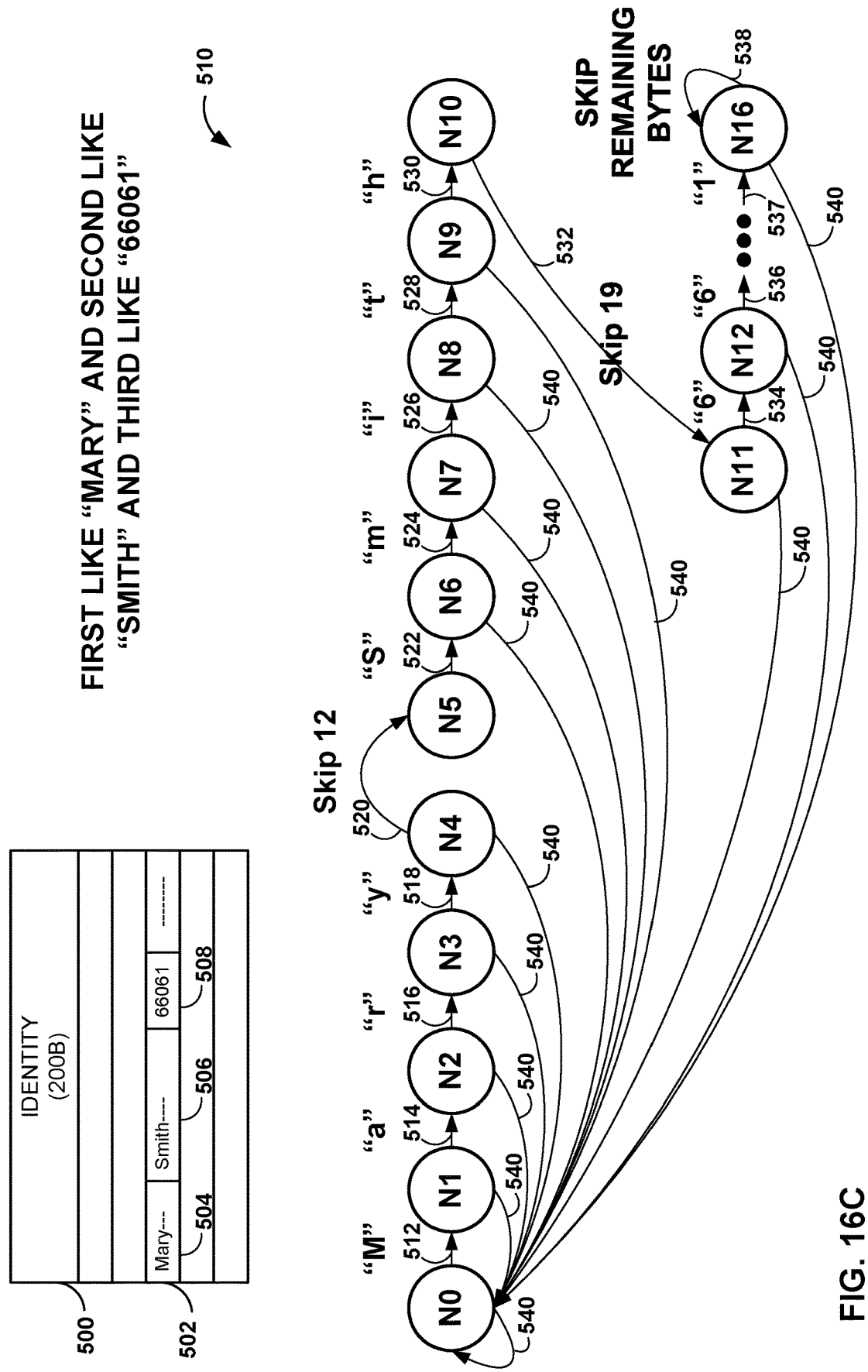
FIG. 16C illustrates a DFA graph that uses a combination of default arcs and global counters to skip data units when the contents of the data units are not relevant.

FIG. 16C illustrates a DFA graph that uses a combination of default arcs and global counters to skip data units when the contents of the data units are not relevant. In this example, such an approach reduces the number of nodes needed in the DFA graph from 45 nodes to 16.

As can be seen in FIG. 16C, an identity column 500 includes two or more rows 502 of 200 bytes per row. The 200 bytes of each row 502 includes at least three data fields: first name 504, last name 506 and zip code 508. In this example, as noted above, the first name may be a string datatype with a width of sixteen data units of two bytes each, while the last name may be a string datatype with a width of 24 data units of two bytes each and the zip code may be a string datatype with a width of 5 data units of two bytes each. In each case, the two bytes depict a character.

In addition, in the example of FIG. 16C, a global counter node N16 is used to the process the remaining data units in a payload. Such an approach reduces the size of the data grow graph by providing a single node capable of processing the bytes remaining in a payload after, e.g., a match. The combination of the default arcs and the global counter reduces the total number of nodes needed to process a row 502 of 100 two-byte data units from 100 nodes to 17 nodes.

In the example illustrated in FIG. 16C, an identity column 500 includes a number of rows 502. Each row 502 includes at least three data fields: first name 504, last name 506 and zip code 508. In this example, as noted above, the first name may be a string datatype with a width of sixteen data units of two bytes each, while the last name may be a string datatype with a width of 24 data units of two bytes each and the zip code may be a string datatype with a width of 5 data units of two bytes each.

In the example shown in FIG. 16C, analytics tools (such as analytics tools 23) issues a query such as select first-.last.zip code where first like 'Mary' second like 'Smith' and zip code like '66061,' to be applied to one or more rows 502 of columns. In response, an analytics service control node (such as analytics service control node 25) provides a data flow graph (not shown) that may be used to generate a DFA graph 510. Each DFA graph 510 is a sequence of interconnected nodes that process data from column 400 using regular expression accelerators, e.g., DFA engines 206, according to the specified query predicates. Each node of DFA graph 510 contains two or more arcs directionally linking the node to itself and/or to other nodes within the DFA graph 510. The DFA engines 206 of DPUs 17 include respective processing units that operate to process streams of data units from column 500 using the DFA graph 510 and that traverse DFA graph 510 by applying the query predicates from the data flow graph.

In the example of FIG. 16C, DFA graph 510 has seventeen nodes N0-N16, each with a default arc 540 that returns to root node N0 upon a failure to match during the evaluation. N0 represents a root node (START node) of DFA graph 510.

That is, N0 is the node initially traversed when the regular expression (RegEx) accelerator (e.g., a DFA engine such as DFA engine 206) evaluates a first unit in the stream of data units. In the example shown in FIG. 16C, the data units processed are from identity column 500, which has at least data fields 504, 506, 508, each having a string datatype but different default widths.

In one example approach, the process applying DFA graph 410 ends when 'Mary' then 'Smith' then '66061' is detected in the payload or at the end of the payload (such that DFA engine 206 doesn't detect the combination of characters wrapping from one row 502 to another across payload boundaries.) From the example shown in FIG. 16C, a check is made at node N0 to determine if the first unit in the stream of data units is an 'M.' If so, the DFA engine traverses arc 512 to node N1. If the first unit in the stream of data units is not an 'M,' however, the DFA engine traverses return arc 540 to remain at node N0 and processes the next row 502. In this example, the global counter is set to 100 (200B/(2 bytes/data unit)) at the start of each payload and, as each new data unit is extracted from the payload, the global counter is decremented by one. In one example approach, start node N0 is a global counter node used to reset the global counter at the start of each row 502.

At node N1, the DFA engine 206 determines if the current data unit matches the character 'a.' When a match for 'a' is found at node N1, the DFA engine reads the next data unit, decrements the global counter and traverses arc 514 to node N2. If the current data unit does not match the character "a," the DFA engine 206 returns to node N0 via return arc 540 and processes the next row 502, determining, at node N0, whether the first data unit from the new row 502 matches the character 'M.'

At node N2, the DFA engine 206 determines if the current data unit matches the character 'r.' When a match for 'r' is found at node N2, the DFA engine reads the next data unit, decrements the global counter and traverses arc 516 to node N3. If the current data unit does not match the character "r," the DFA engine 206 returns to node N0 via return arc 540 and processes the next row 502, determining, at node N0, whether the first data unit from the new row 502 matches the character 'M.'

At node N3, the DFA engine 206 determines if the current data unit matches the character 'y.' When a match for 'y' is found at node N3, the DFA engine reads the next data unit, decrements the global counter and traverses arc 518 to node N4. If the current data unit does not match the character "y," the DFA engine 206 returns to node N0 via return arc 540 and processes the next row 502, determining, at node N0, whether the first data unit from the new row 502 matches the character 'M.'

In the example shown in FIG. 16C, node N4 is a default arc node. At node N4, the DFA engine 206 reads and discards the next 12 data units, decrementing the global counter for each data unit read. The DFA engine then reads the next data unit, decrements the global counter and traverses arc 520 to node N5. In one example approach, the number of data units to skip in order to finish reading data units from field 504 is defined in a default arc instruction used to configure the appropriate DPUs 17.

At node N5, the DFA engine 206 determines if the current data unit matches the character 'S.' When a match for 'S' is found at node N5, the DFA engine reads the next data unit, decrements the global counter and traverses arc 522 to node N6. If the current data unit does not match the character "S," the DFA engine 206 returns to node N0 via return arc 540 and processes the next row 502, determining, at node N0, whether the first data unit from the new row 502 matches the character 'M.'

At node N6, the DFA engine 206 determines if the current data unit matches the character 'm.' When a match for 'm' is found at node N6, the DFA engine reads the next data unit, decrements the global counter and traverses arc 524 to node N7. If the current data unit does not match the character "m," the DFA engine 206 returns to node N0 via return arc 540 and processes the next row 502, determining, at node N0, whether the first data unit from the new row 502 matches the character 'M.'

At node N7, the DFA engine 206 determines if the current data unit matches the character 'i.' When a match for 'i' is found at node N7, the DFA engine reads the next data unit, decrements the global counter and traverses arc 526 to node N8. If the current data unit does not match the character "i," the DFA engine 206 returns to node N0 via return arc 540 and processes the next row 502, determining, at node N0, whether the first data unit from the new row 502 matches the character 'M.'

At node N8, the DFA engine 206 determines if the current data unit matches the character 't.' When a match for 't' is found at node N8, the DFA engine reads the next data unit, decrements the global counter and traverses arc 528 to node N9. If the current data unit does not match the character "t," the DFA engine 206 returns to node N0 via return arc 540 and processes the next row 502, determining, at node N0, whether the first data unit from the new row 502 matches the character 'M.'

At node N9, the DFA engine 206 determines if the current data unit matches the character 'h.' When a match for 'h' is found at node N9, the DFA engine reads the next data unit, decrements the global counter and traverses arc 530 to node N10. If the current data unit does not match the character "h," the DFA engine 206 returns to node N0 via return arc 540 and processes the next row 502, determining, at node N0, whether the first data unit from the new row 502 matches the character 'M.'

In the example shown in FIG. 16C, node N10 is a second default arc node. At node N4, the DFA engine 206 reads and discards the next 19 data units, decrementing the global counter for each data unit read. The DFA engine then reads the next data unit, decrements the global counter and traverses arc 532 to node N11. In one example approach, the number of data units to skip in order to finish reading data units from field 506 is defined in a default arc instruction used to configure the appropriate DPUs 17.

At node N11, the DFA engine 206 determines if the current data unit matches the character '6.' When a match for '6' is found at node N11, the DFA engine reads the next data unit, decrements the global counter and traverses arc 534 to node N12. If the current data unit does not match the character "6," the DFA engine 206 returns to node N0 via return arc 540 and processes the next row 502, determining, at node N0, whether the first data unit from the new row 502 matches the character 'M.'

At node N12, the DFA engine 206 determines if the current data unit matches the character '6.' When a match for '6' is found at node N12, the DFA engine reads the next data unit, decrements the global counter and traverses arc 536 to node N13 (not shown). This continues until each character of the zip code '66061' has been matched. When a match for '1' is found at node N15 (not shown), the DFA engine reads the next data unit, decrements the global counter and traverses arc 537 to node N16. If the current data unit does not match the character "1" at node N15, however, the DFA engine 206 returns to node N0 via return arc 540 and processes the next row 502, determining, at node N0, whether the first data unit from the new row 502 matches the character 'M.'

In the example shown in FIG. 16C, node N16 is a global counter node used to count down the remainder of the global counter. In this example, the 200 bytes of each row 502 includes at least three data fields: first name 504, last name 506 and zip code 508. The first name has a width of sixteen data units of two bytes each, the last name has a width of 24 data units of two bytes each and the zip code has a width of 5 data units of two bytes each. At the point the process reaches node N16, the global counter=100−16−24−5=55 data units.

At node N16, the DFA engine 206 determines if the global counter=0. If the global counter=0, the DFA engine traverses arc 540 to node N0. Otherwise, the DFA engine reads the next data unit, decrements the global counter and traverses arc 538 to node N16, where it repeats the process until global counter=0.

It should be noted that any of nodes N4, N10 and N16 in FIG. 16C may be replaced with the skip node described in the context of node N5 in FIG. 16A. As in the example shown in FIG. 16A, any of nodes N4, N10 and N16 in FIG. 16C may then be configured to consume data units until a mechanism such as a counter loaded with a skip counter value or a data stream configured to include an end marker terminates the procedure. In addition, a combination of counters and end markers may be used as needed.

As noted above, the global counter may be used advantageously to reduce the size of the DFA graph. The approach described above for node N16 reduces the size of the data grow graph by providing a single node capable of processing the bytes remaining in a payload after, e.g., a zip code match, instead of the default number of 55 nodes. When combined with the default arcs described above, even more nodes can be eliminated from DFA graph 510.

In the example shown above, a DFA graph capable of processing 100 data units has been compressed from 100 nodes to 17 nodes. The global counter and the default arc become even more critical tools for DFA and NFA graph compression as the graphs and the data to be processed get increasingly complicated.

It is possible to combine the default arc with a hash node. FIG. 16D illustrates an example DFA default hash arc instruction slice 550 configured to skip a predefined number of data units when the current data unit does not match any of the hash conditions (e.g., Byte3, Byte4, Byte5) defined in the instruction. If the current data unit matches one of the hash conditions, the DFA engine transits to the node address associated with the hash condition, Otherwise, as shown in the example approach of FIG. 16D, DFA engine proceeds to the node locator associated with the default arc after consuming 'LABEL' number of bytes (defined in BYTE6). The instruction is defined in terms of bytes, but other size data units may be used as well.

In the example approach shown in FIG. 16D, if the next payload byte is 7, the DFA engine processes instruction slice 550 as a hash node, matching Byte3, Byte4, Byte5 with payload byte 'Z.' As none of those bytes matching payload byte 'Z,' the DFA engine proceeds to consume Byte6 number of bytes in the payload ('25' bytes) and then to transit to the next node using the fields {M4, T4, MODE4, NODE_ADDR_R4}. In one such example approach, if the remaining payload length (say 10 bytes) is less than 'LABEL' (i.e., 25 bytes above), the DFA engine outputs the current node's node locator into a result buffer and stops processing the rest of the payload (or field).

In one example approach, if the match bit (M) is set, the result word is written after consuming "LABEL" number of the payload bytes, i.e., "offset" value reported in the result word would be "current offset+count".

In some examples, rather than operate by storing and traversing NFA graphs, NFA engines 216 may include instruction-based engines that execute instructions generated in view of one or more NFA graphs, thereby implementing NFA regular expression operations without traversing NFA graphs while processing streams of data units. As such, in these examples, rather than generate a DFA graph for implementing a query specifying a logical condition (i.e., query predicate) to be applied to one or more columns of integer data units, DPUs may generate a set of instructions to be executed by NFA engines for processing a data stream. In the examples described above, analytics control node 25 and/or DPUs 17 may generate, in view of data flow graphs 221, 241, instructions for causing NFA engines 216 to FILTER the data flow so as to apply the query predicates to produce an output data flow (e.g., data flows 224, 244) containing values indicating which data units of the input data flow satisfy the query predicate.

Figure 17A:
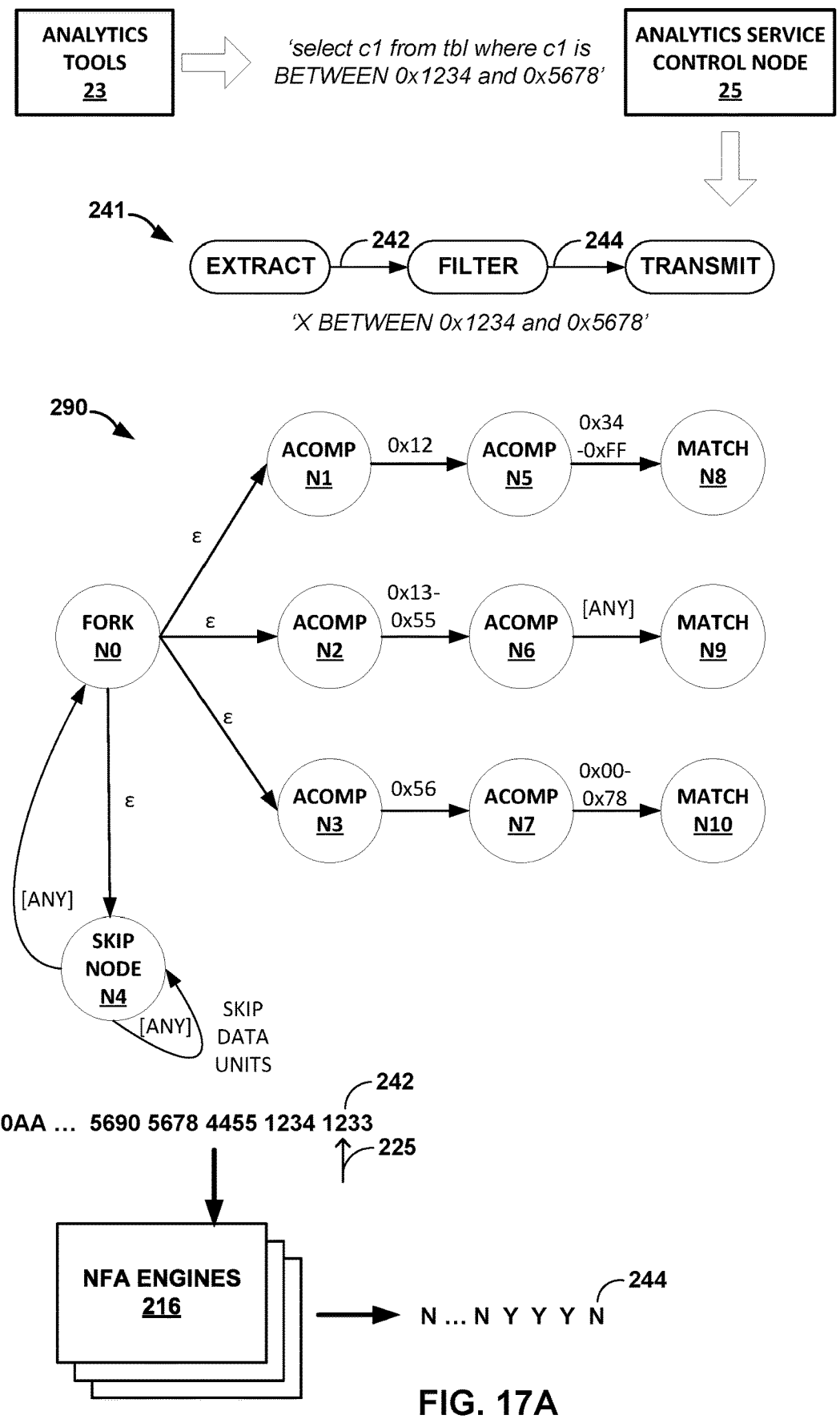
FIG. 17A is a block diagram illustrating regular expression accelerators (e.g., NFA engines 216) configured to implement NFA state machines for executing various queries specifying logical conditions (i.e., query predicates) on one or more columns of data units streaming through one or more DPUs.

FIG. 17A is a block diagram illustrating regular expression accelerators (e.g., NFA engines 216) configured to operate non-deterministic finite automata for executing various queries specifying logical conditions (i.e., query predicates) on one or more columns of data units streaming through one or more DPUs. In particular, FIG. 17A illustrates the example of FIG. 15B using non-deterministic finite automata rather than deterministic finite automata.

In this example, as in the example above with respect to FIG. 15B, analytics tools 23 issues a query 'select c1 from tbl where c1 is BETWEEN 0x1234 and 0x5678' to be applied to one or more columns of data (c1 in this example). In response, analytics service control node 25 generates data flow graph 241 having three graph nodes that configure one or more DPUs to: (1) EXTRACT the one or more columns of data and to direct the data through the hardware accelerators of the DPUs as a stream of data units (as data flow 242 in this example), (2) FILTER the data flow so as to apply the query predicate 'X BETWEEN 0x1234 and 0x5678' to produce an output data flow (e.g., data flow 244) containing values indicating which data units of the input data flow satisfy the query predicate (i.e., is an integer value between than 0x1234 and 0x5678) and (3) TRANSMIT the matching data.

In this example, the FILTER operation may be understood in view of NFA graph 290, which may be generated by DPUs 17 and installed within NFA engines 216. As an alternative, rather than generate and store NFA graph 290 to NFA engines 216, NFA engines 216 may be instruction-based engines, and DPUs 17 may, in view of data flow graph 241, generate executable instructions for execution by NFA engines so as to perform the FILTER macro operation, where the executable instructions programmed in NFA engine implement one or more non-deterministic finite automata.

In the example of FIG. 17A, NFA graph 290 has eleven nodes N0-N10. N0 represents a root node (START node) of NFA graph 290 that is initially traversed when the regular expression (RegEx) accelerator evaluates a first unit (i.e., '0x1233') in the stream of data units. Nodes N8, N9 and N10 are FINAL nodes that each represents a state indicative of an end of an execution thread. In one example operation, NFA engines 216 output a value (e.g., 'Y' or '1' or a row identifier) indicative that the current data unit of data flow 242 being evaluated satisfies the match condition. Each of nodes N1-N3 and N5-N7 are ARRAY COMPARE (ACOMP) nodes that cause one or more of NFA engines 216 to match a specified number of values with consecutive bytes of dataflow 242. The compare is successful when all values specified by the ACOMP instruction compare true to the consecutive bytes being evaluated in the dataflow. In one example approach, N4 is a skip node such as the skip node described above in the context of node N5 in FIG. 16A. In one such example approach, node N4 is also an ACOMP node.

As one example, the following is an example sequence of NFA instructions causing NFA engines (such as NFA engines 216) to process input stream of data units 242 and apply query 'select c1 from tbl where c1 is BETWEEN 0x1234 and 0x5678' and generate data flow 244 as described in the above example:

```
00: fork 10(1), 20 (1), 30 (1), 40 (2)
10: acmp 0x12, 1
11: acmp [0x34-0xff], 1
12: final
20: acmp [0x13-0x55], 1
21: acmp [ANY], 1
22: final
30: acmp 0x56, 1
31: acmp [0x00-0x78], 1
32: final
40: skip [ANY], 2
41: jump 0
```

As such, when operating according to NFA graph 290, NFA engines 216 initially executes a fork instruction (shown at line 00 of the instructions) to create four paths of execution designated by lines 10, 20, 30 and 40. Moreover, each path of execution is associated with an instruction stack which is specified within the fork instruction, where the stack identifier (StackID) is shown in parentheses in this example. As such, the first three paths of execution specified by the fork instruction (i.e., NFA acmp instructions at lines 10, 20 and 30) are pushed to the same instruction stack, i.e., stack #1. The fourth path of execution specified by the fork instruction (i.e., the NFA acmp instruction at line 40) is pushed to a second instruction stack, i.e., stack #2. In general, the fork instruction does not consume any bytes of the dataflow and instead creates execution paths that are matched speculatively. In some instance, may cause one of NFA engines 216 to push a subsequent fork instruction with the index of a not taken path to an instruction stack to facilitate potential backtracking later.

In this example, as explained above, the fork instruction at line 00 creates four paths of execution by pushing the instructions specified at lines 10, 20 and 30 to the first instruction stack for execution and by pushing the instruction specified by the fourth path of execution to the second instruction stack #2. NFA engines 216 proceed to execute the two stacks of instructions in hardware.

In a first path of execution, array comp instructions at lines 10, 11 compare a first byte of the current data value to a value 0x12 and, if successful, compare the second byte to a range of values 0x34-0xFF, respectively. Upon successful comparisons by both instructions, the FINAL instruction of line 12 causes NFA engines 216 to report an NFA match condition to a result buffer and terminate the thread of execution of stack #1 for evaluating the current value of the data flow by removing any remaining entries of the instruction stack. Upon a failure of either of the array comp instructions at lines 10, 11, NFA engine 216 continues operations with remaining operations pushed to instruction stack #1, i.e., array compare instructions at lines 20 and 30.

In a second path of execution, array comp instructions at lines 20, 21 similarly compare a first byte of the current data value to a range of values 0x13-0x55 and compare the second byte of the current data value a wildcard value of any (i.e., a range of values 0x00-0xff), respectively. Upon successful comparisons by both instructions, the FINAL instruction of line 22 causes NFA engines 216 to report an NFA match condition to a result buffer and terminate the thread of execution of stack #1 for evaluating the current value of the data flow by removing any remaining entries of the instruction stack. Upon a failure of either of the array comp instructions at lines 20, 21, NFA engine 216 continues operations with remaining operations pushed to instruction stack #1, i.e., the array compare instruction at line 30.

In a third path of execution, array comp instructions at lines 30, 31 compare a first byte of the current data value to the value 0x56 and, if successful, compare the second byte of the current data value to a range of values 0x00-0x78), respectively. Upon successful comparisons by both instructions, the FINAL instruction of line 32 causes NFA engines 216 to report an NFA match condition to a result buffer and terminate the thread of execution of stack #1 for evaluating the current value of the data flow by removing any remaining entries of the instruction stack.

The fourth data path of execution includes a skip instruction at line 40 that instructs the NFA engine to consume two bytes of the current data flow. The NFA engine continue operation by returning execution flow to the root fork instruction (line 000) via the jump instruction (line 40) to repeat the evaluation process. In one example approach, node N4 is a skip node. As in the example shown in FIGS. 16A and 16C, node N4 may be configured to consume data units until a mechanism such as a counter loaded with a skip value or a data stream configured to include an end marker terminates the procedure. In addition, a combination of counters and end markers may be used as needed. In one such example approach, node N4 is also an ACOMP node that, as shown in FIG. 17A, matches all symbols.

In one example approach, node N4 may also be configured with a Boolean Flag—consume_on_match. In one such example approach, the consume_on_match flag selects between simply traversing an arc to node N0 on a match (without consuming any more data units) and consuming the remaining data units on a match before traversing arc 422 to node N0. In one such example approach, the NFA engine finishes the match node processing (such as by declaring match, etc., at nodes N8, N9 or N10) and then, based on the consume_on_match flag at N4, the NFA engine either consumes the rest of the remaining bytes before following a NextNodeArc whenCounterValue==0 to N0 or does not consume the remaining bytes before returning to N0. Other mechanisms, such as an end marker, may be used to detect the end of a segment of data units as well.

In one example approach, the arc from N4 to N0 is an epsilon arc (i.e., consumes no data units). In another example approach, the arc from N4 to N0 consumes a data unit. In the example where the arc from N4 to N0 consumes a data unit, Counter value may be set to N−1, where N is the number of data units to be consumed.

In this way, NFA engines 216 operate to process input data flows 242 and to generate output data flow 244. In one example, NFA engines 216 may generate output data flow 244 to specify row identifiers for those rows of the column having values that satisfy the predicate. As such, NFA engines 216 may, in this implementation, produce output data flow 244 as '4 3 2', i.e., identifiers for the second, third and fourth rows having values 1234, 4455 and 5678 in this example (starting at a row identifier value of 1).

In other examples, FINAL instructions push a result (Y/N or 1/0) to the result buffer based upon the results of the previously executed array comparison instructions but, upon a failure, do not empty the instruction stack such that NFA engines 216 execute any instructions previously pushed to a given instruction stack. As such, NFA engines 216 generate output data flow 244 to include an affirmative result upon a match and also a negative indication if the predicate is not satisfied by the current data unit of the input data stream. As such, in this example implementation, NFA engines 216 may output data flow 244 as a bitmap, e.g., where a 1 or Y is reported for a match and 0 or N is reported for mismatch, as shown in FIG. 17A.

In some example approaches, instead of embedding StackIDs in the FORK instruction as discussed in the context of FIG. 17A above, it may be advantageous to have the RegEx accelerator select the StackID. In one such example approach, the StackID is selected based on the row number of the row that is providing input data flow 242. An advantage of such an approach is that the RegEx accelerator can determine the current row from the StackID when, for instance, an arc to the root node N0 is taken.

Figure 17B:
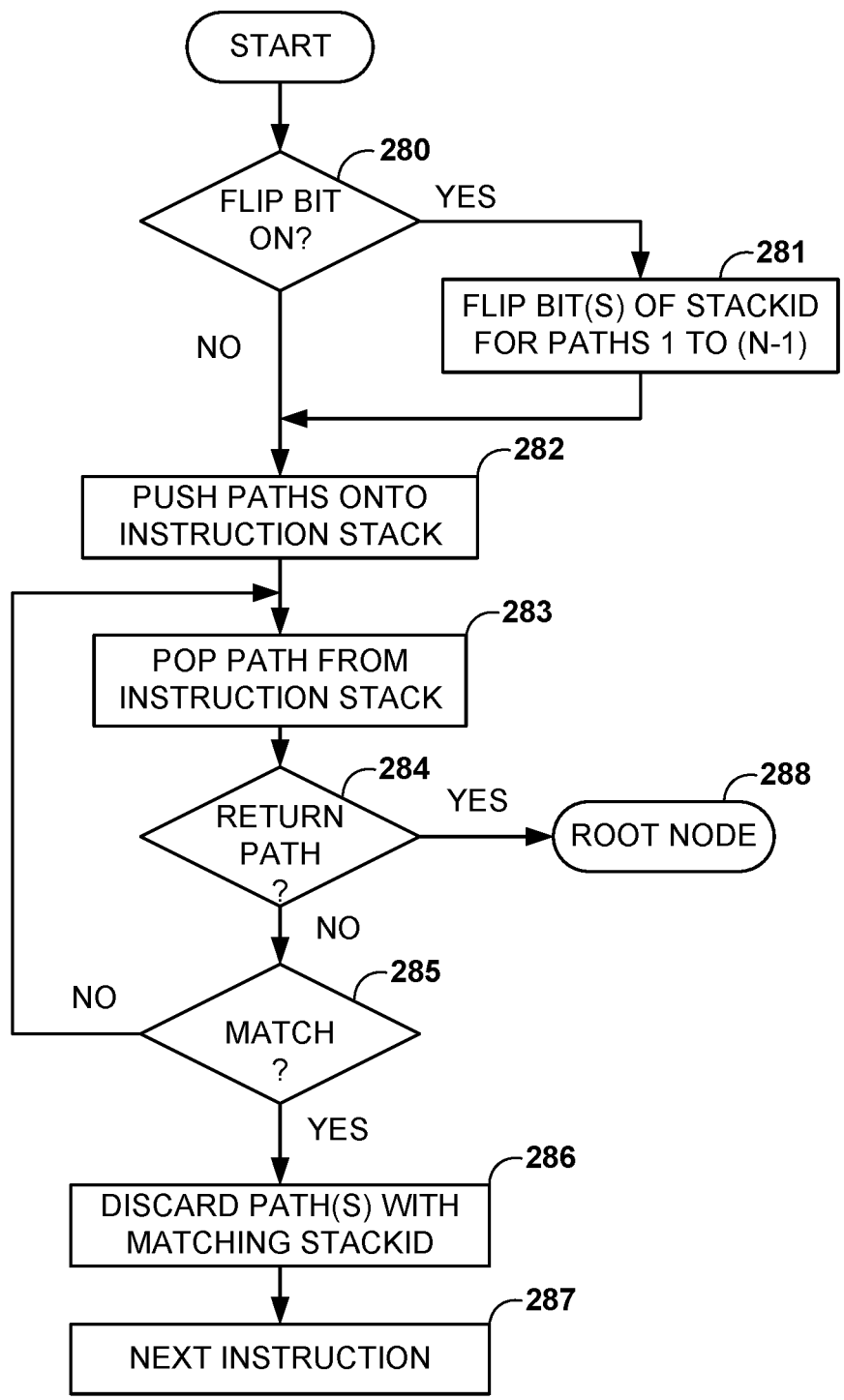
FIG. 17B is a flowchart illustrating an example method of executing a FORK instruction in a non-deterministic finite automata (NFA) engine.

FIG. 17B is a flowchart illustrating an example method of executing a FORK instruction in a non-deterministic finite automata (NFA) engine. When operating according to NFA graph 290, NFA engines 216 initially executes a fork instruction "FORK 10, 20, 30, 40" to create four paths of execution designated by lines 10, 20, 30 and 40. As noted above, in general, the fork instruction does not consume any bytes of the dataflow and instead creates execution paths that are matched speculatively. In some instances, this may cause one of NFA engines 216 to push a subsequent fork instruction with the index of a not taken path to an instruction stack to facilitate potential backtracking later.

In one example approach, each FORK instruction includes a FLIP bit that may be used to switch between an approach in which each of the execution paths use the same StackID, and an approach in which the execution path leading back to the root node (e.g., "40" in the FORK instruction provided above) uses a different StackID than the other execution paths. As noted above, in one example approach, when executed, each execution path of a FORK instruction is pushed to an instruction stack in reverse order of execution. In the example given above, execution path "40" was pushed into stack #2, while the remaining execution paths were pushed into stack #1 in starting with execution path "30" and ending with execution path "10". In an example in which the RegEx accelerator selects the StackID, each execution path of the FORK instruction may be pushed into the same instruction stack (again in reverse order) and the StackID selected for that execution path by the RegEx accelerator is stored with the execution path information.

In one example approach, each fork instruction includes N execution paths, where N=2, with one of the execution paths (i.e., the "default arc") leading back to the root node. A check is made to determine if the FLIP bit is active (280). The FLIP bit may be configured to be active, for instance, when the FLIP bit is set or when the FLIP bit is cleared. If the FLIP bit is not active, the N execution paths are pushed onto an instruction stack in reverse order with a StackID selected by the RegEx accelerator (282). When the FLIP bit is active, the StackID is again selected by the RegEx accelerator and again assigned to the execution paths but now one bit from the selected StackID of each of the first N−1 execution paths is flipped (281) before the N execution paths are pushed onto the instruction stack (282). In one example approach, the least significant bit (LSB) of the StackID is flipped when the FLIP bit is active. Bits other than the LSB may be selected if desired.

In the example given above, the execution paths are paths "10" through "40". If the StackID is "801" and the FLIP bit is not active, each of the execution paths would be pushed to the instruction stack with a StackID of "801". In contrast, if the StackID is "801" and the FLIP bit is active, then the first three execution paths (i.e., 10, 20 and 20) would be pushed to the instruction stack with a StackID of "800" while the further execution path would be pushed to the instruction stack with a StackID of "801".

Returning to the flowchart of FIG. 17B, an execution path is popped from the instruction stack (283) and a check made to determine if the execution path is the path back to the root node (284). If the execution path is the path back to the root node (i.e., execution path 40), the RegEx accelerator returns to the root node (288), where the RegEx accelerator may, in some example approaches, determine the current row number from the StackID associated with execution path 40. If the execution path is not the path back to the root node (i.e., execution paths 10, 20 or 30), the RegEx accelerator determines if the execution path compare value matches the first byte of the current data value (285) and, if not, pops the next execution path from the instruction stack (283).

If the RegEx accelerator determines that the execution path compare value matches the first byte of the current data value (285), the RegEx accelerator discards any remaining execution paths that are on the instruction stack and that share the same StackID (286) and moves to the next instruction along the successful execution path (287).

The FLIP bit can be used advantageously when using StackIDs that are selected rather than specified within the fork instruction. In one example approach, the same StackID is used throughout the NFA graph 290. When the FLIP bit is active, the return arc (40 in the example above) is not discarded at 286 but instead may be used as a return arc at the next level of comparison (such as at nodes N5, N6 or N7 in FIG. 17A). In contrast, when the FLIP bit is not active, all remaining execution paths are discarded on a match; the RegEx accelerator may, therefore, need to store the return arc in addition to the other execution paths as part of loading the next instruction.

In some examples, FINAL instructions push a result (Y/N or 1/0) to a result buffer based upon the results of the previously executed array comparison instructions but, upon a failure, do not empty the instruction stack. NFA engines 216 may, therefore, execute any instructions previously pushed to a given instruction stack. As such, NFA engines 216 generate output data flow 244 to include an affirmative result upon a match and also a negative indication if the predicate is not satisfied by the current data unit of the input data stream. As such, in this example implementation, NFA engines 216 may output data flow 244 as a bitmap, e.g., where a 1 or Y is reported for a match and 0 or N is reported for mismatch, as shown in FIG. 17A.

FIG. 18 is a flowchart illustrating example operation of a network system in which one or more analytics service control nodes and a set of data processing units (DPUs) are configured to provide scalable, efficient platform for analytics processing. In general, analytics tools 23 issues analytical requests (e.g., queries, messages, API calls, REST calls, etc.) for processing data, such as large volumes of data (e.g., 'big data') stored in data sources 19, e.g., database systems, repositories, and the like (300).

Analytics service control node 25 receives the requests, generally referred to herein as queries, and operates to coordinate high-speed distributed processing of analytical operations on data ingested from data sources 19 using one or more DPUs 17 (302). For example, analytics service control node 25 selects a set of one or more DPUs 17 for servicing the received analytical request, where the DPUs may be deployed within compute nodes 13, storage nodes 12 or within other devices or appliances (304).

Analytics service control node 25 translates analytic operations, such as queries for data loading and analysis, into one or more data flow graphs as data structure for controlling execution of DPUs 17 to read data from data sources 19 and manipulate the data as data streams, thereby leveraging the highly efficient, specialized software and hardware components of the DPUs (306, 308). For example, in response to receiving a query via analytics interface 35, query compiler/DFG generator 39 compiles the query (which may take a conventional form such as an SQL query, a Spark SQL query, a GraphX operation) and dynamically constructs a data flow graph (DFG) 40 representing a set of operations to be performed by DPUs 17 for implementing analytical operations on the ingested data. Query execution controller 33 coordinates the overall servicing of an analytics request by distributing of all or respective portions of dynamically generated DFG 40 to the selected compute nodes 13 for performing the data processing operations represented by the data flow graphs (310).

Control software, such as agents 116 executing on DPUs 17 and/or software executing on CPU 102 (FIG. 9) or software executing on central control cluster 158 (FIG. 11), (collectively representing examples of a controller) receive the data flow graphs from analytics service control nodes 25, as one example of an instruction or message specifying a requested analytical operation, and parse the data flow graphs to identify the graph nodes and arcs defined by the data flow graph, where each graph node represents a set of one or more low-level, high-speed data stream processing operations to be performed by software components and/or hardware accelerators of DPUs 17, and each arc represents a stream of data units either processed by or produced by the DPUs (316).

Upon parsing the receiving data flow graphs, the control software of DPUs 17 construct work units, e.g., in the form of one or more work unit stacks, and configure the DPUs to perform high-speed, chained operations on data flows streaming through the DPU using, for example, data plane software functions (e.g., library 126 of data plane 122) executable by internal processor clusters (e.g., cores 140 or clusters 156) and/or hardware accelerators (e.g. accelerators 146, 189, 200, 211) of the DPU (317).

During operation, DPUs 17 operate to ingest data into DPU-managed storage according to data flow graphs (318), stream data through DPUs according to data flow graphs (320) and transmits any results of the analytical operations (322). As shown, in some examples, DPUs 17 transmit the results to analytics service control node 25, which aggregates the results for output to analytics tools 23 in response to the initial analytical queries (312, 314). In other examples, DPUs 17 bypass analytics service control node 25 and transmit the results or portions thereof to analytical tools 23. Analytics tools 23 receive the results on the analytical operations (324) and may generate reports/visualizations 27 indicative of trends, patterns and the like with respect to the underlying data of data sources 19.

Figure 19:
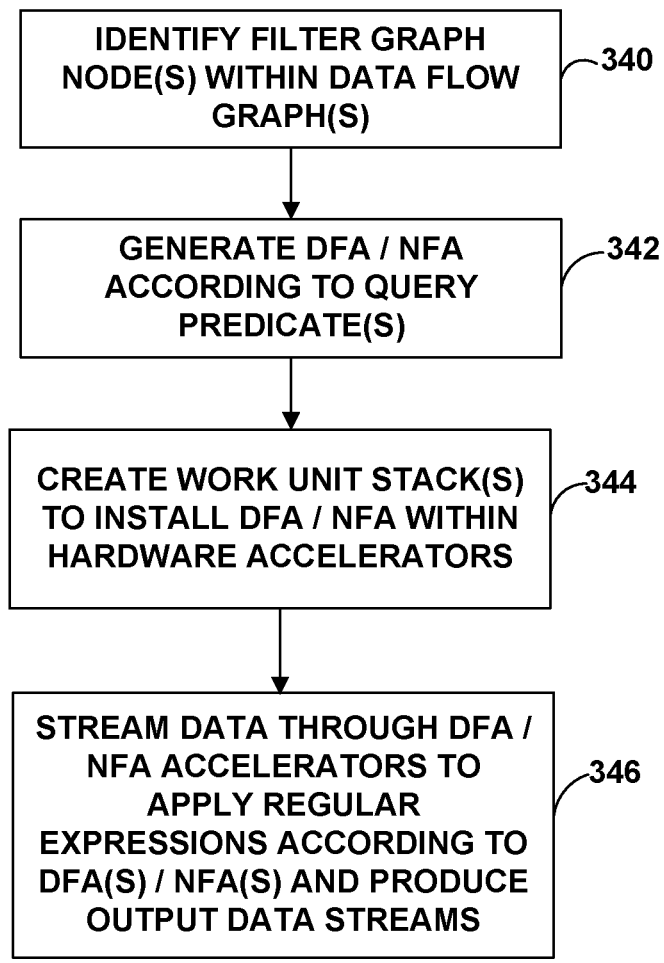
FIG. 19 is a flowchart illustrating example operation of a DPU when utilizing programmable, hardware-based accelerators configured to apply query predicates and other analytical operations by evaluating regular expressions against the high-speed data flows streaming through the DPU.

FIG. 19 is a flowchart illustrating example operation of a DPU when utilizing programmable, hardware-based accelerators configured to apply query predicates and other analytical operations by evaluating regular expressions against the high-speed data flows streaming through the DPUs. In this example, control software, such as agents 116 executing on DPUs 17 and/or software executing on CPU 102 (FIG. 9) or software executing on central control cluster 158 (FIG. 11), parses a received data flow graph from analytics service control nodes 25 and identifies a FILTER graph node instructing the DPU to evaluate one or more query predicates against a data flow by applying regular expressions to perform pattern matching on the data streams (340).

In response to identifying the FILTER node of the data flow graph, the control software of the DPU generates one or more deterministic and/or non-deterministic finite automata (DFAs/NFAs) and configures hardware-based regular expression accelerators of DPU 17 to implement the DFAs/NFAs (342, 344). As examples, the control software may construct work units that, when executed, install one or more DFA graphs for traversal by DFA engines 206 and/or install instructions for execution by NFA engines 216.

In operation, the regular expression accelerators of DPUs 17 operate to apply query predicates to data by using regular expressions to perform pattern matching on the data streams flowing through the DPU and producing output data streams indicative of the results (346). During this process, as one example, DPUs 17 may read one or more columns of data from local or network attached storage, decrypt the data into clear text if necessary, decompress to inflate the data into the original data ingested by the DPU and stream the data through RegEx accelerators to evaluate the data using DFAs and/or NFAs so as to implement any logical conditions (query predicates) defined by the analytical operations.

What is claimed is:

1. An integrated circuit, comprising:
    a memory including a finite automata (FA) graph, wherein the FA graph includes a plurality of nodes connected by directional arcs, wherein:
        each arc representing transitions between nodes of the FA graph based on criteria specified for the respective arc,
        the plurality of nodes including a skip node and a root node;
        the directional arcs include an arc from the skip node to the root node; and
    one or more hardware-based regular expression (RegEx) accelerators connected to the memory, wherein each RegEx accelerator includes a regular expression engine, the regular expression engine configured to receive the FA graph from the memory and to perform a regular expression operation on a stream of data units based on the received FA graph by initially traversing the root node,
    wherein the regular expression engine is further configured to, a to reaching the skip node, consume a predefined number of data units in the stream of data units before traversing the arc from the skip node to the root node, wherein the predefined number of data units is provided by a counter used to detect an end of a payload.

2. The integrated circuit of claim 1, wherein the regular expression engine is a deterministic finite automata (DFA) engine and the received FA graph is a DFA graph, and
    wherein the regular expression engine is further configured to remain at the skip node consuming data units received from the stream of data units until the counter indicates an Nth data unit has been consumed.

3. The integrated circuit of claim 2, wherein the regular expression engine loads a global counter value M into a global counter and decrements the global counter each time a data unit is received from the stream of data units, transitioning to another node when M=−0.

4. The integrated circuit of claim 2, wherein the regular expression engine clears a global counter and increments the global counter each time a data unit is received from the stream of data units, transitioning to another node when the global counter is equal to a global counter value of M.

5. The integrated circuit of claim 1, wherein the regular expression engine is a non-deterministic finite automata (NFA) engine and the received FA graph is an NFA graph, and
    wherein the regular expression engine is further configured to remain at the skip node consuming data units received from the stream of data units until the counter indicates an Nth data unit has been consumed.

6. The integrated circuit of claim 5, wherein the regular expression engine loads a global counter value M into a global counter and decrements the global counter each time a data unit is received from the stream of data units, transitioning to another node when M=0.

7. The integrated circuit of claim 5, wherein the regular expression engine clears a global counter and increments the global counter each time a data unit is received from the stream of data units, transitioning to another node when the global counter is equal to a global counter value of M.

8. The integrated circuit of claim 1, wherein the regular expression engine is a deterministic finite automata (DFA) engine and the received FA graph is a DFA graph, and
    wherein the regular expression engine is further configured to remain at the skip node consuming data units received from the stream of data units until the regular expression engine encounters an end marker in the data stream.

9. The integrated circuit of claim 1, wherein the regular expression engine is a non-deterministic finite automata (NFA) engine and the received FA graph is an NFA graph, and
    wherein the regular expression engine is further configured to remain at the skip node consuming data units received from the stream of data units until the regular expression engine encounters an end marker in the data stream.

10. The integrated circuit of claim 1, wherein the integrated circuit further comprises one or more programmable processor cores, wherein the programmable processor cores are communicatively coupled to the memory.

11. The integrated circuit of claim 1, wherein the integrated circuit further comprises a cluster manager and one or more programmable processor cores, wherein the programmable processor cores are communicatively coupled to the cluster manager and to the memory.

12. A method, comprising:
    receiving a regular expression operation to be performed on a stream of data units;
    expressing the regular expression operation as a finite automata (FA) graph, the FA graph having a plurality of nodes connected by directional arcs, wherein:
        each arc representing transitions between nodes of the FA graph based on criteria specified for the respective arc,
        the plurality of nodes including nodes, including a skip node and a root node, representing states in the regular expression operation, and the directional arcs include an arc from the skip node to the root node; and performing the regular expression operation on the stream of data units based on the FA graph, wherein performing includes configuring a regular expression engine of a hardware-based regular expression accelerator to:
beginning at the root node in the plurality of nodes of the FA graph, step the regular expression engine through one or more nodes of the FA graph until the regular expression engine arrives at the skip node; and
consume, at the skip node, a predefined number of data units from the stream of data units before traversing the arc from the skip node to the root node, wherein the predefined number of data units is provided by a counter used to detect an end of a payload.

13. The method of claim 12, wherein receiving the regular expression operation to be performed on a stream of data units includes receiving a data flow graph.

14. The method of claim 12, wherein the regular expression engine is a deterministic finite automata (DFA) engine and the FA graph is a DFA graph, and
wherein the regular expression engine is further configured to remain at the skip node consuming data units received from the stream of data units until the counter indicates an Nth data unit has been consumed.

15. The method of claim 14, wherein the regular expression engine is further configured to perform a global counter operation terminating the regular expression operation after consuming M data units, where M is greater than N.

16. The method of claim 12, wherein the regular expression engine is a non-deterministic finite automata (NA) engine and the received FA graph is an NFA graph, and
wherein the regular expression engine is further configured to remain at the skip node consuming data units received from the stream of data units until the counter indicates an Nth data unit has been consumed.

17. The method of claim 12, wherein the regular expression engine is a deterministic finite automata (DFA) engine and the FA graph is a DFA graph, and
wherein the regular expression engine is further configured to remain at the skip node consuming data units received from the stream of data units until the regular expression engine encounters an end marker in the data stream.

18. The method of claim 12, wherein the regular expression engine is a non-deterministic finite automata (NFA) engine and the received FA graph is an NFA graph, and
wherein the regular expression engine is further configured to remain at the skip node consuming data units received from the stream of data units until the regular expression engine encounters an end marker in the data stream.

19. In an integrated circuit having a regular expression engine, a method, comprising:
receiving a DFA NRA graph, the received graph including a plurality of nodes connected by directional arcs, wherein:
each arc representing transitions between nodes based on criteria specified for the respective arc,
the plurality of nodes including nodes, including a skip node and a root node, representing states in the regular expression operation, and
the directional arcs include an arc from the skip node to the root node;
selecting a stream of data units;
beginning at the root node in the plurality of nodes of the received DFA car NFA graph, stepping a regular expression engine through one or more nodes of the graph until the regular expression engine arrives at the skip node;
if the skip node is configured to consume on match, consuming, at the skip node, a predefined number of data units from the selected stream of data units before traversing the arc from the skip node to the root node, wherein the predefined number of data units is provided by a counter used to detect an end of a payload; and
if the skip node is configured to not consume on match, traversing the arc from the skip node to the root node.

20. The method of claim 15, wherein the global counter operation is finished after operations on N data units from the stream of data units.

21. The method of claim 15, wherein the global counter operation is finished after operations on N data units from the stream of data units, wherein the N data units are not consecutive data units.

22. The method of claim 15, wherein the global counter operation is finished after operations of N data units from the stream of data units, wherein N=PL−IL, wherein PL is payload length in data units and IL is a number of data units operated on in a separate arc within the global counter operation.

23. A system comprising:
a processor coupled to Ea memory that stores instructions and a regular expression (RegEx) engine configured to detect patterns within a stream of data units, wherein the instructions, upon execution by the processor, cause the processor to:
receive a request to perform an analytical operation on data from the stream of data units, the analytical operation specifying a query having at least one query predicate,
wherein, in response to the request, the controller configures the RegEx engine to operate according to one or more non-deterministic finite automata (NFA) to evaluate the query predicate by applying one or more regular expressions to the stream of data units,
wherein configuring the RegEx engine includes generating a set of NFA instructions, the NFA instructions including at least one FORK instruction, each FORK instruction having a plurality of execution paths, including a default execution path and one or more other execution paths, and programming the RegEx engine to operate according to the NFA instructions; and
wherein the RegEx engine executes the at least one FORK instruction by attaching a first stack identifier to the default execution path, pushing the default execution path and the first stack identifier to an instruction stack, attaching a second stack identifier to the other execution paths, the second stack identifier a function of the first stack identifier, pushing the other execution paths with their respective second stack identifiers to the instruction stack, and executing each execution path in order by popping the execution path from the instruction stack.

24. A method comprising:
receiving a request specifying at least one analytical operation to be performed on data, the analytical operation specifying a query having at least one query predicate;

in response to the request, configuring a regular expression (RegEx) engine to input the data as one or more streams of data units and to evaluate the query predicate against the data by applying one or more regular expressions to the one or more data streams according to one or non-deterministic finite automata (NFA), wherein configuring the RegEx engine includes generating a set of NFA instructions, the NFA instructions including at least one FORK instruction, each FORK instruction having a plurality of execution paths, including a default execution path and one or more other execution paths, and programming the RegEx engine to operate according to the NFA instructions;

executing the at least one FORK instruction, wherein executing includes:

attaching a first stack identifier to the default execution path;

pushing the default execution path and the first stack identifier to an instruction stack;

attaching a second stack identifier to the other execution paths, the second stack identifier a function of the first stack identifier;

pushing each other execution path with a respective second stack identifier to the instruction stack; and executing each execution path in order by popping the execution path from the instruction stack.

25. The method of claim 24, wherein the first stack identifier is determined as a function of a row identifier.

* * * * *